США005845287A

United States Patent [19]
Henrion

[11] Patent Number: 5,845,287
[45] Date of Patent: Dec. 1, 1998

[54] APPARATUS FOR MANAGING RELATIONSHIPS BETWEEN OBJECTS

[75] Inventor: Michel Henrion, Brussels, Belgium

[73] Assignee: Alcatel N.V., Rijswijk, Netherlands

[21] Appl. No.: 793,268

[22] PCT Filed: Jul. 9, 1996

[86] PCT No.: PCT/FR96/01069

§ 371 Date: Feb. 21, 1997

§ 102(e) Date: Feb. 21, 1997

[87] PCT Pub. No.: WO97/03535

PCT Pub. Date: Jan. 30, 1997

[30]  Foreign Application Priority Data

Jul. 12, 1995  [FR]  France ................................. 95/08435

[51] Int. Cl.$^6$ ..................................................... G06I 17/30
[52] U.S. Cl. .......................... 707/101; 370/601; 370/912; 370/395
[58] Field of Search ................................. 370/395, 60.1, 370/94.2; 707/103, 101

[56]  References Cited

U.S. PATENT DOCUMENTS

| 4,959,776 | 9/1990 | Deerfield et al. ................. 364/200 |
| 5,467,347 | 11/1995 | Petersen ................................. 370/60.1 |
| 5,475,644 | 12/1995 | Chauvel et al. ................. 365/221 |
| 5,541,918 | 7/1996 | Ganmukhi et al. ................. 370/60.1 |
| 5,544,104 | 8/1996 | Chauvel ................. 365/189.01 |
| 5,548,588 | 8/1996 | Ganmukhi et al. ................. 370/60.1 |
| 5,570,348 | 10/1996 | Holden ................................. 370/17 |
| 5,583,861 | 12/1996 | Holden ................................. 370/395 |
| 5,619,495 | 4/1997 | Yamanaka et al. ................. 370/413 |

FOREIGN PATENT DOCUMENTS

| 0180239A2 | 5/1986 | European Pat. Off. . |
| WO9202874 | 2/1992 | WIPO . |

OTHER PUBLICATIONS

H. Yamanaka et al, "A Scalable Nonblocking Shared Multibuffer ATM Switch With a New Concept of Searchable Queue", ISS '95 World Telecommunications Congress, Berlin, DE 23 Apr. 1995, pp. 278–282.

J. Schultz et al, "CAM–Based Single–Chip Shared Buffer ATM Switch", SUPERCOMM/ICC'94, New Orleans, US, 1 May 1994, pp. 1190, 1995.

S. Kumar et al, "On Design of a Shared–Buffer Based ATM witch for Broadband–ISDN", IEEE 13th Annual International Phoenix Conference on Computers & Communications, Pheonix, US, pp. 377–383.

S. Mahmud, "Models of Asynchronous Packet–Switched Multiple and Partial Multiple Bus Systems", Micro–Processing and Microprogramming, vol. 40, No. 1, Jan. 1994, Amsterdam, NL, pp. 33–41.

Primary Examiner—Paul R. Lintz
Assistant Examiner—Michael J. Wallace, Jr.
Attorney, Agent, or Firm—Sughrue, Mion, Zinn, Macpeak & Seas, PLLC

[57]  ABSTRACT

For any pair of two distinct objects (i, j) and for each relationship that may exist between said two objects, the management apparatus includes a memory element RMP(i,j) for storing either the existence or the non-existence of said relationship. This memory element includes an input corresponding to a first object (i) and an input corresponding to a second object (j), which inputs are connected to two individual buses (CC(j), LC(i)) corresponding respectively to said two objects. These two inputs must receive two respective control signals simultaneously in order to write information in said element indicating either the existence or the non-existence of a relationship between these two objects. In a preferred embodiment, the input corresponding to the first object must receive a read signal for the memory element to restore said information on an output corresponding to the second object; and the input corresponding to the second input must receive a read signal for the memory element to restore said information on an output corresponding to the first object. These memory elements are organized in a triangular array (TN') if the relationship is symmetrical. The apparatus is applicable to asynchronous transfer mode telecommunications switching systems.

36 Claims, 45 Drawing Sheets

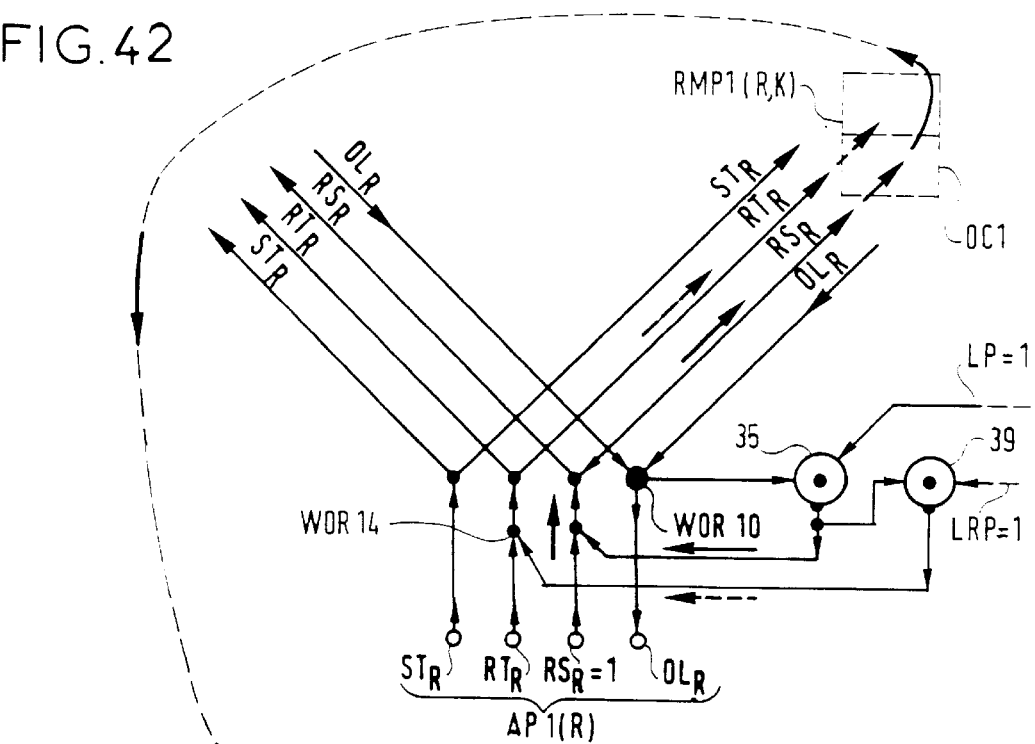
FIG.42
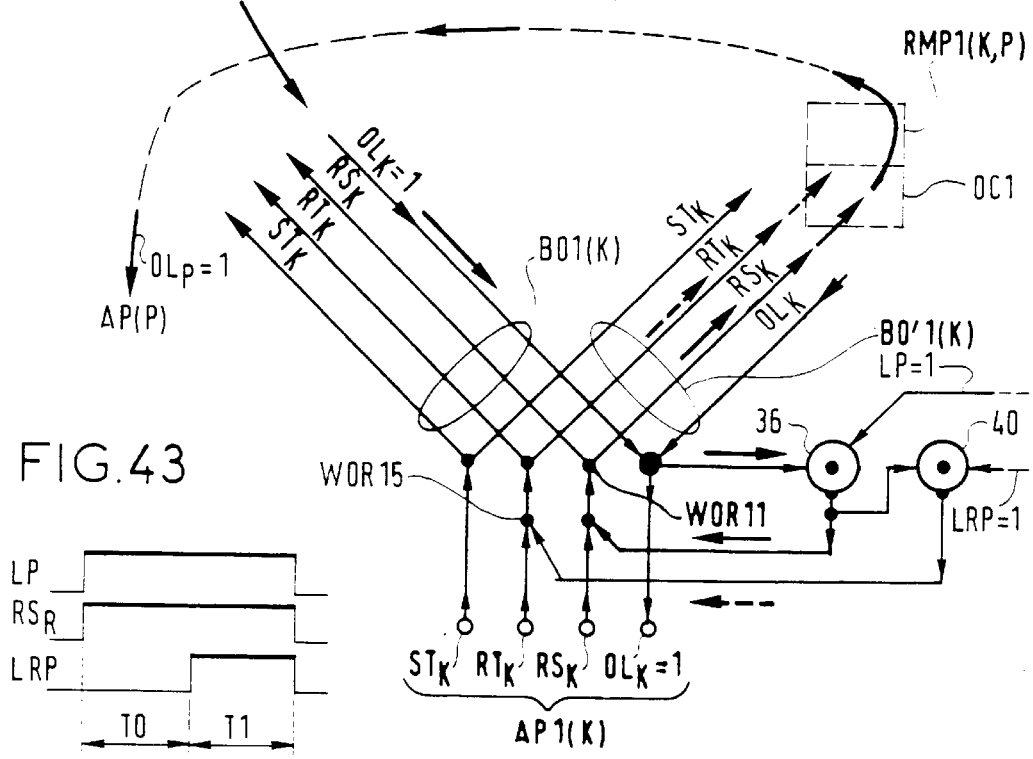
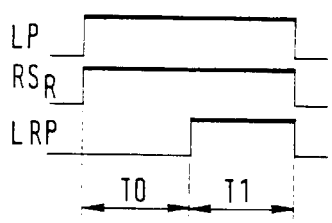
FIG.43

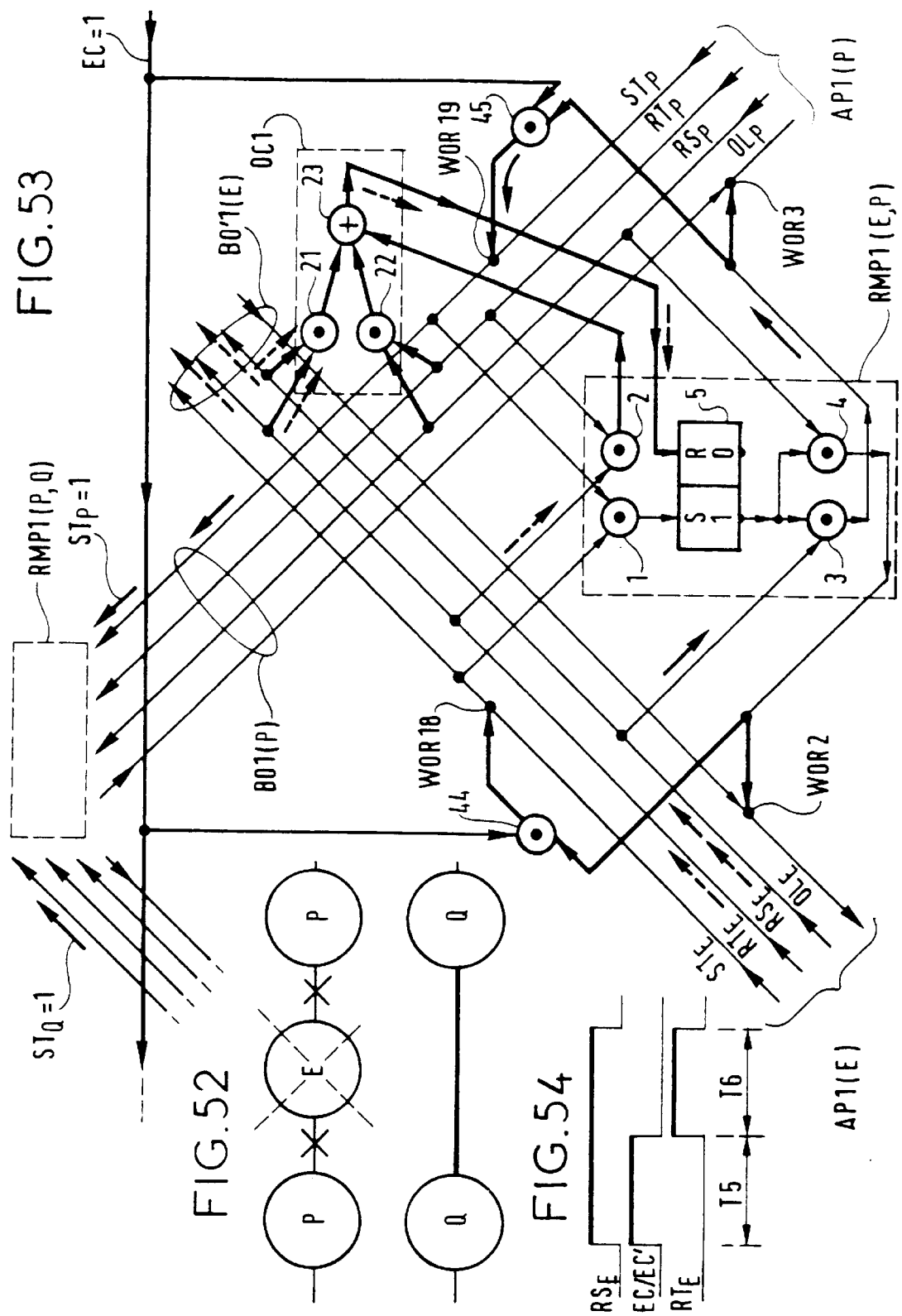

APPARATUS FOR MANAGING RELATIONSHIPS BETWEEN OBJECTS

The invention relates to an apparatus for managing relationships between objects that are individually identifiable in a finite address field, and more particularly to an apparatus for real time applications. Each relationship associates two objects belonging to the same set of objects, or belonging to two respective sets containing objects of the same type or of different types. The term "relationship" should be understood broadly since the particular relationship may vary as a function of the application under consideration. Also, a given object may be associated with one or more other objects by one or more relationships of different kinds.

A particularly important application lies in the field of telecommunications, and more particularly in the field of managing relationships between cells transferred in asynchronous mode. An asynchronous transfer mode (ATM) switching system includes one or more buffer memories for temporary storage of cells to be switched. The buffer memory is generally used as a queue, e.g. of the first-in first-out (FIFO) type. In this first example of an application, it is necessary to manage order relationships between the various locations of the buffer memory to indicate the queue order of cells which are stored in respective ones of said locations.

In this application, the relationship is of the type "next cell in the queue" and it associates one cell which is situated at a certain location in the buffer memory with another cell that is "next" and that is situated in some other location in the buffer memory. In general, for a buffer memory that is shared by a plurality of queues, that other location is not an adjacent location, since locations are released in an order which is random and they are reused as they are released.

Conventionally, the order of respective cells in a queue is managed by managing cell identifiers, such as the addresses of the memory locations containing the cells. For example, to store the queue order of cells stored in a buffer memory, their addresses are written in successive addresses of a so-called "address memory", which is write addressed by a write pointer incremented by unity after each write operation, and read addressed by a read pointer that is incremented by unity after each read operation. The order in which the addresses are written in consecutive rows of this memory determines the order in which the cells will be read back from the buffer memory.

Another conventional method for managing the order of cells in a queue consists in making up a list of addresses that are chained in a random access memory referred to as a "link memory". Locations in the link memory correspond to respective locations in the buffer memory. Each location in the link memory contains an address which is the next address to be used, both for reading the next cell in the buffer memory and for reading the next address to be used in the link memory. Such a method of managing order between cells is described, for example, in European patent application No. 0 441 787 (Henrion 18).

In those two conventional examples of managing the order between cells in a queue, the explicit identifiers used are cell addresses, while the relationships between cells remain implicit.

There exists another type of relationship which does not define a special order or a special classification of objects, but rather that they belong to the same subset or group of objects, with all of the objects of the subset under consideration having exactly the same characteristics with respect to this relationship. In the field of telecommunications, an example of such a relationship is to be found between cells that are to be restored by a buffer memory during the same time interval for the purpose of resequencing cells in an order corresponding to their order of arrival. When a cell arrives in the switching system under consideration, the system associates therewith a time label indicating the time interval during which the cell is to be restored on one of the outlets of the switching system. All of the cells which are associated with the same time label are then associated with said time label by a special relationship of the "belonging to a subset" type, without there being any order relationship between the various cells belonging to the set. Such a method of resequencing cells is described, for example, in European patent application No. 0 438 415 (Henrion 17).

To manage such groupings in a set of non-ordered objects, it is conventional to use:
- a queue memory in which the cells remain long enough for late cells to catch up with others having the same time label; and
- a stack to which all of the cells having said label are transferred in no particular order other than that of the time labels of each subset of cells.

Known methods of managing relationships between objects in sets of objects that are ordered or not ordered, are conventionally implemented by means of conventional random access memories or by means of contents-addressable memories. Implementing those known methods always reduces to storing object identifiers, not identifiers of relationships between objects. It is thus the manner in which object identifiers are stored, e.g. as a function of their order in a queue, which determines implicitly the order relationships between the objects. As a result, conventional apparatuses for managing objects by means of implicit relationships suffer from the following limitations:

The time required for executing management operations becomes prohibitive if it is necessary to manage a plurality of relationships during the same operation; for example to find and rearrange relationships when an object is to be added or removed from a given set.

Implementing apparatus for managing a plurality of relationships is extremely complex because the management of implicit relationships is distributed in a plurality of distinct memories containing object identifiers for the purpose of saving time by enabling operations to be performed in parallel. Complexity increases rapidly with the number of memories and with the number of parallel paths needed to interconnect the various accesses to the memories: conductors for selecting a memory element; conductors for controlling writing; and conductors for controlling reading.

The object of the invention is to propose apparatus for managing relationships between objects, which apparatus satisfies real time constraints better, and therefore makes it possible to consider management operations that are more complex than those performed at present (parallel execution and/or combined execution of a plurality of unit operations), implying one or more types of relationship within the same set of objects or within a structure comprising a plurality of sets of objects.

For example, in the field of asynchronous transfer mode switching systems, it may be advantageous to manage a plurality of relationships in an ordered set of cells, the relationships respectively indicating: the next cell, the preceding cell, the first cell of an ordered list, and the last cell of an ordered list. In a non-ordered subset of cells, it may be advantageous to manage relationships between a cell and each of the other cells, or between each cell and a cell considered as a reference for the subset under consideration. Managing such "belonging-to" relationships makes it possible to group cells together in different priority levels concerning cell loss and/or delay to apply to each cell; in cell resequencing groups; in outlet queues; etc.

The invention provides apparatus for managing relationships between individually identifiable objects in a finite address field, characterized in that for each pair of two distinct objects, referred to as a first object and a second object, and for each relationship that may associate these two objects, the apparatus includes a "relationship" memory element for storing "relationship" information indicating the existence or the non-existence of said relationship;

in that said relationship memory elements are structured in an array having at least two dimensions by means of a plurality of buses capable of conveying object selection signals and operation control signals, each element being situated at a cross-point between two "individual" buses, each individual bus corresponding to a respective object and being suitable for conveying at least one "selection" signal for selecting said object;

in that each element includes a logic circuit capable of receiving at least one selection signal and capable of receiving at least one operation control signal to write or read relationship information in said element; and in that the apparatus includes logic means coupled to bus access points to supply them with operation control signals, to supply them with object- selection signals, and to receive from them information read in the relationship memory elements.

in that the apparatus includes logic means coupled to bus access points to supply them with at least operation control signals and object selection signals; and to receive information read in the relationship memory elements.

The apparatus characterized in this way thus manages relationships between two objects directly, i.e. explicitly, instead of managing them indirectly, since each memory element serves to store or to restore the existence or the non-existence of a relationship between two objects by direct addressing, by activating individual buses corresponding to the objects.

The apparatus characterized in this way provides much faster processing speed than prior art apparatuses since it makes it possible to access relationship information directly by a bus array. This distributed array structure provides very fast access to each memory element corresponding to a relationship between two objects. Also, read activation of an individual bus corresponding to a given object gives access in a single operation to all of the memory elements storing the relationships established between said object and the other objects of the set. A single read operation thus makes it possible to know all of these relationships simultaneously. The time required is thus very short. Similarly a single write operation makes it possible to store the existence or the non-existence of a plurality of relationships simultaneously.

A preferred embodiment of the apparatus of the invention for managing relationships that are not necessarily symmetrical between two distinct objects in a set of objects comprising N objects, is characterized in that the individual buses comprise:

N column control buses, corresponding respectively to the N objects, and respectively controlling N columns of elements;

N row control buses, corresponding to the N objects, and respectively controlling N rows of elements; each row control bus having a cross-point with each column control bus; and in that the relationship management apparatus comprises N(N−1) memory elements for each relationship capable of relating two out of N distinct objects; said elements being situated at cross-points between the column control buses and the row control buses, with the exception of cross-points situated on a diagonal of the array.

Another preferred embodiment of the apparatus of the invention for managing symmetrical relationships in a set of N objects is characterized in that it comprises N individual buses corresponding respectively to the N objects, each individual bus having a first branch and a second branch sharing a common end; and each individual bus having a cross-point with each of the other buses of said N buses;

in that the relationship management apparatus includes $$\frac{1}{2} N(N-1)$$

relationship memory elements, for each symmetrical relationship that may associate two distinct objects in said set of N objects;

in that the memory elements storing the relationship information between the objects of rank i=1 to K−1 and the object of rank K, for K lying in the range 1 to N, are situated at cross-points between the first branch of the individual bus corresponding to said object of rank K, and the second branches of the respective individual buses corresponding to the objects of ranks i=1 to K−1; and in that the memory elements storing relationship information between the object of rank K and the objects of ranks j=K+1 to N are situated at cross-points between the second branch of the individual bus corresponding to said object of rank K, and the first branches of the respective individual buses corresponding to the objects of ranks j=K+1 to N.

This embodiment presents the advantage of being particularly simple since it makes it possible with N access points to manage symmetrical relationships between N objects, while using only ½(N²−N) memory elements. It is usable for most relationships since they are generally symmetrical. For example, if a cell A is placed in front of a cell B, then it is clear that the cell B is placed behind the cell A when use is made of the cells being sequenced in a known order. There is then no need to store both of these redundant relationships.

In certain particular applications, this structure also makes it possible to gain access simultaneously to relationships between first and second subsets of the set of memory elements without simultaneously accessing the relationships between the objects within the same subset. Access is then both fast and selective.

The invention will be better understood and other characteristics will appear from the following description of embodiments and from the accompanying drawings:

FIG. 42 is a diagram summarizing a variant embodiment of the access point shown in FIG. 6, which variant makes it possible to perform the fourth complex operation;

FIG. 43 is a timing diagram showing how this variant operates;

FIG. 52 shows a sixth complex operation consisting in removing a known object E from a linear chain of objects related by relationships without knowing its adjacent objects, and in automatically establishing a direct relationship between the two possible adjacent objects that flanked the removed object;

FIG. 53 is a diagram summarizing a variant of the first embodiment, which variant includes additional logic means compared with the variant shown in FIG. 30, so as to make it possible to perform the sixth complex operation;

FIG. 54 is a timing diagram showing how this variant operates;

Figure 56:
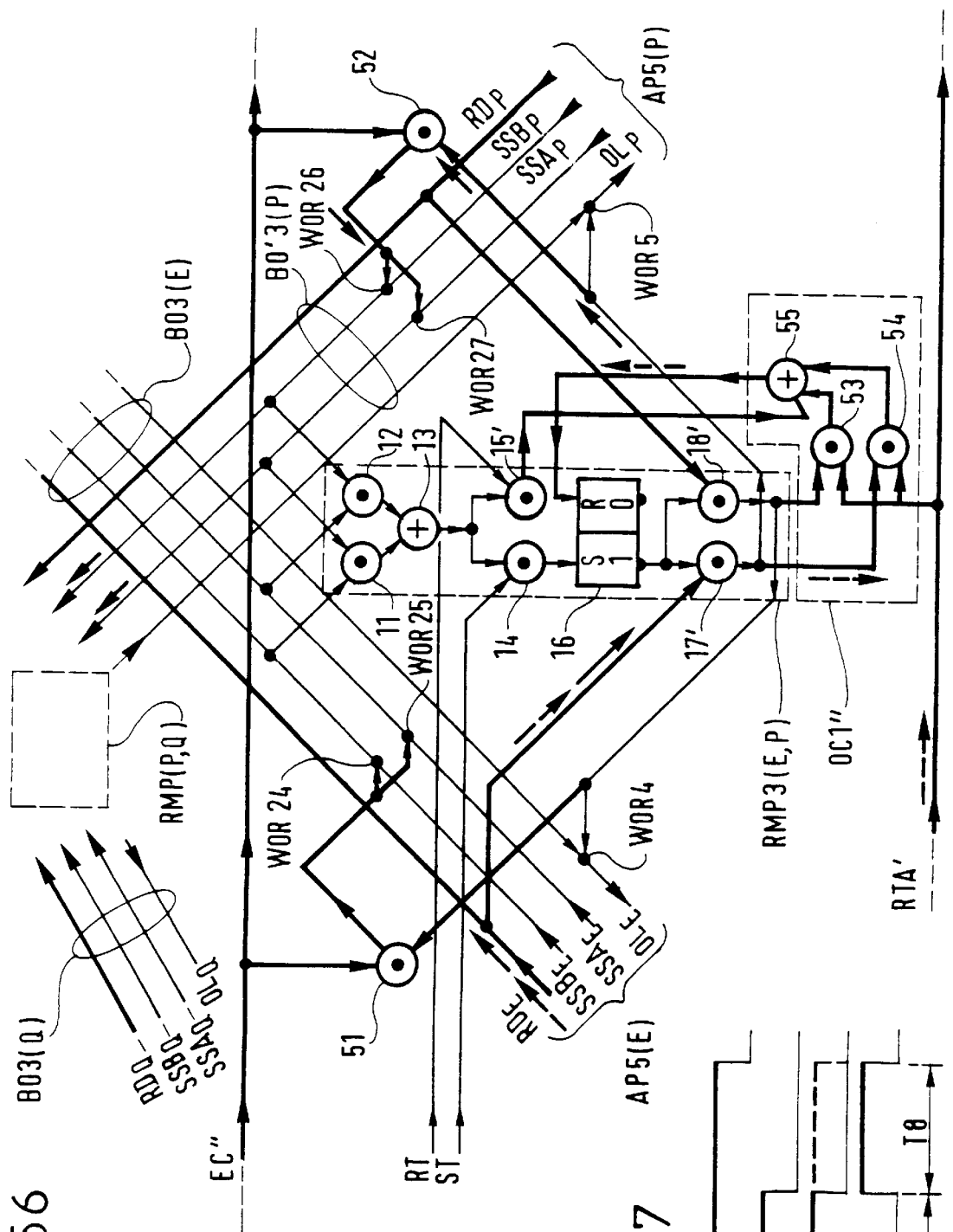
Figure 57:
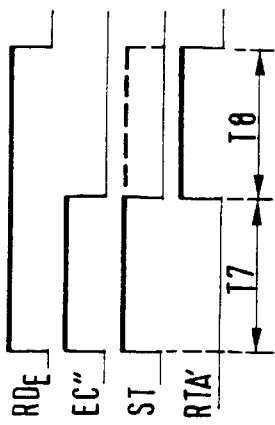
Figure 58:
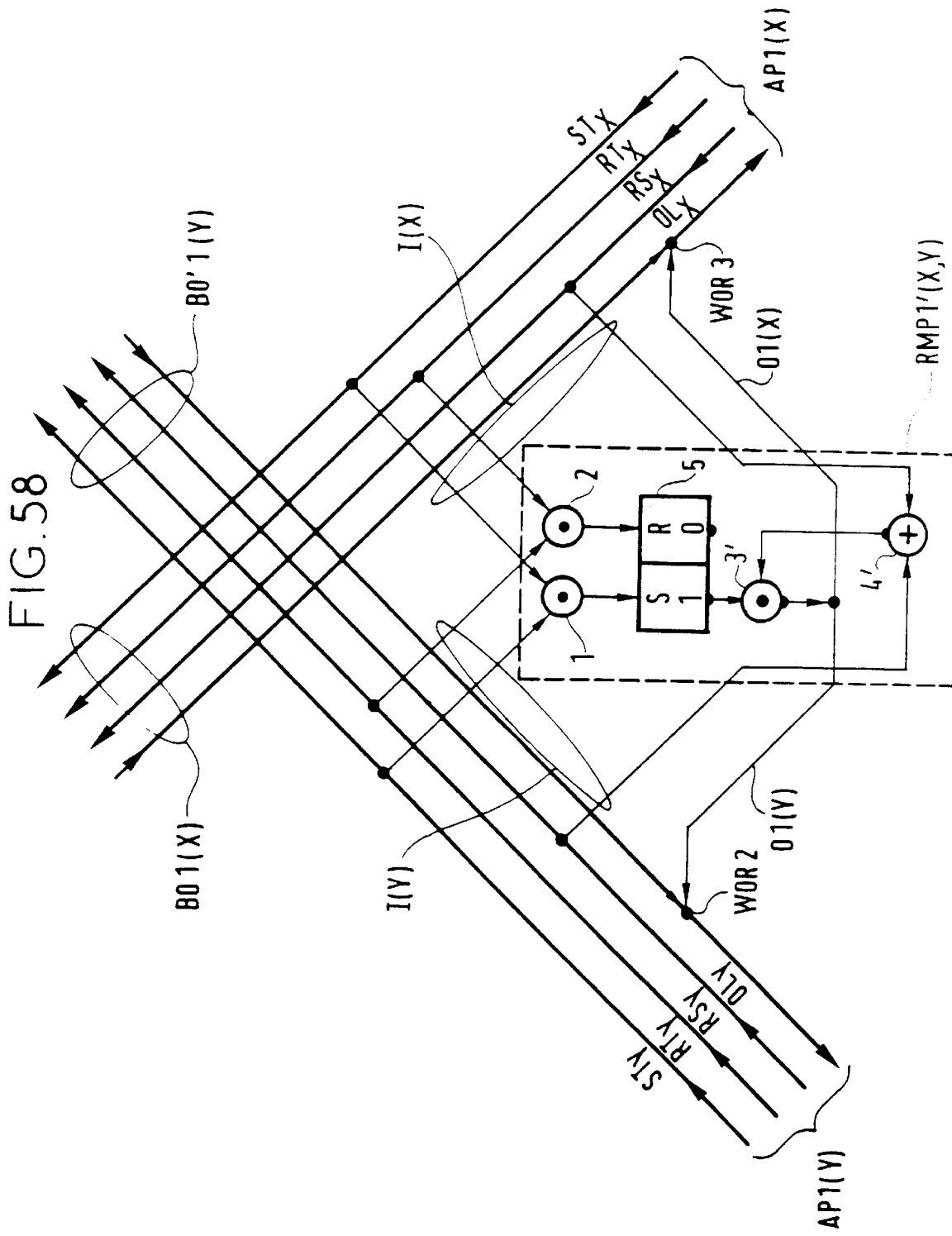
Figure 59:
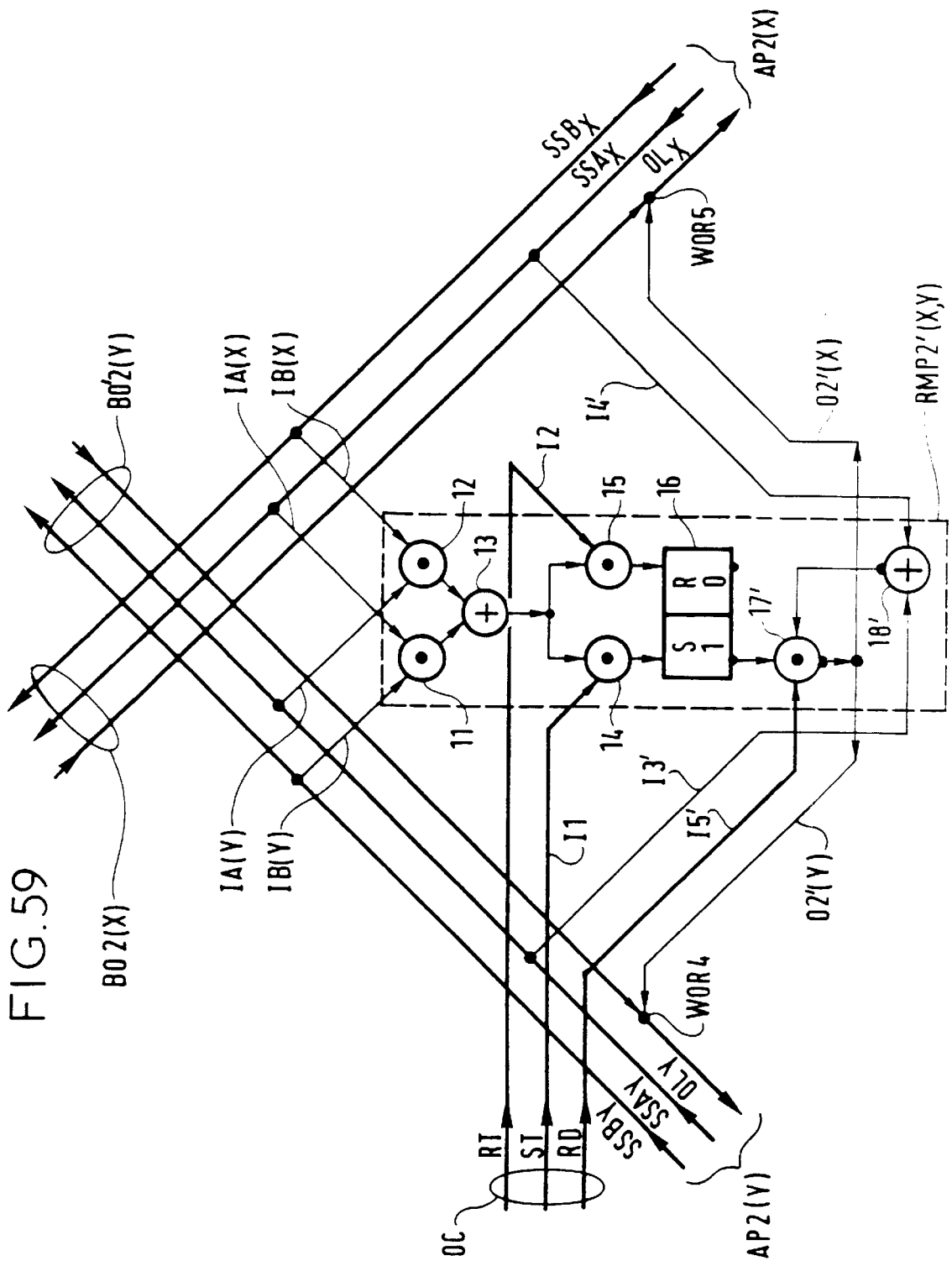

FIG. 56 is a diagram summarizing a third embodiment of a relationship memory element for the apparatus of the invention, this variant including additional logic means making it possible to perform the first complex operation and the sixth complex operation, i.e. releasing all of the relationships existing between a given object and any other object, then automatically establishing relationships between the objects which were previously related indirectly via the given object;

FIG. 57 is a timing diagram showing how the variant operates for performing the sixth complex operation; and FIGS. 58 and 59 respectively show variants of the first and second embodiment.

Figure 1:
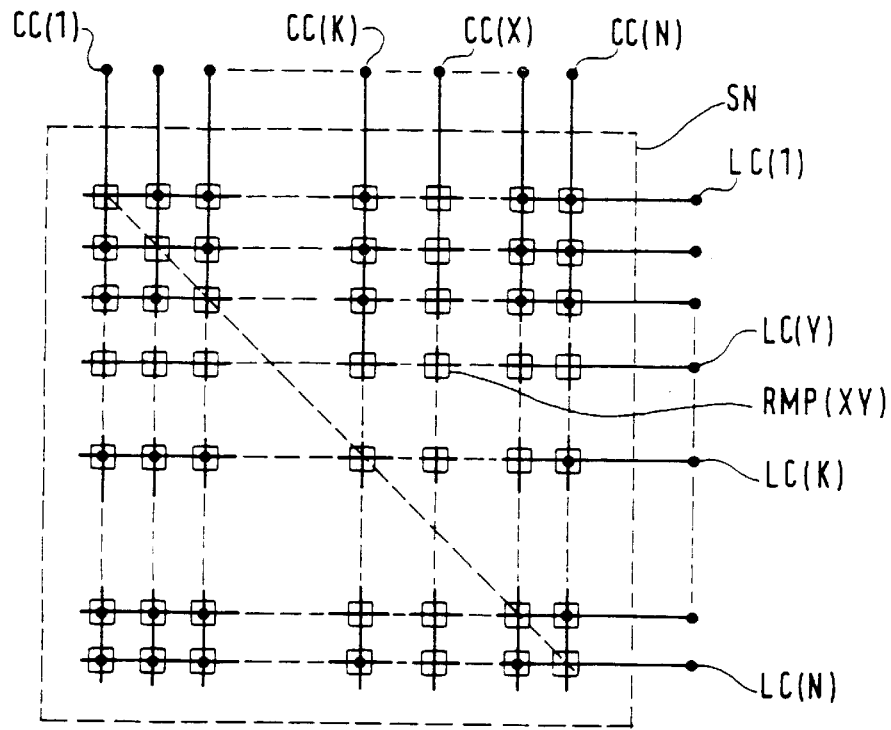
FIGS. 1 to 4 are diagrams summarizing four embodiments of the apparatus of the invention.

FIG. 1 is a diagram summarizing a portion of a non-optimized first embodiment of the apparatus of the invention. This portion comprises a square array SN constituted by a matrix of memory elements RMP, each element storing the existence or the non-existence of a relationship that could associate two objects belonging to the same set E constituted by N objects that are respectively identifiable by N distinct identifiers: Nos. 1, . . . , N. Initially, we consider the case of a uniform set E, i.e. a set made up of objects belonging to a single category. For example, they may all be cells or they may all be time intervals.

The logic circuits that make use of the stored information are not shown. The array SN has N rows and N columns, each row and each column comprising N elements RMP. The elements RMP are placed at the cross-points of row buses LC(1) . . . LC(N) serving the respective rows of the matrix and column buses CC(1) . . . CC(N) serving respective columns of the matrix.

The existence of a relationship, e.g. between the Xth object and the Yth object, taken in that order, is stored by writing a 1-value bit in the element RMP(X,Y) situated at the cross-point between buses CC(X) and LC(Y). The existence or the non-existence of a relationship between these two objects can be determined by reading the contents of this element.

Write and read control of the buses is described below. The term "bus" is used to cover any conventional means for conveying the same signal to or from a set of memory elements. The simplest embodiment comprises one conductor per signal, but other conventional embodiments implementing multiplexing can be used in apparatus of the invention.

Such a structure requires $N^2$ memory elements RMP for a set E constituted by N objects. It can quickly be seen that some of the elements are not useful. Those situated on the diagonal of the matrix, shown in dashed lines, are not useful since no object has a relationship with itself. Also, the relationships encountered in practice are generally symmetrical relationships: being reciprocal or inverse. For reciprocal relationships, if an object X has a certain relationship with an object Y, then the object Y has the same relationship with the object X. For example, the relationship "identical to" is symmetrical. For inverse relationships, if the object X has a certain relationship with the object Y, then Y has a fully specified inverse relationship with the object X. For example, considering the order of arrival of a sequence of objects in the context of processing said objects sequentially in the order of their arrival: if an object X arrived before an object Y, then it can be deduced implicitly that the object Y arrived after the object X, and it is therefore not necessary to store the existence of the second relationship.

Figure 2:
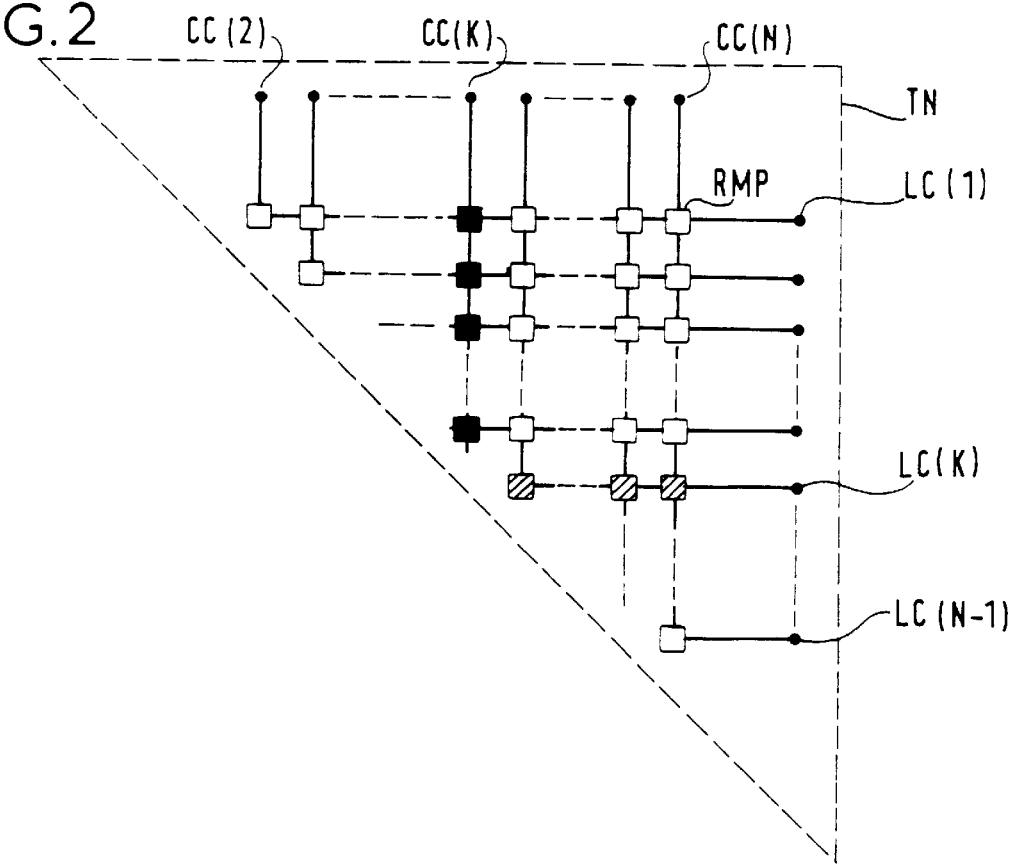

FIG. 2 is a diagram summarizing a portion of a second embodiment of the apparatus of the invention, optimized for a symmetrical relationship. It comprises a triangular array TN of memory elements. As in FIG. 1, the logic circuits that make use of the stored information are not shown. The matrix of memory elements has been simplified by omitting the memory elements situated on the diagonal and those situated on one-half of the matrix, as defined by said diagonal. The buses CC(1) and LC(N) are omitted since neither of them serves any memory elements.

For example, by using the column bus CC(K) and the row bus LC(1) . . . LC(K–1), for given K less than or equal to N, it is possible to write or read information representing the existence or the non-existence of a relationship between an object of rank K and K–1 other objects Nos. 1, . . . , K–1. The corresponding elements RMP are shown in black. Below, the object of rank K is called object K.

By using the column buses CC(K+1), . . . , CC(N) and the row bus LC(K), it is also possible to write or to read in the elements RMP information indicating the existence or the non-existence of relationships between object K and the objects K+1, . . . , N. The corresponding elements RMP are shown with shading. It can thus be seen that the buses CC(K) and LC(K) are used simultaneously for writing or reading information concerning relationships between the object K and all of the other objects in the set of objects 1, . . . , N. It is possible to connect these two buses together at a common point referred to below as the access point for object K, and written AP(K).

Figure 3:
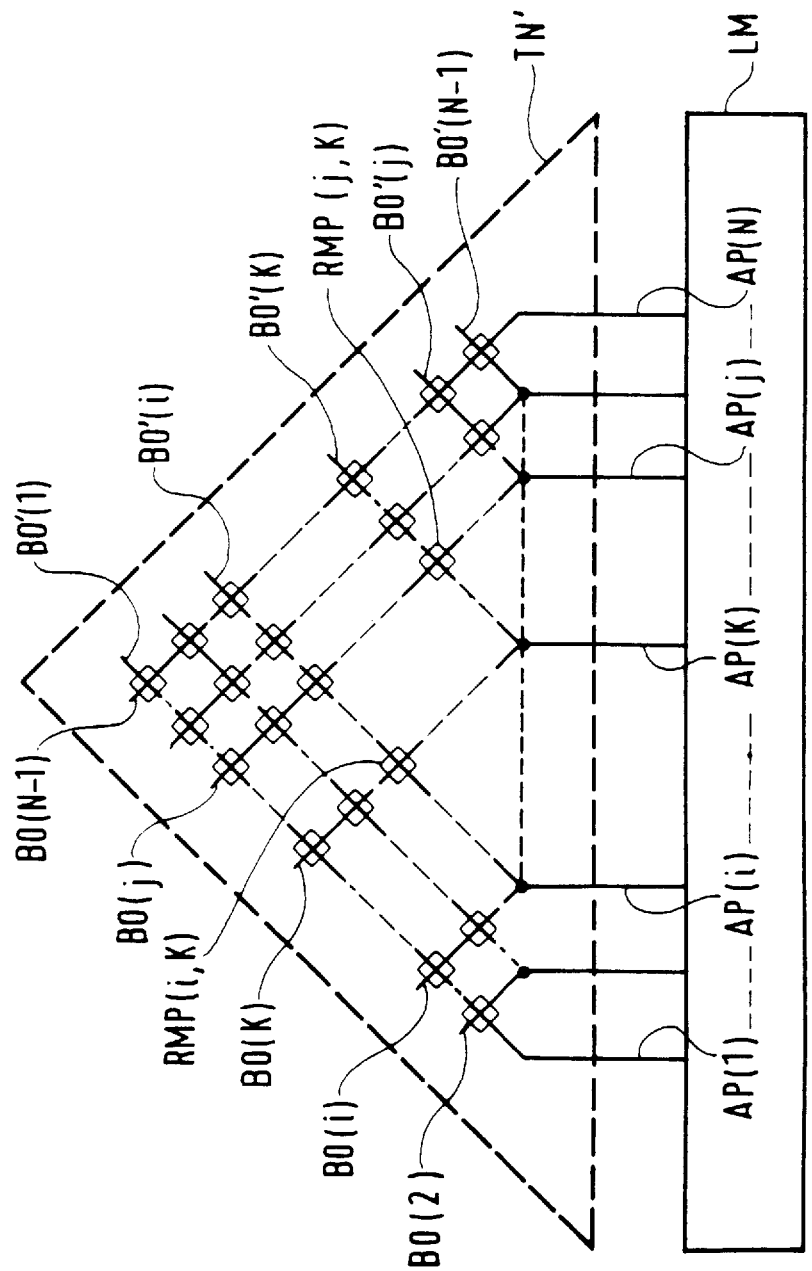

FIG. 3 is a diagram summarizing a third embodiment of the apparatus of the invention that is optimized for a symmetrical relationship and in which there is only one access point AP(K) for each object K, with K lying in the range 1 to N. It comprises a triangular array TN' having, for example, the form of a right-angle triangle. The N column buses CC(X) and the N row buses LC(Y) are replaced by N "orthogonal" buses each comprising two mutually orthogonal branches sharing a common end connected to an access point. Each orthogonal bus corresponds to a respective object. For example, access point AP(K) corresponding to the object of rank K in a set of N objects is connected to an orthogonal bus comprising a branch BO(K) and a branch BO'(K) which branches are respectively parallel to the two sides of the array TN' that are at right angles.

To store information representing the existence or the non-existence of a symmetrical relationship between two distinct objects selected from N, this array TN' comprises $$\frac{1}{2} N(N-1)$$

memory elements RMP. The memory elements RMP(i,K) that store relationship information between the object of rank K, for K selected in the range 1 to N, and the objects of ranks i=1 to K–1, are situated at the respective cross-points between the branch BO(K) and the branches BO'(i) of the respective orthogonal buses corresponding to objects of ranks i=1 to K–1. The memory elements RMP(j,K) that store relationship information between the object of rank K and the objects of ranks j=K+1 to N are situated at the cross-points between the branch BO'(K) of the orthogonal bus corresponding to the object of rank K, and the branches BO(j) of the respective control buses corresponding to the objects of ranks j=K+1 to N.

All of the access points AP(1), . . . , AP(N) of the triangular array TN' are connected to logic means LM to provide the control buses with read control signals and write control signals to manage the relationships between the objects.

Below, only symmetrical relationships are considered and the memory element storing the existence or the non-existence of a relationship between an object X and an object Y, and the symmetrical relationship, is written RMP(X,Y) or RMP(Y,X).

The examples of array structure described herein have control buses in the form of mutually orthogonal straight segments. However any other form could be used providing each bus corresponding to an object has at least one cross-point with each of the control buses corresponding to the other objects, since each memory element must be situated at a cross-point between two buses.

Figure 4:
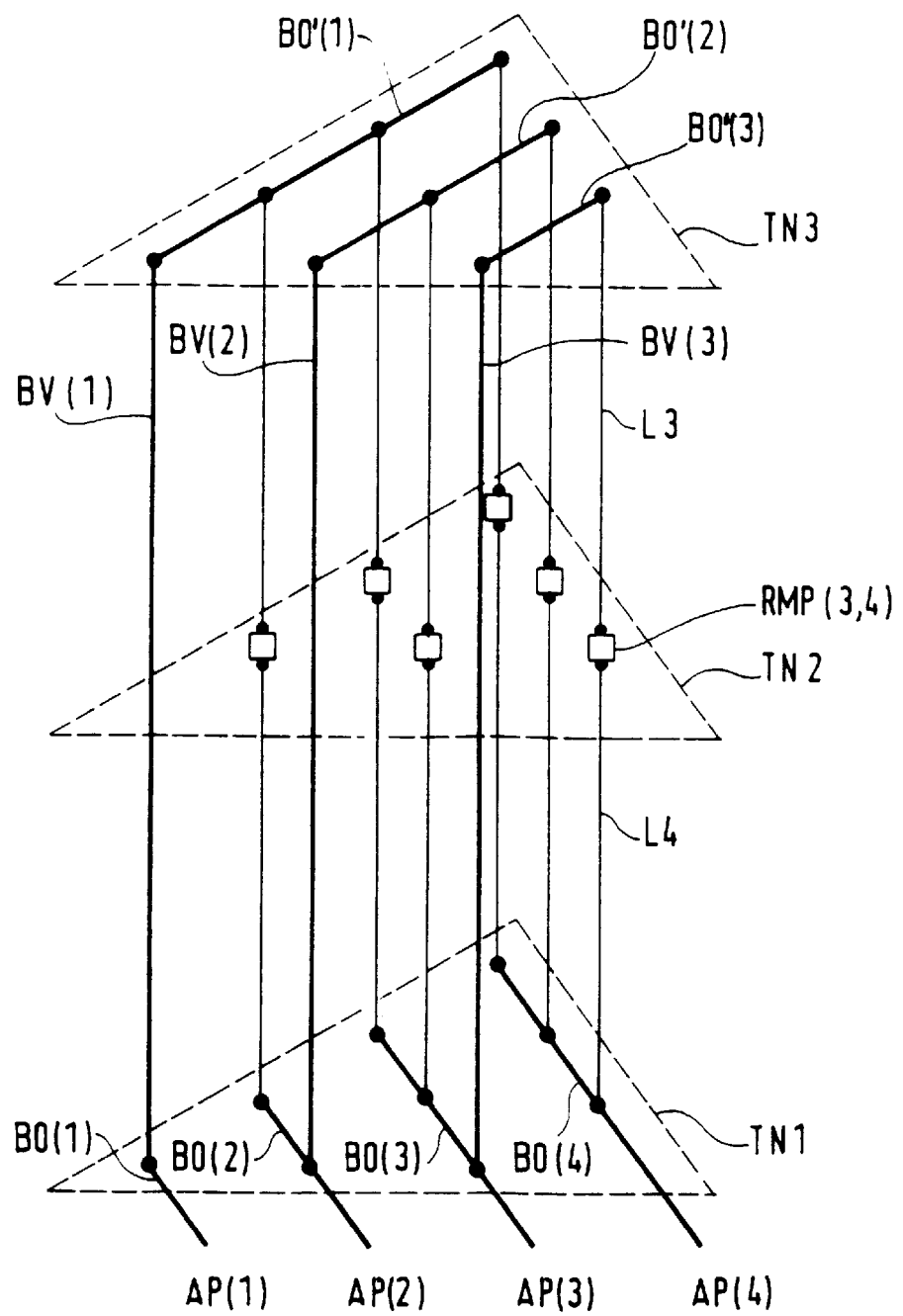

FIG. 4 is a perspective diagram summarizing a fourth embodiment of the array which is distributed over three space dimensions. This embodiment is optimized for a symmetrical relationship between four objects No. 1, . . . , No. 4. It comprises four orthogonal buses each constituted by a first branch and a second branch, with the exception of one of the buses in which the second branch is not useful. This fourth embodiment comprises three superposed triangular layers:

- a layer TN1 in which the first branches BO(1), . . . , BO(4) of the orthogonal buses are situated;
- a layer TN2 in which six relationship memory elements are situated such as the element RMP(3,4) which stores the existence or the non-existence of a relationship between object No. 3 and object No. 4; and
- a layer TN3 in which the second branches BO'(1), BO'(2), and BO'(3) of the orthogonal buses are situated.

The first branches BO(1), . . . , BO(4) are connected respectively to four access points AP(1), . . . , AP(4). The branches BO(1), BO(2), and BO(3) are respectively connected to the second branches BO'(1), BO'(2), and BO'(3) by buses BV(1), BV(2), and BV(3) which are orthogonal to the planes of the three layers. Each memory element is connected to the first branch of an orthogonal bus and to the second branch of another orthogonal bus by a plurality of links which are orthogonal to the planes of the layers TN1, TN2, and TN3. For example, memory element RMP(3,4) is connected to branch BO'(3) by a plurality of links L3; and it is connected to the branch BO(4) by a plurality of links L4.

In the same set of N objects, two types of relationship may exist simultaneously between objects: relationships which are mutually exclusive, and relationships which are not exclusive:

When all of the relationships are exclusive, i.e. if there can be only one relationship between two objects in the set belonging to two given categories at any instant, the nature of the relationship between two objects can remain implicit since it can be deduced from the category of each of the two objects. A single relationship memory element can then manage the existence of a relationship between two objects whatever the nature of the relationship. For example, when each of the two objects is either a cell or a time position, there exists three kinds of relationship which are exclusive depending on whether the two objects both belong to the same "cell" category, or both belong to the same "time position" category, or belong respectively to the "cell" category and to the "time position" category.

When the relationships are non-exclusive, and therefore capable of existing simultaneously between two given objects, the array of the management apparatus must include a plurality of memory elements per pair of objects in order to be able to store the existence or non-existence of each of the possible relationships. This array comprises either one memory element per relationship, or else a restricted number of memory elements, with the data representing the existence or the non-existence of each relationship being encoded. For example, the existence or non-existence of six relationships called relationships of types 1, 2, 3, . . . , 6 can be encoded and stored by means of three memory elements by storing the following binary words:

| | |
|---|---|
| 000 | No relationship |
| 001 | Relationship of type 1 |
| 010 | Relationship of type 2 |
| 011 | Relationship of type 3 |
| 100 | Relationships of types 2 and 3 |
| 101 | Relationships of types 2 and 4 |
| 110 | Relationship of type 5 |
| 111 | Relationships of types 5 and 6 |

Figure 5:
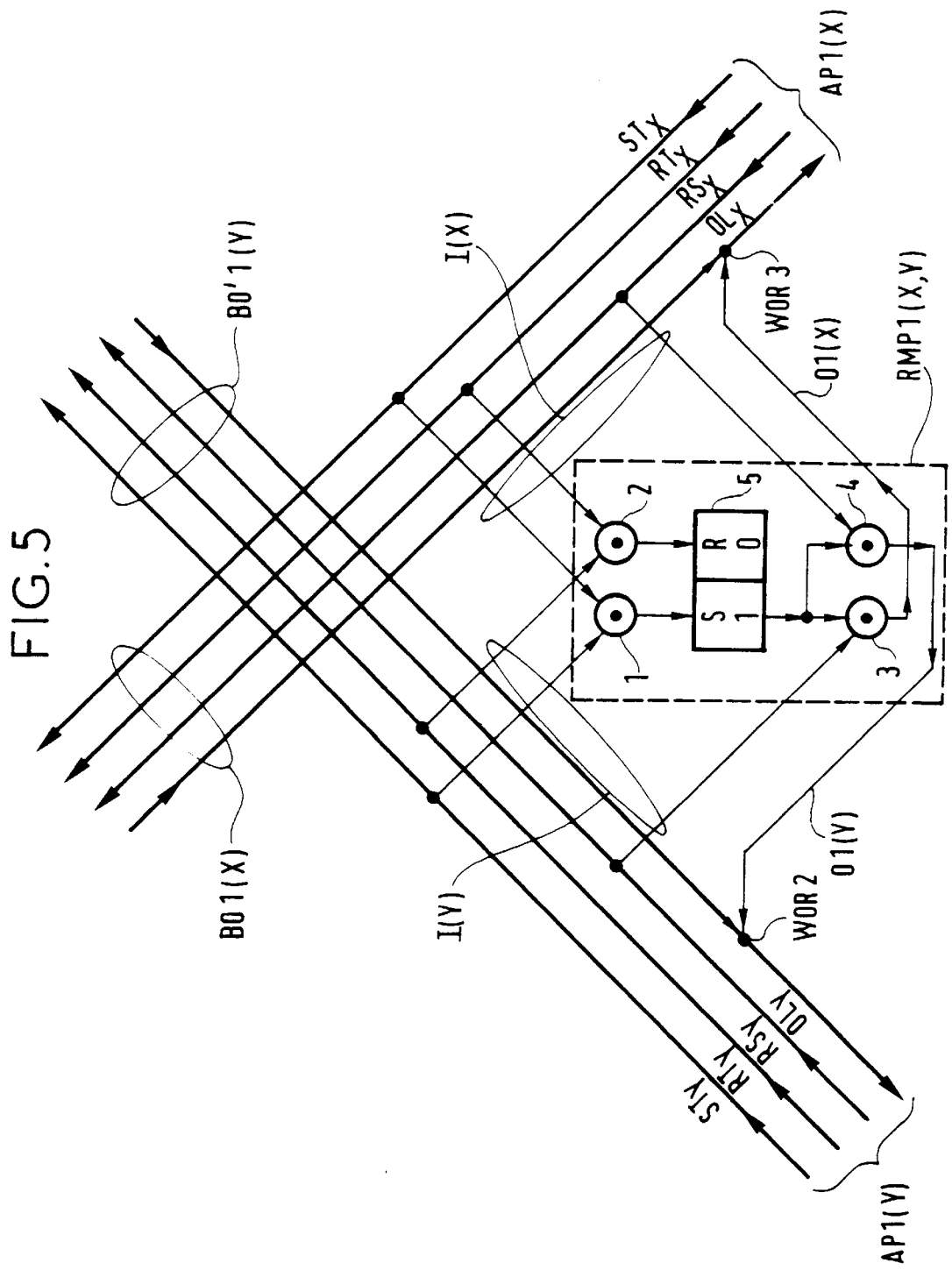
FIG. 5 is a diagram summarizing a first embodiment of a relationship memory element for the apparatus of the invention.

FIG. 5 is a diagram summarizing an embodiment of a memory element referenced RMP1(X,Y). It may be used in any of the embodiments described above, SN, TN, or TN'.

For example, this element RMP1(X,Y) is situated at the cross-point between a branch BO1(X) of an orthogonal bus connected to an access point AP1(X) corresponding to an object X, and a branch BO'1(Y) of another orthogonal bus connected to an access point AP1(Y) corresponding to an object Y. These two buses cross without being connected together. In the embodiments described below, the buses are of the type comprising one conductor per signal to be conveyed. However the person skilled in the art could replace them by other bus arrangements using conventional techniques, e.g. for enabling the number of conductors to be reduced.

The element RMP1(X,Y) comprises:

- a first input I(Y) receiving three signals $ST_y$, $RT_y$, and $RS_y$; in this example, this input comprises three conductors which are connected respectively to three conductors of the branch BO'1(Y), respectively conveying these three signals in this example;
- a second input I(X) receiving three signals $ST_x$, $RT_x$, and $RS_x$; in this example, this input comprises three conductors which are connected respectively to three conductors of the branch BO1(X), respectively conveying these three signals in this example;
- a first output O1(Y) connected to one of the conductors of the branch BO'1(Y) conveying the signal $OL_y$, said conductor of the branch BO'1(Y) constituting a wired-OR WOR2;
- a second output O1(X) connected to a conductor of the branch BO1(X) conveying a signal $OL_x$, this conductor constituting a wired-OR WOR3;
- a bistable 5 having a set input S, a reset input R, and an output referenced 1;
- a logic AND gate 1 having two inputs and one output, which output is connected to the S input of the bistable 5;
- a logic AND gate 2 having two inputs and one output, which output is connected to the R input of the bistable 5;
- a logic AND gate 3 having two inputs and one output, which output constitutes the output O1(X); and
- a logic AND gate 4 having two inputs and one output, which output constitutes the output O1(Y).

The two inputs of the gate 1 are connected respectively to the conductor of the branch BO'1(Y) supplying the signal $ST_y$ and to the conductor of the branch BO1(X) supplying the signal $ST_x$, so as to set the bistable 5 when the signals $ST_y$ and $ST_x$ are applied simultaneously to the respective access points AP1(X) and AP1(Y) corresponding to the objects X and Y. The two inputs of the gate 2 are connected respectively to the conductor of the branch BO'1(Y) which supplies the signal $RT_y$ and to the conductor of the branch BO1(X) which supplies the signal $RT_x$ so as to reset the bistable 5 when the signals $RT_y$ and $RT_x$ are applied simultaneously to the respective access points AP1(X) and AP1 (Y) corresponding to the objects X and Y.

The two inputs of the gate 3 are connected respectively to the output 1 of the bistable 5 which supplies a 1 when said bistable is set, and to the conductor of the branch BO'1(Y) which supplies the signal $RS_y$. The gate 1 conveys to the output O1(X) the bit stored by the bistable 5 whenever the signal $RS_y$ is applied to the access point AP1(Y) corresponding to the object Y for the purpose of receiving the value of said bit on the access point AP1(X) corresponding to the object X, said bit constituting the signal $OL_x$.

The two inputs of the gate 4 are connected respectively to the output 1 of the bistable 5 and to the conductor of the branch BO1(X) which supplies the signal $RS_x$. The gate 4 conveys to the output O1(Y) the bit stored by the bistable 5 whenever the signal $RS_x$ is applied to the access point AP1(X) so as to receive the value of said bit on the access point AP1(Y) corresponding to the object Y, with the value of said bit constituting the signal $OL_y$.

This embodiment RMP1(X,Y) thus serves to store a 1-value bit in the bistable 5 when both signals $ST_x$ and $ST_y$ are active simultaneously; or to store a 0-value bit when both signals $RT_x$ and $RT_y$ are active simultaneously; or to read the bit stored in the bistable 5 from the access AP1(Y) corresponding to the object Y if reading is controlled by the signal $RS_x$, or to read it from the access point AP1(X) corresponding to the object X if reading is controlled by the signal $RS_y$. In this first embodiment, each bus corresponding to an object conveys signals that perform two functions simultaneously: selecting the object and controlling an operation.

Figure 6:
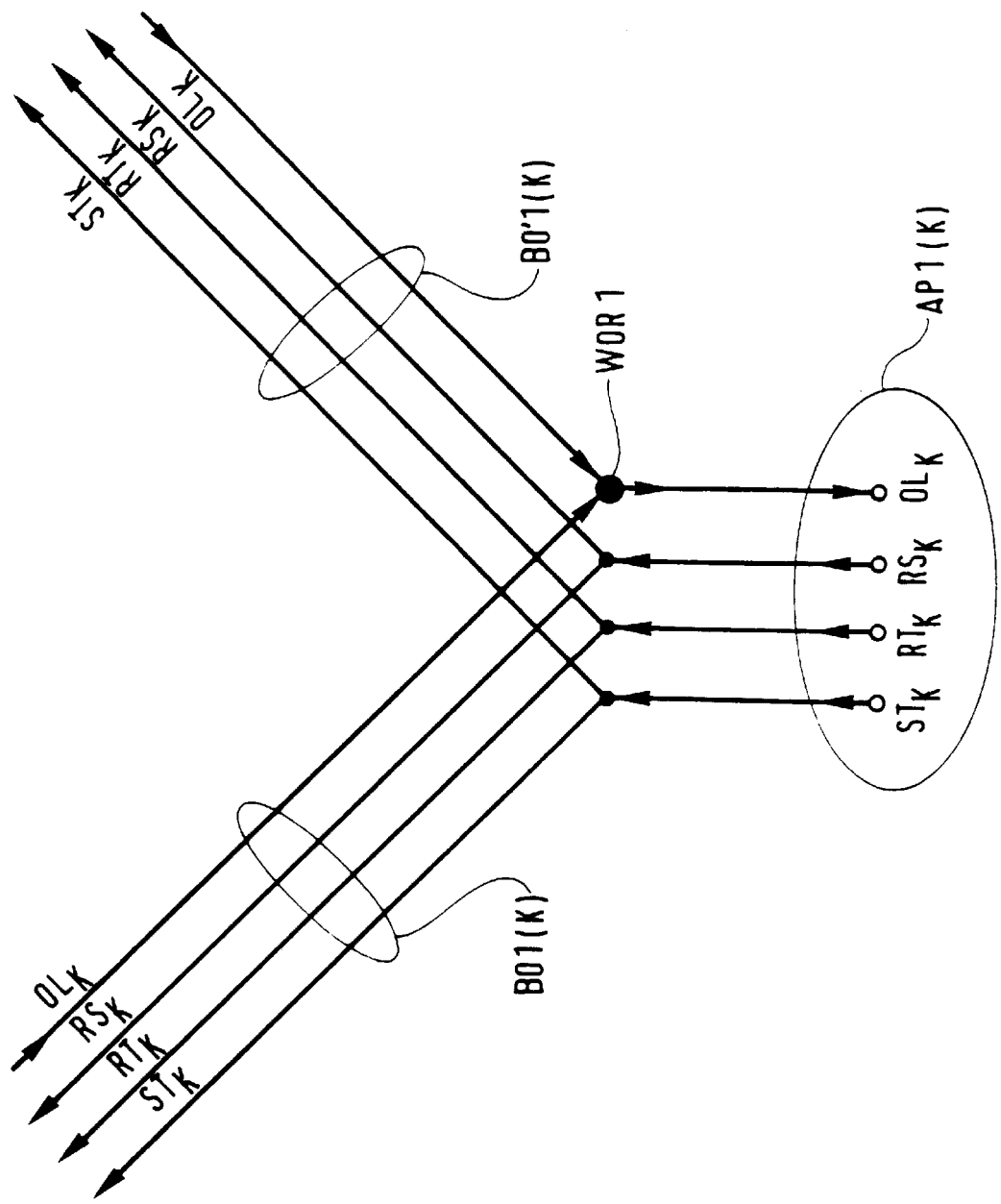
FIG. 6 shows an "orthogonal" bus and an access point corresponding to a given object, for controlling the embodiment shown in FIG. 5.

FIG. 6 shows by way of example the orthogonal bus constituted by the branches BO(K) and BO'1(K), together with the access AP1(K), all corresponding to the object K. This access has four conductors which are connected respectively to the four conductors constituting the branch BO1 (K), and to the four conductors constituting the branch BO'1(K). These conductors enable the following management operations to be performed:

writing information, e.g. one bit of value 1, indicating the existence of a relationship between the object K and another object;

writing information, e.g. a bit of value 0, indicating the non-existence of a relationship between the object K and another object; and reading information, e.g. the value of one bit that indicates the existence or the non-existence of a relationship between the object K and another object.

To perform such operations, the control signals applied to the access point AP(K) are respectively the following:

a set control signal $ST_K$;

a reset control signal $RT_K$; and a read control signal $RS_K$.

A fourth conductor of the access AP1(K) is an output delivering a binary signal $OL_K$, to the logic circuits LM giving the result of reading in one or more memory elements, with the conductors $OL_K$, of the branches BO1(K) and BO'1(K) constituting a wired-OR, referenced WOR1 in the figure.

Figure 7:
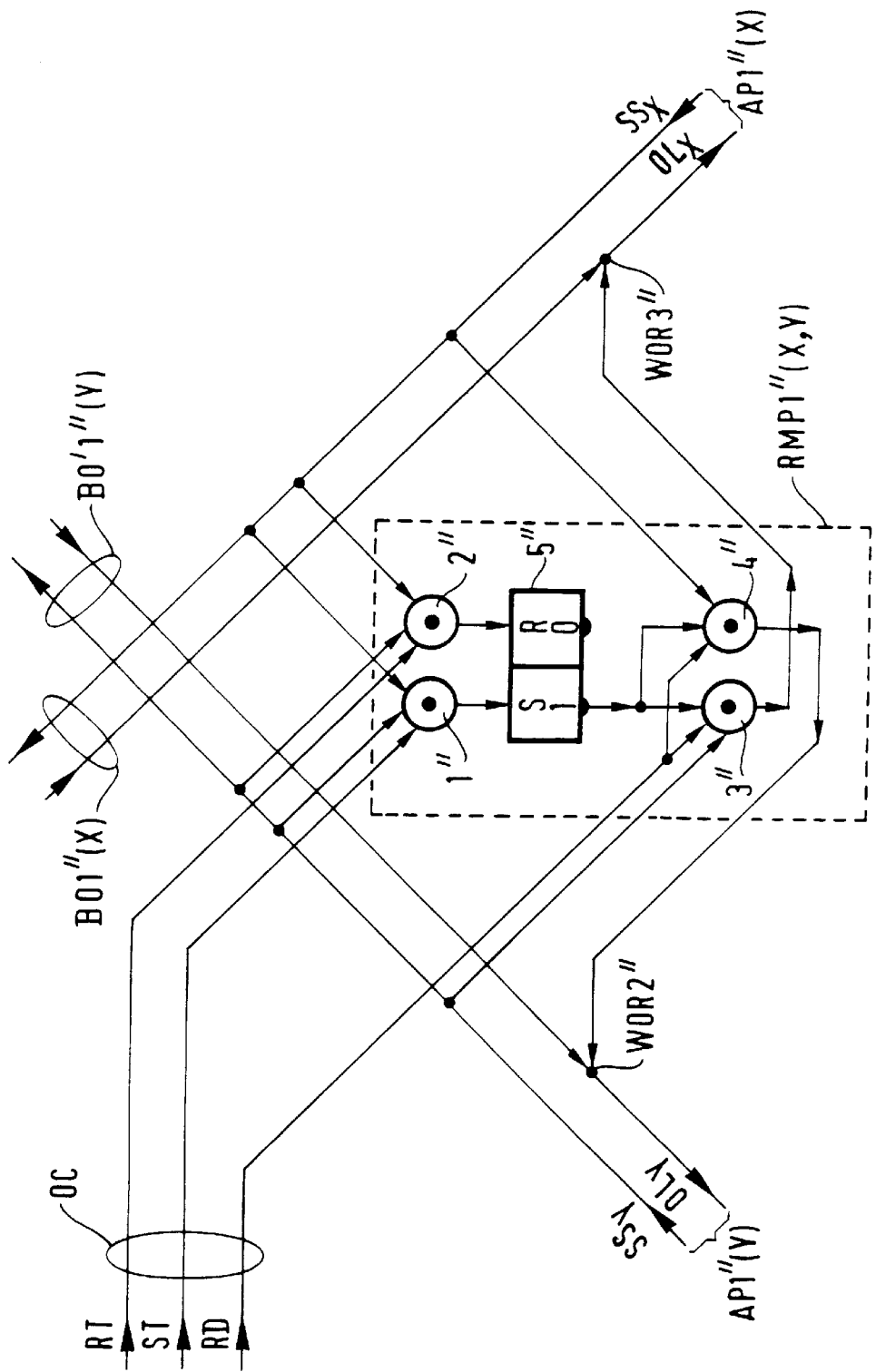
FIG. 7 is a diagram summarizing a variant of the first embodiment shown in FIG. 5.

FIG. 7 is a diagram summarizing a variant RMP1"(X,Y) of the first embodiment. In this variant, the number of signals conveyed by the buses corresponding to the respective objects is minimized, however there is an additional bus OC which is common to all of the objects and which is connected to all of the relationship memory elements. The element RMP1"(X,Y) is situated at the cross-point of a branch BO1"(X) of an orthogonal bus connected to an access point AP1"(X) corresponding to an object X, and a branch BO'1"(Y) of another orthogonal bus connected to an access point AP1"(Y) corresponding to an object Y. Each branch has only two conductors, one conveying a selection signal for selecting all of the elements corresponding to a given object, and the other conveying a read output signal for the given object. The common bus OC has one conductor for each of the operations to be controlled:

one conductor conveys a signal RT for controlling the writing of a 0 value indicating the non-existence of a relationship;

one conductor conveying a signal ST for controlling the writing of a 1 value indicating the existence of a relationship; and one conductor conveying a signal RD for controlling reading of relationship information.

In this variant RMP1" of the first embodiment, there is thus total separation between object selection signals $SS_X$ and $SS_Y$ and common signals for operation control: RT, ST, RD.

In other variant embodiments, partial separation of those two functions could be envisaged.

The memory element RMP1"(X,Y) comprises:

a bistable 5" having a set input S, a reset input R, and an output referenced 1;

a logic AND gate 1" having three inputs and one output, which output is connected to the S input of the bistable 5";

a logic AND gate 2" having three inputs and one output, which output is connected to the R input of the bistable 5";

a logic AND gate 3" having three inputs and one output, which output constitutes an output from the element RMP1"(X,Y) and is connected to a conductor of the branch BO1"(X), said conductor conveying a read output signal $OL_X$ and constituting a wired-OR WOR3"; and a logic AND gate 4" having three inputs and one output, which output constitutes an output from the element RMP1"(X,Y) which is connected to a conductor of the branch BO'1"(Y) conveying a read output signal $OL_Y$ and constituting a wired-OR WOR2".

A first input of the gate 1" is connected to one of the conductors of the branch BO'1"(Y) to receive an addressing signal $SS_Y$. A second input of the gate 1" is connected to a conductor of the branch BO1"(X) to receive an addressing signal $SS_X$. A first input and a second input of the gate 2" are connected respectively in the same manner. Whatever the type of operation that is to be performed, writing a 1 or a 0 in the bistable 5", a particular element RMP1"(X,Y) is selected by providing simultaneously a selection signal $SS_X=1$ on access point AP1"(X) and a selection signal $SS_Y=1$ on access point AP1"(Y) corresponding to the object Y. The nature of the operation performed is determined by an operation control signal applied to the common bus OC. The third input of the gate 1" is connected to the common bus conductor OC for receiving the signal ST to write a 1-value in the bistable 5" when the three signals $SS_Y$, $SS_X$, and ST are active simultaneously. The third input of the gate 2" is connected to the conductor of the common bus OC providing the signal RT to write a value 0 in the bistable 5" when the three signals $SS_Y$, $SS_X$, and RT are active simultaneously.

A first input of each of the gates 3" and 4" is connected to the output 1 of the bistable 5". A second input of the gate 3" is connected to the conductor of the branch BO'1"(Y) that conveys the selection signal $SS_Y$. The second input of the gate 4" is connected to the conductor of the branch BO1"(X) that conveys the selection signal $SS_X$. The third input of the gate 3" and the third input of the gate 4" are connected to the conductor of the common bus OC that conveys the signal RD to control reading when the two signals RD and $SS_Y$ are active simultaneously, or when the two signals RD and $SS_X$ are active simultaneously. In the first case, the read output signal is a signal $OL_X$ supplied to a conductor of the branch BO1"(X). In the second case, the read output signal is a signal $OL_Y$ supplied to a conductor of the branch BO'1"(Y).

Naturally, other variant embodiments can be envisaged by the person skilled in the art by considering all of the variants that are intermediate between those shown in FIGS. 5 and 7.

It should be observed that the individual character of the access points corresponding to the various objects, and of the relationship memory points, makes it possible to perform numerous operations in parallel. For example, in the variant embodiment RMP1 shown in FIG. 5, a read operation from an object X, triggered by sending the signal $RS_X$ over the access AP1(X), causes a read operation to take place in all of the memory elements RMP1(X,Y) for Y=1 to N and Y≠X. A logic signal $OL_Y$ of value 1 appears simultaneously on all of the accesses AP1(Y) of objects Y=1, ..., N and Y≠X having a relationship established with the object X under consideration, i.e. whose memory elements RMP1(X,Y) contain binary information of value 1.

Also, it is possible to perform a multiple read operation, i.e. simultaneously from a plurality of objects, e.g. $X_1$, $X_2$, and $X_3$. In which case, a logic signal $OL_Y$ of value 1 appears simultaneously on all of the accesses AP1(Y) of objects Y=1, ..., N having a relationship established with at least one of the objects $X_1$, $X_2$, $X_3$. In such a multiple read operation, the set of objects Y identified as having a relationship established with at least one of the objects $X_1$, $X_2$, ..., $X_{\underline{X}}$ is thus the union (in the logic meaning of the term) of the $\underline{X}$ sets of objects Y that would be identified by $\underline{X}$ individual reads from a single object at a time from $X_1$, $X_2$, ..., $X_{\underline{X}}$. In addition to identifying all of the objects having a relationship established with at least one of the objects $X_1$, $X_2$, ..., $X_{\underline{X}}$, i.e. with $X_1$, or with $X_2$, ..., or with $X_{\underline{X}}$, a multiple read operation performed simultaneously from the set of N objects serves to identify all of the objects which have at least one relationship established with another object, and all of the objects which have no relationship established with any of the other objects, i.e., typically, to identify objects that are "busy" or "used" and objects that are "free" or "not used" respectively.

A write operation triggered by applying the set signal $ST_K$ to $\underline{n}$ access points corresponding to a subset of $\underline{n}$ predetermined objects serves to store simultaneously the existence of all of the two-object relationships for all of the pairs of objects that can be taken from said subset of $\underline{n}$ objects. In analogous manner, it is possible to store the non-existence of all relationships between all possible pairs of objects in a subset of $\underline{n}$ objects by applying a reset signal RT=1 to the $\underline{n}$ access points of the objects in said predetermined subset.

Initially we consider only operations performed on predetermined subsets, i.e. subsets that are either static, i.e. of fixed composition, or that are dynamic but of known composition managed from outside the apparatus of the invention. Subsequently we consider more complex operations performed on subsets of objects that are not predetermined, i.e. of composition that is not necessarily known outside the apparatus.

When the N objects are structured in a plurality of subsets of predetermined objects of composition known outside the apparatus, read operations and write operations are possible as described in the following paragraphs.

If a read operation from one or more objects is to be limited to a known subset of $\underline{n}$ objects, it suffices for the logic circuits LM to include a logic circuit that takes account only of the $\underline{n}$ signals OL coming from the $\underline{n}$ access points corresponding to the $\underline{n}$ objects of the subset.

Figure 8:
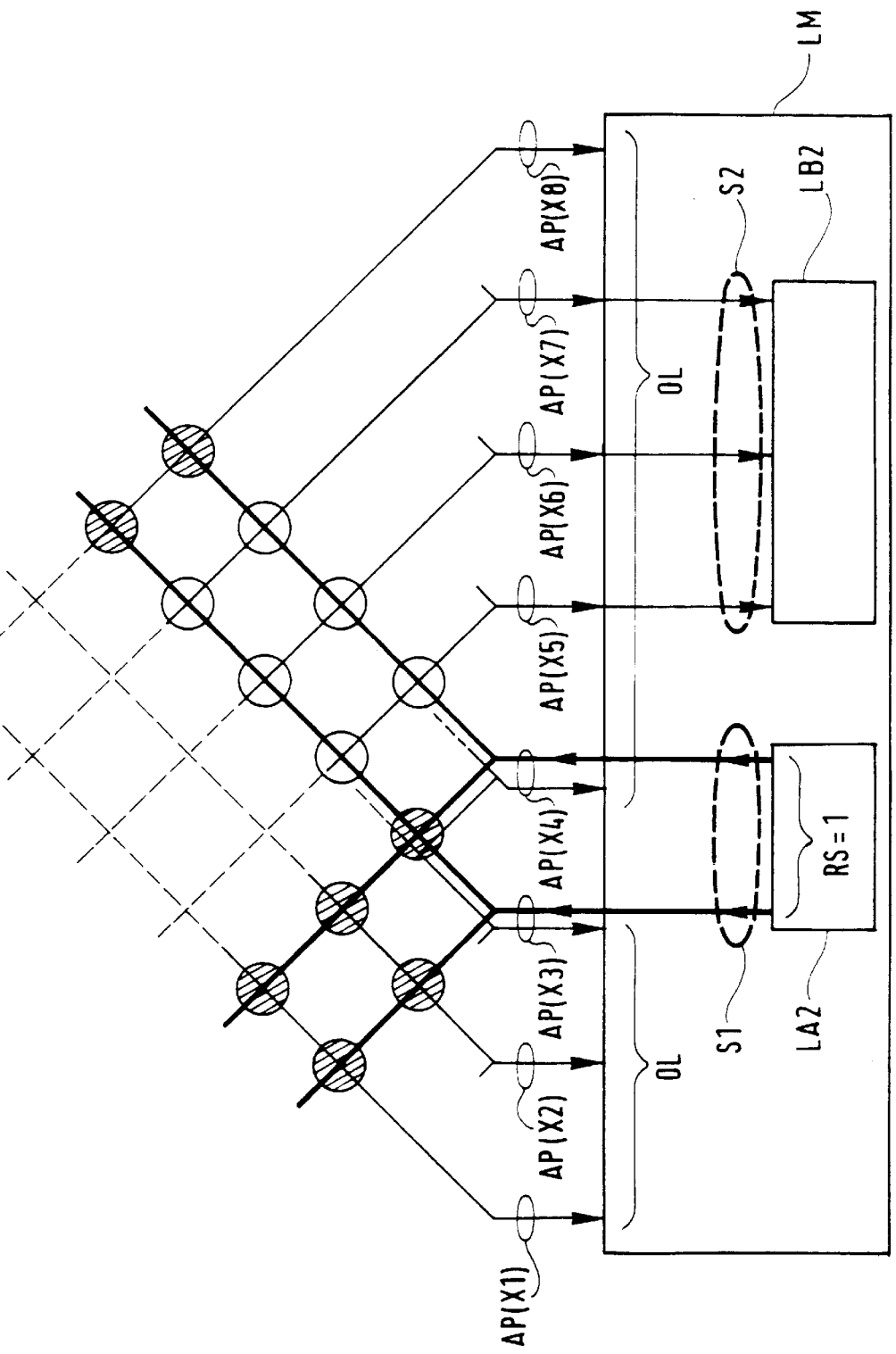
FIG. 8 shows how management apparatus including memory elements such as the element shown in FIG. 5 operates, during a reading operation for reading relationships between objects of two subsets A and B (when reading is performed from A)

By way of example, FIG. 8 shows how relationships are identified that are established between the objects $X_3$ and $X_4$ constituting a subset S1 of a set E constituted by the objects $X_1$, $X_2$, ..., $X_8$; and the objects $X_5$, $X_6$, $X_7$ constituting another subset S2. The relationship memory elements that are read are represented by circles. They are of the RMP1 type shown in FIG. 5.

Such identification may be performed by reading simultaneously from the objects of one of the subsets (e.g. S1) and selectively taking into account only the signals OL coming from the access points of the objects in the other subset (i.e. S2 in the example chosen).

To limit the reading to the relationships concerning the objects of the subset S1, the logic circuits LM include a logic circuit LA2 only transmitting the signals RS=1 to the access points AP(X3) and AP(X4) corresponding to the objects of the subset S1. To limit the reading to the relationships concerning the objects of the subset S2, the logic circuits LM include a logic circuit LB2 which takes into account only the signals OL coming from the access points AP(X5), AP(X6), AP(X7) corresponding to the subset S2. The shaded circles represent the memory elements that are read but whose information is not taken into account by the circuit LB2. In this example, the signals OL=1 indicate which objects of the set S2 have at least one relationship with the objects of the set S1.

Let us now examine the possibilities of a write operation on subsets known outside the apparatus.

Figure 9:
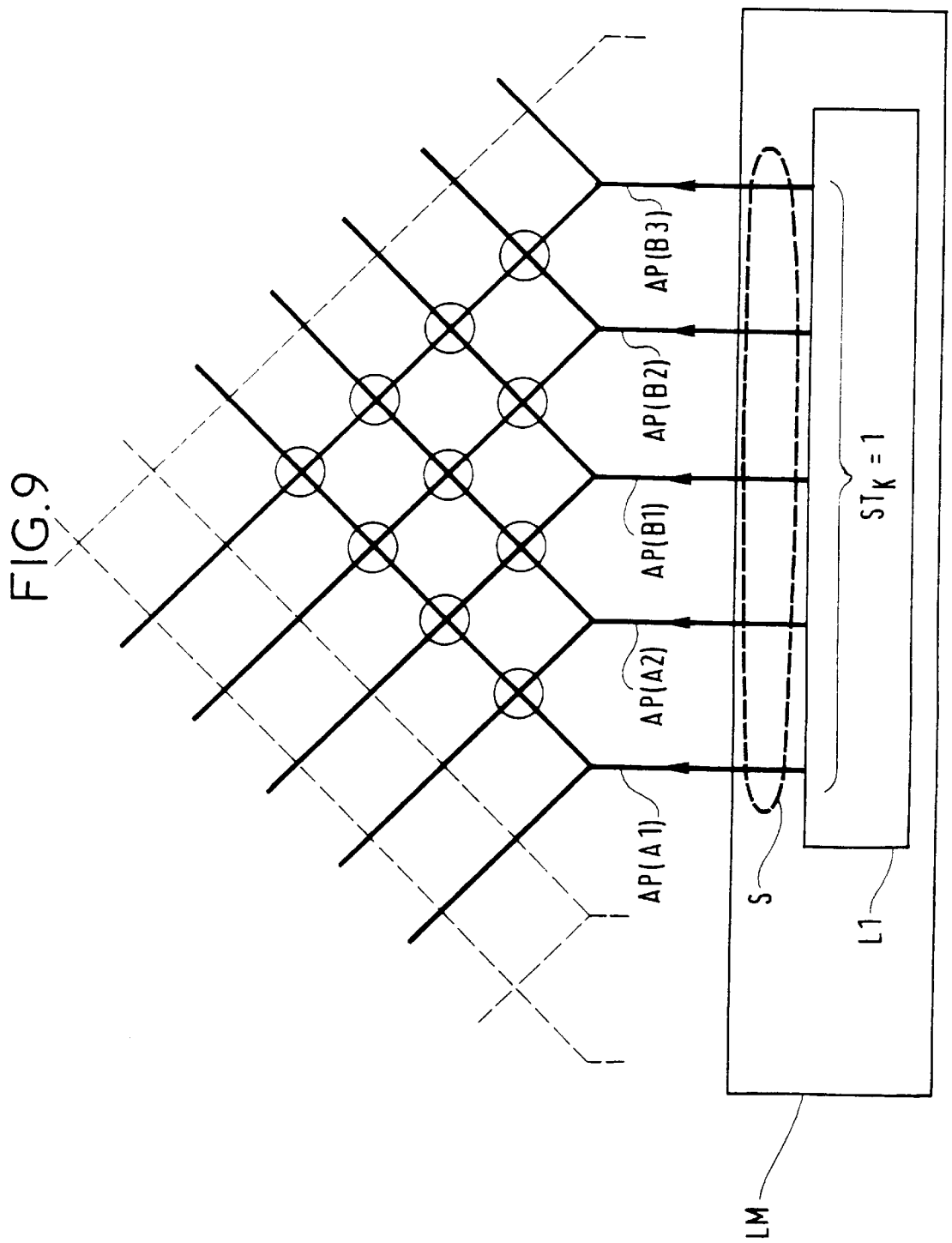
FIG. 9 is a diagram summarizing an embodiment of apparatus of the invention including memory elements such as the element shown in FIG. 5, and showing how it operates when an operation is performed on relationships relating the objects of a subset S of a set of objects.

FIG. 9 shows an example for n=5. Let us consider a subset S made up of five objects A1, A2, B1, B2, B3 in a set E of eight objects (N=8) belonging to the same category. For example, the existence of all of the possible relationships between the five objects may be stored by means of a single write operation, by simultaneously applying five signals $ST_K$=1 to respective ones of the access points AP(A1), AP(A2), AP(B1), AP(B2), AP(B3), by means of a logic circuit L1 that applies a selection of the subset S, and that is part of the logic circuits LM. The buses that are activated are shown in solid lines. The inactivated buses are shown in dashed lines. Each of the memory elements that perform the write operation is shown by a respective circle.

It appears that the existence of all of the relationships A1-A2, A1-B1, A1-B2, A1-B3, A2-B1, A2-B2, A2-B3, B1-B2, B1-B3, B2-B3 can be stored in the single operation. In analogous manner, it is possible to erase the existence of all of these relationships in a single operation.

However, this first embodiment of the memory elements does not make it possible to perform more selective operations, implementing at least two subsets of the set E, e.g: a subset S1 made up of n1=2 objects A1 and A2, and a subset S2 made up of n2=3 objects B1, B2, B3. For example, it is not possible:

- to store the existence of relationships between the object A1 and each of the n2 objects B1, B2, B3 without storing the existence of relationships B1-B2, B1-B3, B2-B3 within the subset S2;
- or to store the existence of relationships between each object of the subset S1 of n1 objects A1, A2 and each object of the subset S2 of n2 objects B1, B2, B3 without storing the existence of a relationship A1-A2 between the objects of the subset S1 and without storing the existence of a relationship B1-B2, B1-B3, B2-B3 between the objects of the subset S2.

Storing the non-existence of relationships, in other words erasing the contents of the memory elements, poses a similar problem.

Figure 10:
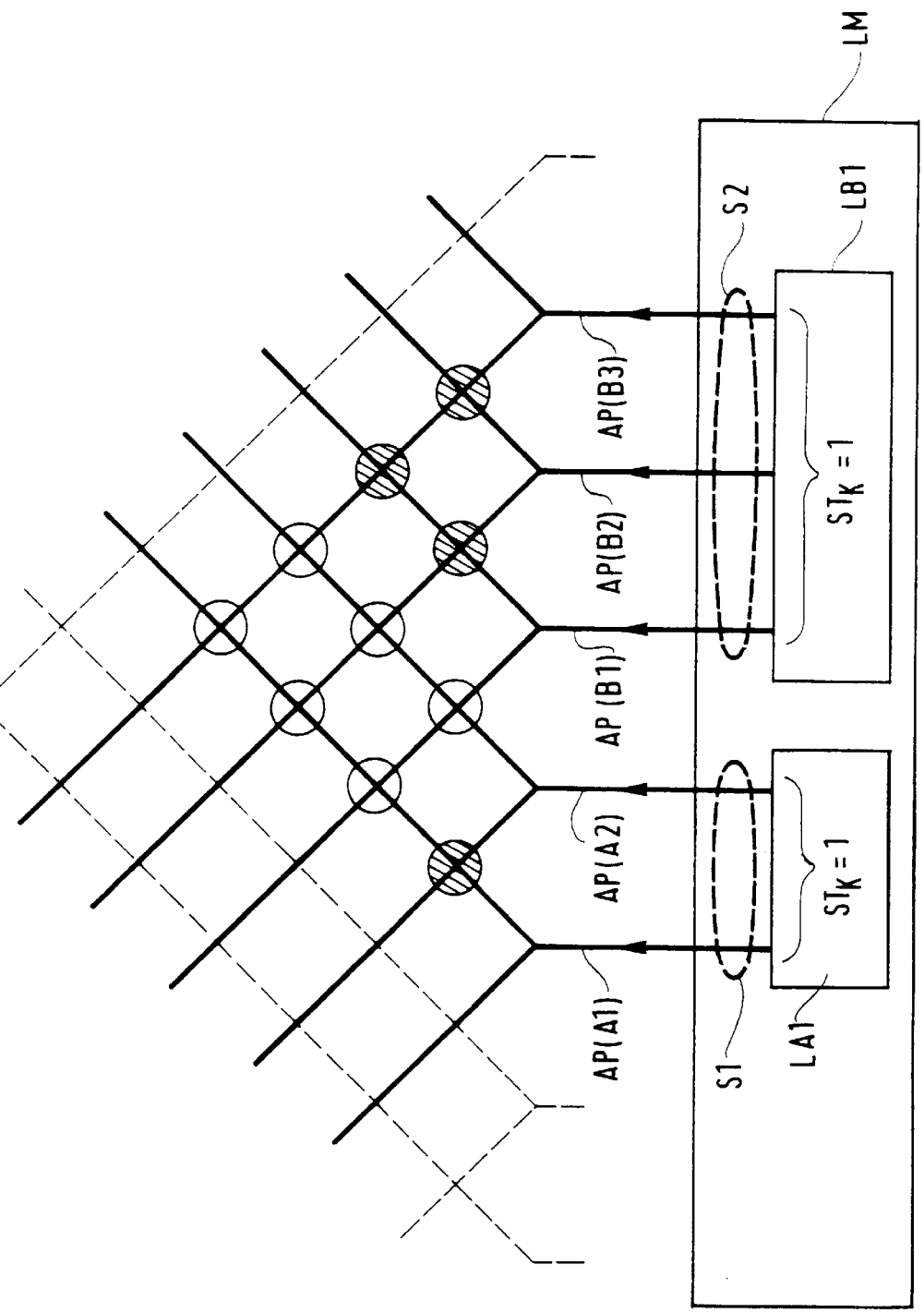
FIG. 10 shows the problem that arises when a writing operation concerns two subsets of objects (S1 and S2)

FIG. 10 illustrates this problem by showing how the apparatus of the invention operates when it is made up of memory elements RMP1 such as the element shown in FIG. 5. By means of signals $ST_K=1$, a logic circuit LA1 activates the accesses AP(A1) and AP(A2) corresponding to the subset S1 of the set E, and a logic circuit LB1 activates the accesses AP(B1), AP(B2), and AP(B3) corresponding to the subset S2 of the set E. The activated buses are shown in solid lines. The memory elements that are activated are represented by circles. Those which store the existence of a relationship between an object of the subset S1 and an object of the subset S2 are shown unshaded. Those which store the existence of a relationship between two objects of the same subset S1 or S2 are shaded. It is desirable to be able to store or erase information in the unshaded elements without necessarily performing the same operation in the shaded elements.

Figure 11:
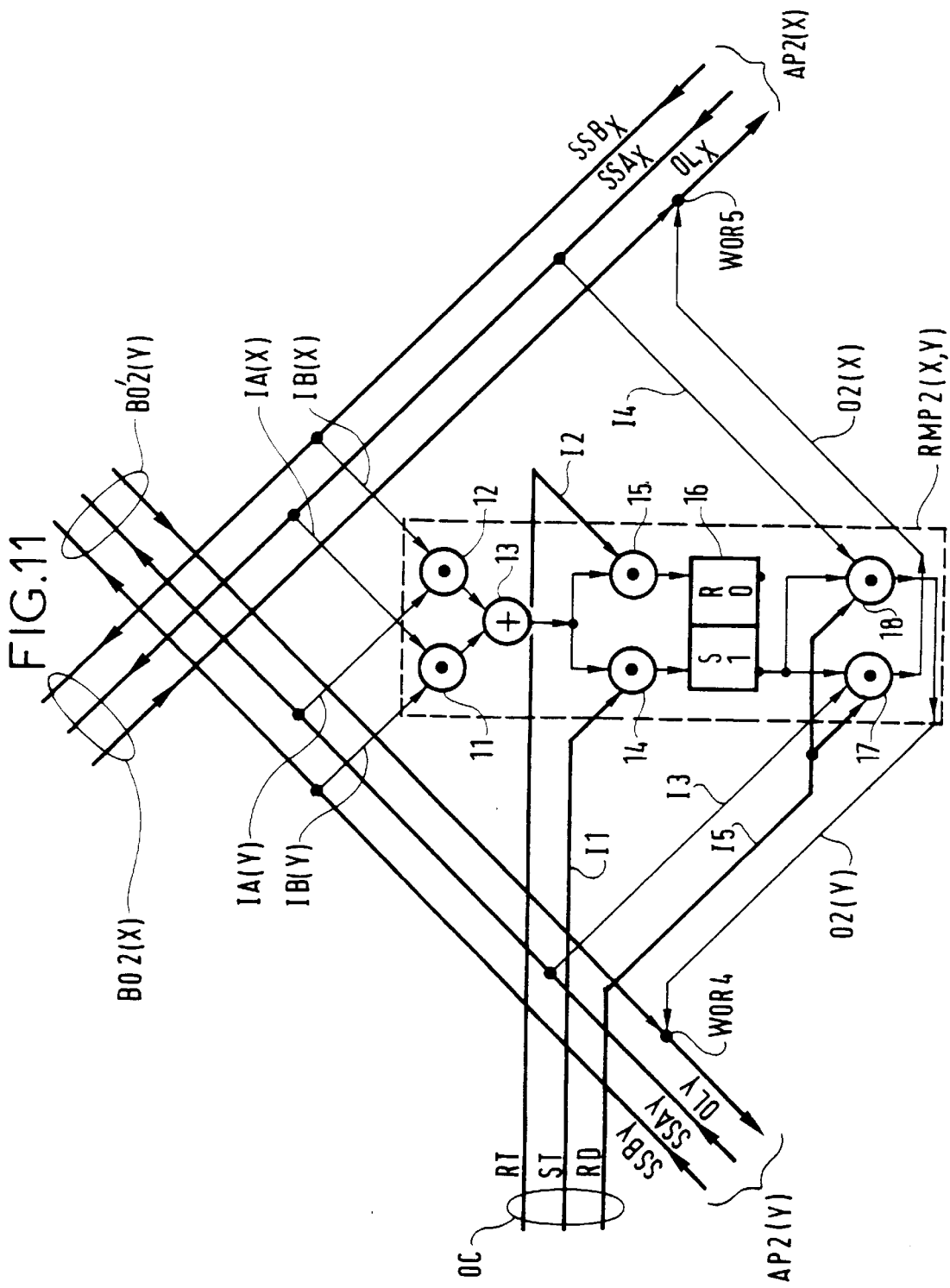
FIG. 11 is a diagram summarizing a second embodiment of a relationship memory element for the apparatus of the invention.

FIG. 11 is a diagram summarizing a second embodiment RMP2(X,Y) of the memory element used in the apparatus of the invention. The second embodiment offers the advantage of making more selective setting or resetting possible because it makes it possible to modify relationships between two objects belonging to respective subsets S1 and S2 without necessarily modifying the relationships within the subsets. The buses do not have the same functions as in the first embodiment shown in FIGS. 5 and 6. A first bus referenced OC transmits three signals. In this embodiment, the bus comprises three conductors whose path layout is independent of the layout of the memory elements because the path layout is common to all of the memory elements, and the bus supplies "non-specific" signals controlling an operation selected from a plurality of predetermined operations. The three signals conveyed are as follows:

a signal RT controlling resetting of any memory element that is otherwise addressed;

a signal ST which sets again any memory element that is otherwise addressed; and a signal RD which controls a read operation in any memory element that is otherwise addressed.

The first bus OC is connected to three inputs (not shown) of the apparatus. The three inputs are independent of the individual access points that correspond respectively to the N objects of the management apparatus.

Each element RMP2 is situated at the cross-point between two individual buses respectively corresponding to two objects, it being possible for the two buses to be respectively of the row bus type and of the column bus type, or of the orthogonal bus type, which types are described above with reference to FIGS. 1 and 3. For example, let us consider two buses of the orthogonal bus type. A first orthogonal bus includes in particular a branch BO2(X), and it is connected to an access point AP2(X) corresponding to an object X. A second orthogonal bus includes in particular a branch BO'2(Y) and it is connected to an access point AP2(Y) corresponding to an object Y. The branch BO2(X) conveys three signals. In this example, it comprises three conductors respectively conveying:

a signal $SSA_X$ for write addressing and selecting group A, or for read addressing;

a signal $SSB_X$ for write addressing and selecting group B; and an output signal $OL_X$, resulting from reading the memory elements RMP2(X,Y) connected to the orthogonal bus corresponding to the access AP2(X), each memory element RMP2(X,Y) having an output O2(X) that is connected to a common conductor of the branch LC2(X) so as to constitute a wired-OR WOR5.

The branch BO'2(Y) conveys three signals. In this example, it comprises three conductors respectively conveying:

a signal $SSA_Y$ for write addressing and selecting group A, or for read addressing;

a signal $SSB_Y$ for write addressing and selecting group B; and an output signal $OL_Y$, resulting from reading the memory elements RMP2(X,Y) connected to the orthogonal bus corresponding to the access point AP2(Y), each of these memory elements having an output O2(Y) that is connected to a common conductor of the branch BO'2(Y) so as to constitute a wired-OR WOR4.

For reading, there is no selection of group A or B, a single addressing signal suffices:

$SSA_Y=1$ on the bus BO'2(Y) when reading from the object Y, or $SSA_X=1$ on the bus BO2(X) when reading from the object X.

For writing, an object K may belong to one and/or the other of the two groups A and B depending on the signals $SSA_K$ and $SSB_K$ that are activated on the access AP(K):

if $SSA_K=1$ and $SSB_K=0$, the object K belongs to group A only, for writing;

if $SSA_K=0$ and $SSB_K=1$, the object K belongs to group B only, for writing;

if $SSA_K=0$ and $SSB_K=0$, the object K belongs to neither of the groups A and B (none of the memory elements storing the existence or the non-existence of relationships between the object K and other objects are activated); and if $SSA_K=1$ and $SSB_K=1$, the object K belongs both to group A and to group B.

This embodiment of a memory element RMP2(X,Y), shown in FIG. 11, comprises:

two write selection inputs IA(Y) and IA(X) which are connected respectively to the conductor conveying the signal $SSA_Y$ in the branch BO'2(Y), and to the conductor conveying the signal $SSA_X$ in the branch BO2(X);

two write selection inputs IB(Y) and IB(X) which are connected respectively to the conductor conveying the signal $SSB_Y$ in the branch BO'2(Y), and to the conductor conveying the signal $SSB_X$ in the branch BO2(X);

a non-specific reset input I2 connected to the conductor of the bus OC that conveys the signal RT;

a non-specific set input I1 connected to the conductor of the bus OC that conveys the signal ST;

a non-specific read control input I5 connected to the conductor of the bus OC that conveys the signal RD;

two read selection inputs I3 and I4 which are connected respectively to the conductor conveying the signal $SSA_Y$ in the branch BO'2(Y), and to the conductor conveying the signal $SSA_X$ in the branch BO2(X);

the above-mentioned outputs O2(Y) and O2(X);

two AND gates 11 and 12, each of which has a first input, a second input, and an output; the first inputs of the gates 11 and 12 constituting the inputs IB(Y) and IA(Y); and the second inputs of the gates 11 and 12 constituting the inputs IA(X) and IB(X);

an OR gate 13 having two inputs respectively connected to the two outputs of the gates 11 and 12, and having one output;

two AND gates 14 and 15, each of which has a first input, a second input, and an output, the first inputs being connected in common to the output of the OR gate 13; the second inputs of the gates 14 and 15 respectively constituting the reset input I2 and set input I1 of the element RMP2(X,Y);

a bistable 16 having: a set input referenced S, connected to the output of gate 14, a reset input referenced R, connected to the output of gate 15, and an output; and two AND gates 17 and 18, each of which has a first input, a second input, a third input, and an output, the first inputs of the gates 17 and 18 being connected together and constituting the read control input I5; the second inputs of the gates 17 and 18 respectively constituting the read selection signals I3 and I4, the third inputs of the gates 17 and 18 being connected in common to the output of the bistable 16, and the outputs of the gates 17 and 18 respectively constituting the outputs O2(Y) and O2(X).

Figure 12:
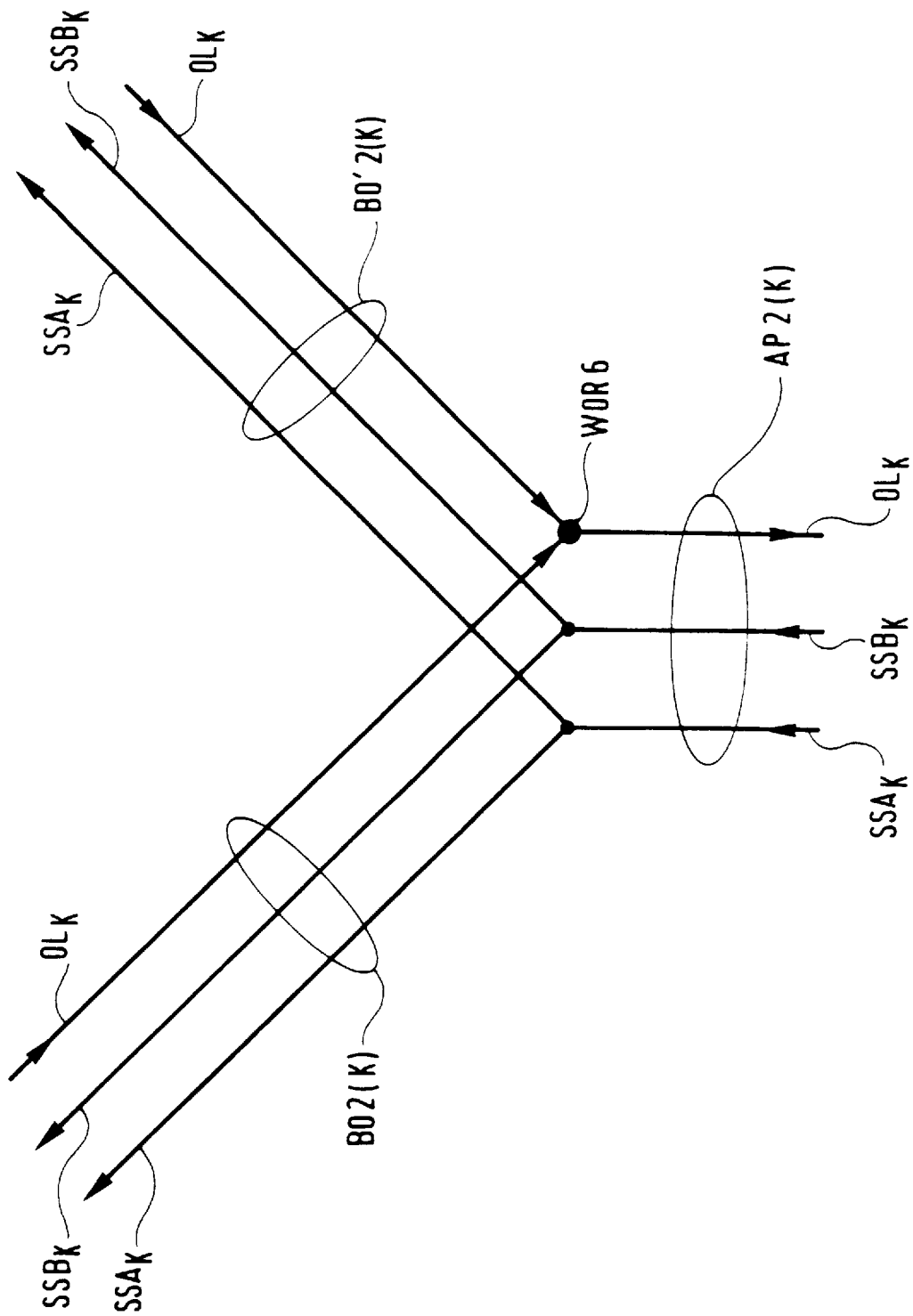
FIG. 12 shows an "orthogonal" bus and an access point corresponding to a given object, for controlling the embodiment shown in FIG. 10.

FIG. 12 shows an orthogonal bus and an access point AP2(K) corresponding to an object K taken by way of example. The orthogonal bus comprises two branches: BO2(K) and BO'2(K). The access point AP2(K) comprises:

a conductor connected to a conductor of the branch BO2(K) and to a conductor of the branch BO'2(K) for conveying the signal $SSA_K$;

a conductor connected to a conductor of the branch BO2(K) and to a conductor of the branch BO'2(K) for conveying the signal $SSB_K$; and a conductor connected to a conductor of the branch BO2(K) and to a conductor of the branch BO'2(K) for receiving a signal $OL_K$ and constituting a wired-OR WOR6.

At a relationship memory element RMP2(X,Y) relating to the objects X and Y, a write operation is performed in the memory element when the following two conditions are satisfied on the control bus:

ST=1 or RT=1, on the common bus OC, for writing respectively 1 or 0; and $SSA_X$=1 and $SSB_Y$=1, or $SSB_X$=1 and $SSA_Y$=1, respectively on control bus BO2(X) and on control bus BO2'(Y).

Under the latter logic condition, $SSA_X \cdot SSB_Y + SSB_X \cdot SSA_Y$=1, a relationship memory element RMP2(X,Y) is selected for writing each time that the object X belongs to at least one of the groups A or B ($SSA_X$=1 or $SSB_X$=1) and that the other object Y belongs to at least the other group, respectively B or A ($SSB_Y$=1 or $SSA_Y$=1), independently of whether each of the objects X and Y belong to a single group or to both groups.

For reading, the memory element RMP2(X,Y) is controlled as follows: relationships existing between the object K and any other object L (without distinguishing between groups A and B) are read by making RD=1 on the bus OC, this signal being common to all the memory elements, and by making $SSA_K$=1 at the access AP(K) corresponding to the object K in question (the signal SSBK has no effect for reading). A signal $OL_i$=1 then appears at each access point AP(i) corresponding to the objects i having a relationship established with K, i.e. whose memory element RMP2(K, Li) contains a 1 value bit.

Figure 13:
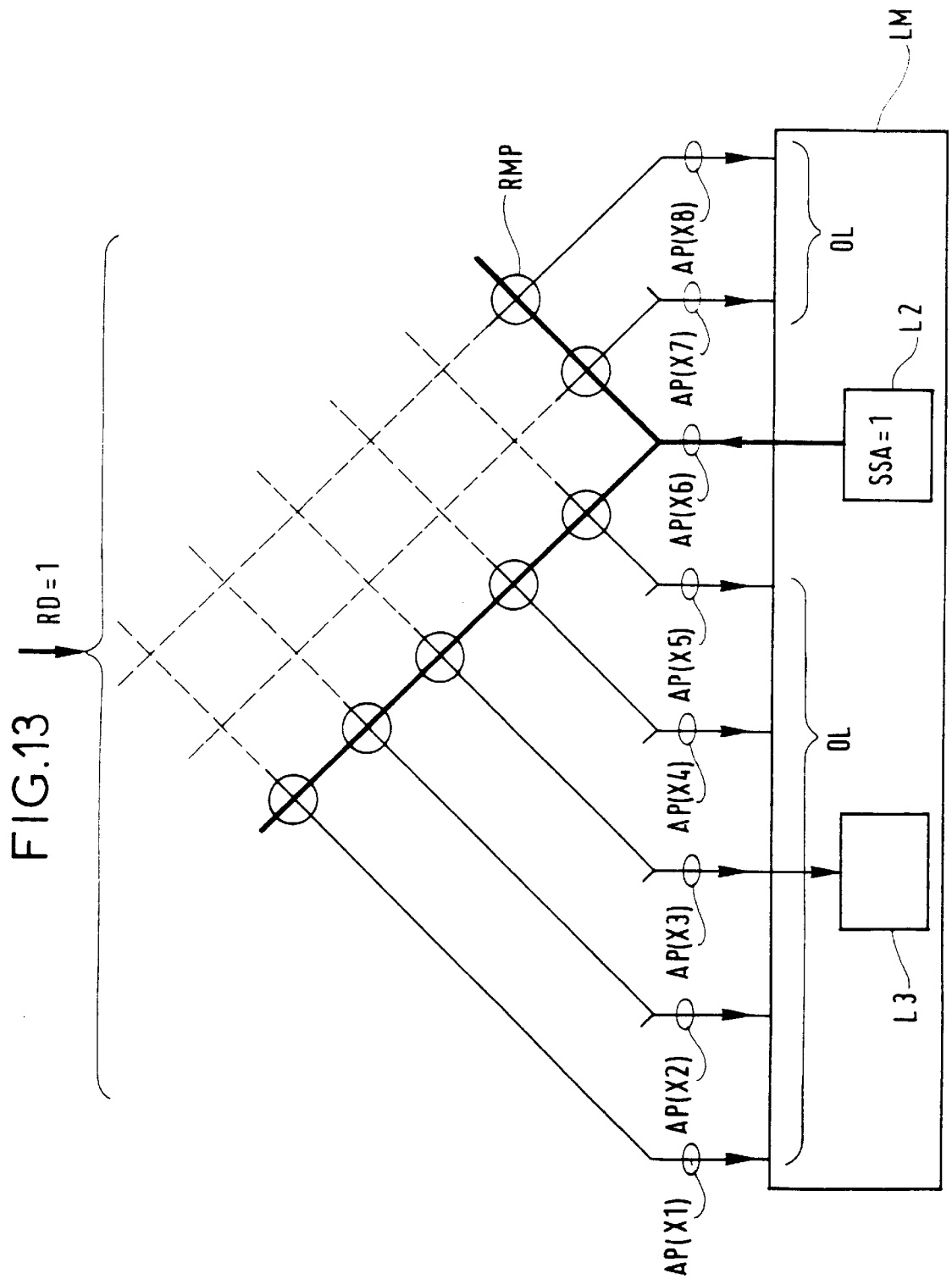
FIG. 13 shows how management apparatus including memory elements such as the element shown in FIG. 10 operates, during reading of all of the relationships existing between a single object and all of the other objects in the set under consideration.

Reading is illustrated in FIG. 13 which shows the logic circuits LM that manage the relationships of a set E made up of eight objects: X1, . . . , X8. FIG. 13 illustrates reading the relationship memory elements concerning relationships between the object X6 and all of the other objects in the set E. A logic circuit L2 supplies a signal SSA=1 (the signal SSB being arbitrary for reading) to the access AP(X6). The memory elements read by the signal RD=1 and the signal SSA=1 being applied simultaneously on the common bus are represented by respective circles.

As with the above-described memory elements RMP1, if reading is to be limited to a known subset of the set X1, . . . , X5, X7, X8, it suffices for the logic circuits LM to include a logic circuit which takes into account only those signals OL which come from access points corresponding to the subset. For example, to read the information indicating the existence or the non-existence of a relationship between the object X6 and a single other object, e.g. X3, it suffices to test the value of the signal OL3, 1 or 0, supplied by the access AP(X3), by means of a logic circuit L3 connected to this access.

More generally, the second embodiment RMP2(X,Y) makes it possible to perform the same read operations as the first embodiment RMP1(X,Y): a single read operation or a multiple read operation (simultaneously from a plurality of objects); and identifying relationships established between objects in two subsets (as illustrated by FIG. 8 with RMP1 (X,Y)).

In a variant embodiment of the element RMP1(X,Y) or of the element RMP2(X,Y), and while the memory element is performing a read operation, it restores relationship information simultaneously on the individual bus BO1(X) or BO2(X) corresponding to a first object, and on the individual bus BO'(Y) or BO'2(Y) corresponding to a second object, if it receives a selection signal via at least one of the two individual buses, as well as a read control signal. When this variant embodiment is used, the logic means LM must be suited to the variant, i.e., they must capable of distinguishing which one of the read output signals is supplied via the access to which the selection signal is applied, and which one(s) of said output signals is/are supplied via other accesses.

As regards write operations, the second embodiment RMP2(X,Y) makes it possible to perform:

the same write operations as those that can be performed with the first embodiment RMP1(X,Y), i.e. non-selective operations performed on a single predetermined subset of n objects; and also particular write operations, i.e. performed selectively between the n1 objects of a first subset, and the n2 objects of a second subset, the two subsets being predetermined.

With the second embodiment, to perform a non-selective write operation on a group of n objects, i.e. on all of the relationships between the n objects taken in pairs, it suffices to transmit simultaneously the following signals:

ST=1 or RT=1 (respectively set or reset) on the common control bus OC; and $SSA_K$=1 and $SSB_K$=1 on each access point AP(K) corresponding to an object K belonging to the subset of n objects in question.

By assigning each of the n objects in question both to group A and to group B for the write operation ($SSA_K$=1 and $SSB_K$=1), each relationship memory element RMP2(X,Y) relating to two objects X and Y belonging to the subset of n objects in question receives the signals $SSA_X$=1 and $SSB_X$=1 via the control bus BO2(X) of the object X, and receives $SSA_Y$=1 and $SSB_Y$=1 via the control bus BO2'(Y) of the object Y. Each element RMP2(X,Y) therefore performs the write operation for the relationship X-Y because one of the objects (X,Y) is selected by one of the groups (A,B), and the other object (Y,X) is selected by the other group (B,A), this also being verified redundantly for both permutations of the groups A and B in this case.

The above-described method is valid for a subset of $n$ objects where $2<n<N$. However, it can be noted that another method may be used in the special case n=2, i.e. a write operation for a single relationship between two objects X and Y, namely by assigning arbitrarily one of the objects X to one of the groups A or B and the other object Y to the other group B or A, for this operation. In which case, the signals transmitted simultaneously are:

ST=1 or RT=1 (set or reset) on the common bus OC; and $SSA_X=1$ and $SSB_X=0$ on the control bus of the object X, and $SSA_Y=0$ and $SSB_Y=1$ on the control bus of the object Y, or else $SSA_X=0$ and $SSB_X=1$ on the control bus of the object X, and $SSA_Y=1$ and $SSB_Y=0$ on the control bus of the object Y.

The memory element RMP2(X,Y) in question can also perform the write operation for the relationship X-Y using this other method when n=2.

Let us now examine the particular write operations that can be performed with the second embodiment RMP2(X,Y), i.e. performed selectively between the n1 objects of a first predetermined subset and the n2 objects of a second predetermined subset, without necessarily modifying the relationships between the objects in the same predetermined subset (it is assumed that the two subsets are not identical and that n1 and/or n2 is greater than 1).

In a write operation for relationships between objects belonging to two disjoint or non-disjoint subsets, information (1 or 0) indicating the existence or the non-existence of relationships between the n1 objects in the first predetermined subset and the n2 objects in the second predetermined subset is written by arbitrarily assigning, for the operation, the n1 objects in the first subset to one of the groups A or B (using the selection signals SSA and SSB) and the n2 objects of the second subset to other group B or A.

To clarify how such write operations that are selective between two predetermined subsets of objects are performed, a distinction must be made between two cases in which the predetermined subsets of n1 and n2 objects are either disjoint (each object belonging to a single subset only) or else non-disjoint (at least one object belongs to both subsets). In the first case, each object is present in a single group (A or B) only, and the selection signals used for such an object are either SSA=1 and SSB=0 if it belongs to group A, or SSA=0 and SSB=1 if it belongs to group B for the operation. Whereas in the second case, in which the n1 and n2 objects constitute non-disjoint subsets, at least one of the objects in question (from the n1+n2 objects) is common to both of the predetermined subsets, and for each such common object both selection signals are activated simultaneously, SSA=1 and SSB=1, since it belongs to both groups A and B for the operation.

Such a write operation that is selective between two disjoint or non-disjoint predetermined subsets is thus performed by simultaneously transmitting the following signals:

ST=1 or RT=1 (set or reset) on the common bus OC;

$SSA_L=1$ and $SSB_L=0$ on the control bus of each object L that is to be assigned to group A only;

$SSA_M=0$ and $SSB_M=1$ on the control bus of each object M that is to be assigned to group B only; and $SSA_N=1$ and $SSB_N=1$ on the control bus of each object N that is to be assigned both to group A and to group B (common object).

Figure 14:
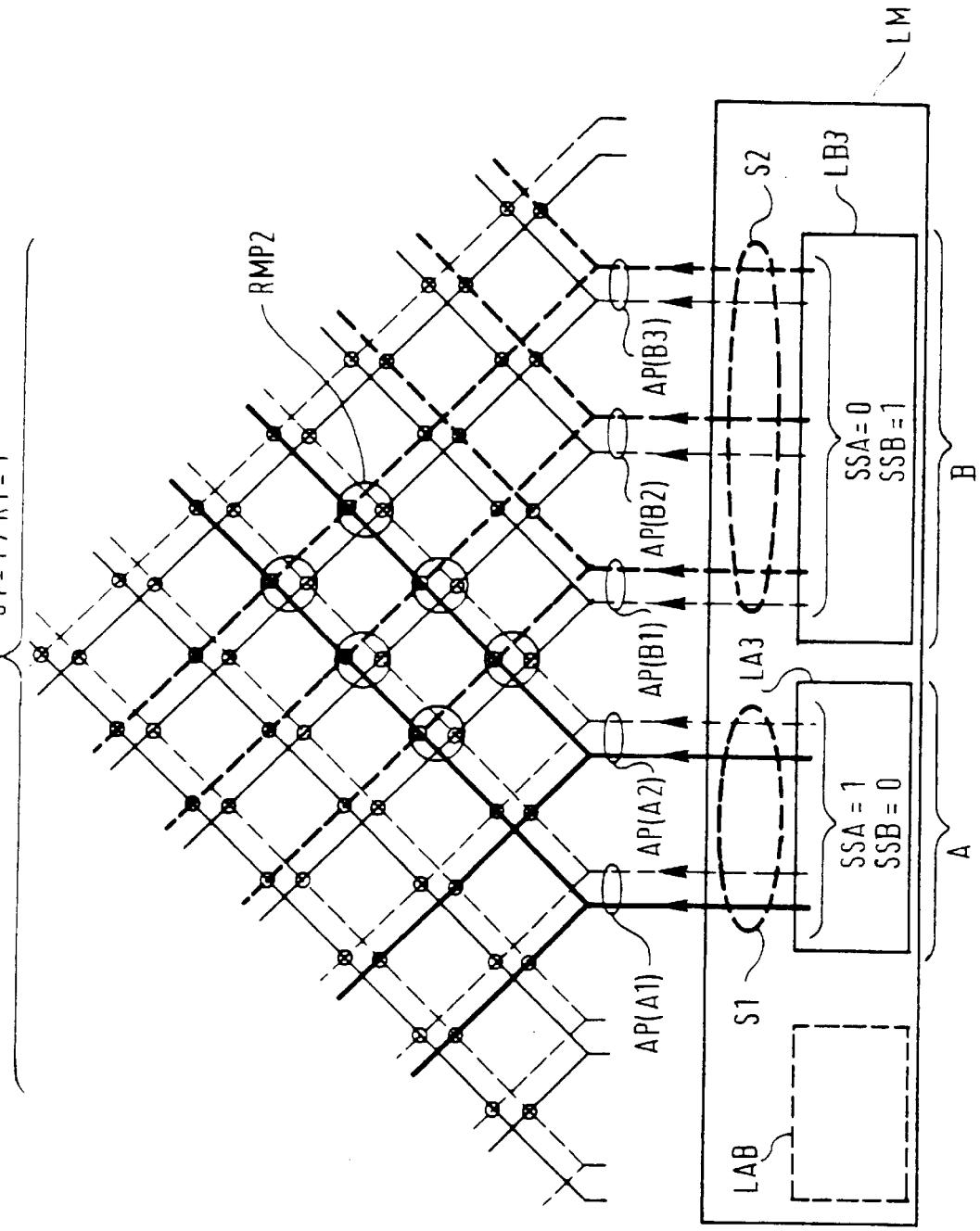
FIGS. 14 and 15 show two operating variants of the same apparatus during two variants of the same write operation performed on relationships relating the objects of a subset S1 and the objects of a subset S2 (where S1 and S2 are disjoint), with the exception of all of the relationships between the objects of the same subset.
Figure 15:
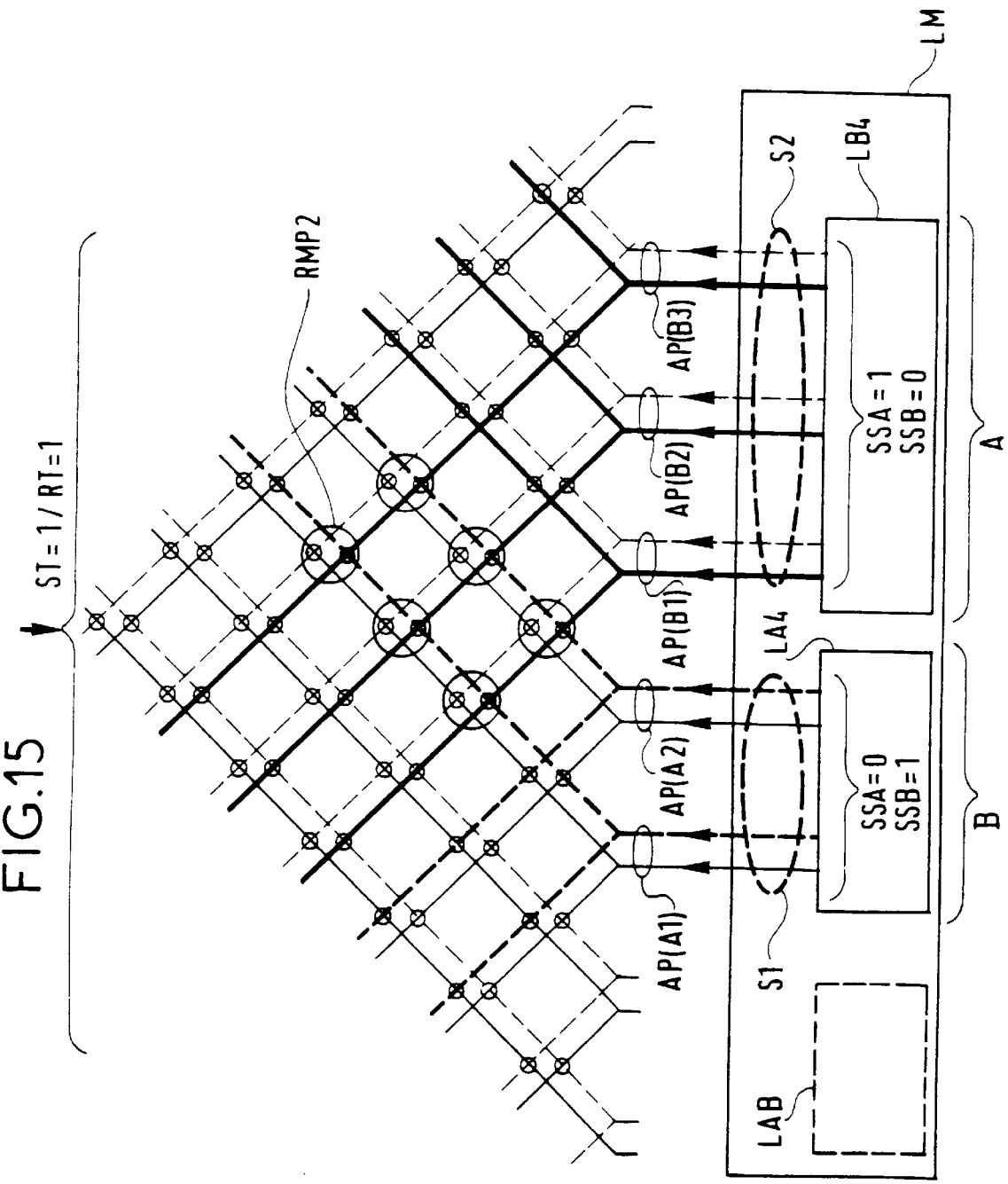

FIGS. 14 and 15 respectively illustrate these two equivalent methods of writing the existence or the non-existence of relationships between firstly the objects A1, A2 of a subset S1, and secondly the objects B1, B2, B3 of a subset S2, the two subsets S1 and S2 being assumed to be disjoint.

In these figures, the addressing and selection signals are distinguished as follows:

$SS_A=1$: solid thick lines;

$SS_B=1$: dashed thick lines;

$SS_A=0$: solid fine lines; and $SS_B=0$: dashed fine lines.

In addition, the memory elements that perform write operations are indicated by circles.

It should be noted that, unlike what occurs with the first embodiment RMP1 (shown in FIG. 8), the second embodiment RMP2 does not cause information to be written indicating the existence or the non-existence of relationships between the objects A1 and A2 in the same subset S, or between the objects B1, B2, B3 in the same subset S2, when the subsets S1 and S2 are disjoint as is assumed in FIGS. 14 and 15. Conversely, when the subsets are not disjoint, the existence of one or more objects common to two subsets causes certain relationships within the same subset to be written (see below with reference to FIG. 18).

For the example shown in FIG. 14, the logic circuits LM include:

a logic circuit LA3 supplying signals SSA=1 and SSB=0 to the accesses AP(A1) and AP(A2) of the objects of the subset S1 assigned to group A; and a logic circuit LB3 supplying signals SSA=0 and SSB=1 to the accesses AP(B1), AP(B2), AP(B3) of the objects of the subset S2 assigned to group B.

All of the other signals SSA and SSB at the other accesses have a 0 value. The logic circuits LM supply the write signal ST=1 or RT=1 (respectively set or reset) to the common bus which is not shown.

In other examples in which certain objects are to be assigned both to group A and to group B, a logic circuit LAB is provided for supplying the signals SSA=1 and SSB=1 to the access points corresponding to these objects. Since the logic circuit LAB is not used in the example shown in FIGS. 14 and 15, it is shown in dashed lines.

For the example shown in FIG. 15, the logic circuits LM include:

a logic circuit LA4 supplying signals SSA=0 and SSB=1 to the accesses AP(A1) and AP(A2) of the objects of the subset S1 that are assigned to group B; and a logic circuit LB4 supplying the signals SSA=1 and SSB=0 to the accesses AP(B1), AP(B2), AP(B3) of the objects of the subset S2 that are assigned to group A.

All of the other signals SSA and SSB at the other accesses have a 0 value. The logic circuits LM supply the write signal ST=1 or RT=1 (set or reset respectively) to the common bus which is not shown.

Figure 16:
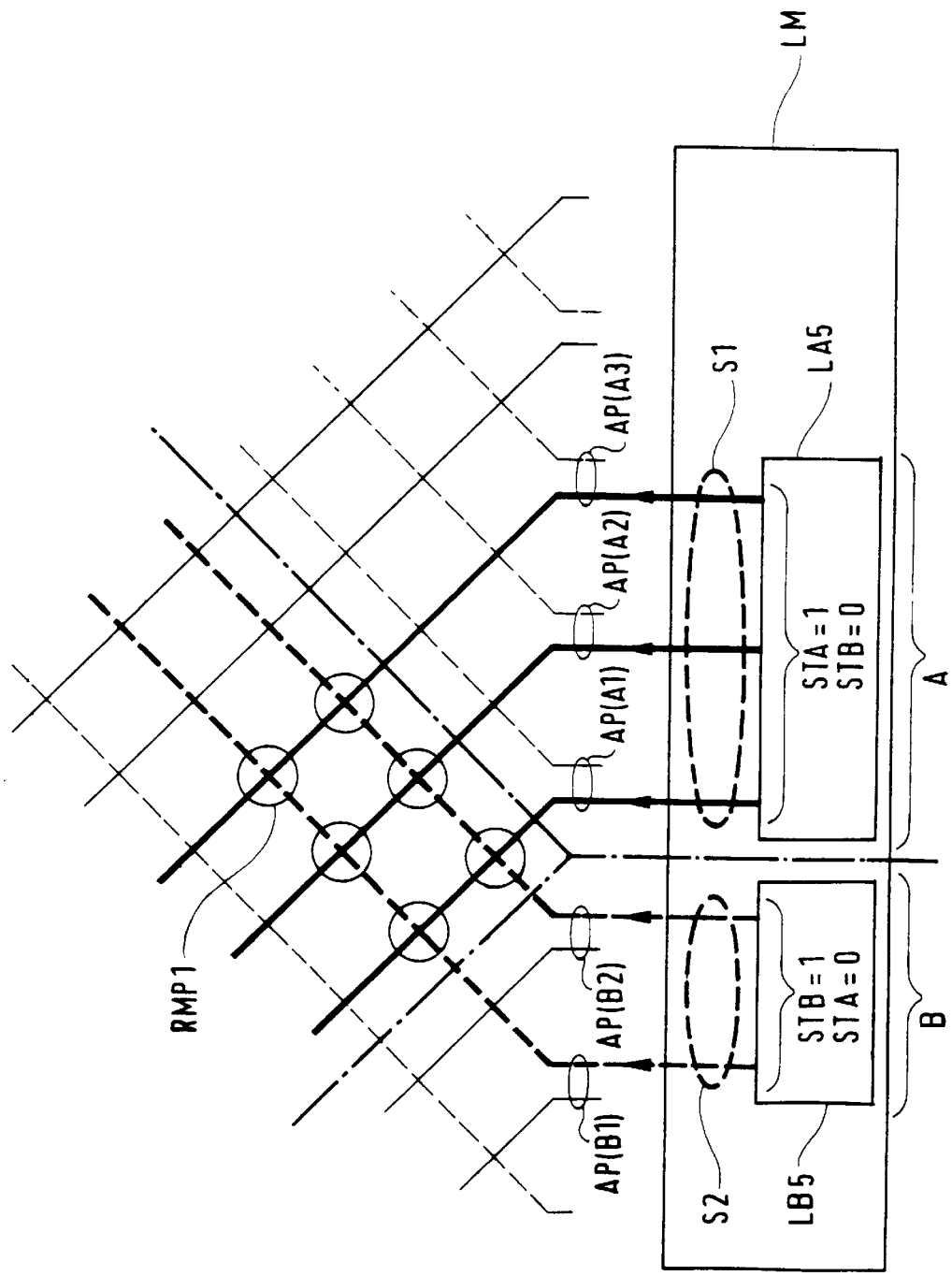
FIGS. 16 and 17 are diagrams summarizing a variant embodiment of the apparatus of the invention that includes memory elements such as the element shown in FIG. 5, and showing how it operates while a write operation is being performed on relationships relating the objects of a subset S1 and the objects of a subset S2, where S1 and S2 are disjoint.

FIG. 16 shows a bus structure in a variant embodiment of the array of memory elements of the apparatus of the invention. This array is still made up of the memory elements RMP1 shown in FIG. 5 but the conductors conveying the signals $RT_K$ and $ST_K$ in the branch BO(K) are no longer connected to the corresponding conductors in the branch BO'(K) as shown on FIG. 6. In this variant, the two branches are independently write controlled.

Figure 17:
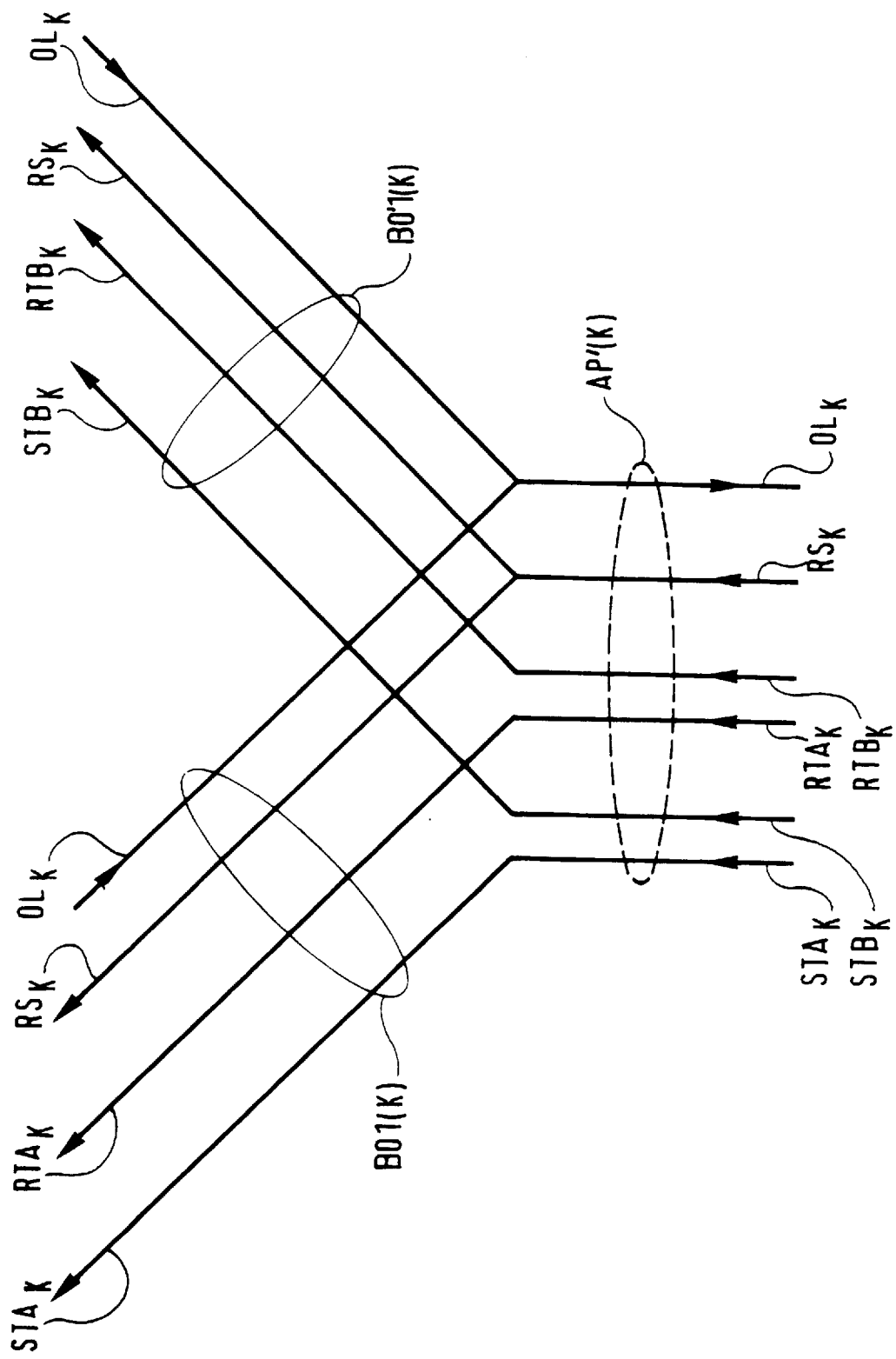

An access point AP'(K) is shown in FIG. 17. It is provided with six conductors:

a conductor conveying a set signal $STA_K$ to all of the elements connected to branch BO1(K), when the object K belongs to group A;

a conductor conveying a set signal $STB_K$ to all of the elements connected to the branch BO1(K), when the object K belongs to group B;

a conductor conveying a reset signal $RTA_K$ to all of the elements connected to the branch BO1(K), when the object K belongs to group A;

a conductor conveying a reset signal $RTB_K$ to all of the elements connected to the branch BO1(K), when the object K belongs to group B;

a read control conductor conveying a read control signal $RS_K$ to all of the elements connected to the orthogonal bus constituted by the two branches BO1(K) and BO1'(K); and a read output conductor supplying the logic circuits LM with a signal $OL_K$ resulting, via a wired-OR, from all of the signals supplied by reading the elements connected to the orthogonal bus constituted by the two branches BO'1(K) and BO1(K).

This structure for the array of memory elements RMP1 makes it possible to perform selective addressing similar to that made possible by the above-described bus structure with the elements RMP2, in particular for performing write operations between objects of two disjoint subsets S1 and S2, without causing any unwanted writing of a relationship between two objects belonging to the same subset.

This structure includes twelve buses providing access to the memory elements, instead of nine in the variant shown in FIGS. 11 and 12. But each memory element includes less gates: two AND gates and one OR gate less.

FIG. 16 shows how this variant operates in an example in which the write operation concerns the relationships between the objects A1, A2, A3 constituting a subset S1 and assigned to group A, and the objects B1, B2 constituting a subset S2 and assigned to group B. The logic circuits LM include a logic circuit LA5 which simultaneously supplies a signal STA=1 and a signal STB=0 to the access points AP(A1), AP(A2), AP(A3) corresponding to the objects in group A; and they include a logic circuit LB5 which simultaneously supplies a signal STB=1 and a signal STA=0 to the access points AP(B1) and AP(B2) corresponding to the objects in group B.

The elements RMP1 that are write activated are shown by circles. The conductors conveying the active signals are shown in solid or dashed thick lines. The conductors supplying the signal STA=1 for group A are shown in solid thick lines. The conductors supplying the signal STA=0 for group B are shown in solid fine lines. The conductors supplying the signal STB=1 for group B are shown in dashed thick lines. The conductors supplying the signal STB=0 for group A are shown in dashed fine lines.

However, it should be noted that this variant array as shown in FIG. 16 does not offer the same operating flexibility as the preceding version of the array with the elements RMP2, in terms of the composition of the subsets of objects A and B for a write operation between two subsets.

In the preceding version, with the elements RMP2, each object K may be freely assigned to one of the groups A and B or to both groups, depending on the needs of the operation, independently of the position of the object K relative to the other objects. For example, from a set E of eight objects referenced 1, 2, 3, 4, 5, 6, 7, 8, a write operation may be performed on any two subsets (disjoint or non-disjoint) of the set E, e.g. a subset S1 comprising the objects 1, 3, and 7, and a subset S2 comprising the objects 2, 3, 5, and 8.

Conversely, in the version with the elements RMP1, shown in FIGS. 16 and 17, the physical separation of the two branches BO1(K) and BO1'(K) introduces a constraint into the composition of the subsets S1 and S2 which must be not only disjoint, but also such that their objects are on either side of a physical separation in the row of the access points of the objects in the set E.

For example, FIG. 15 may represent an array for eight objects, where consideration is given to an operation between a subset S2 comprising the objects B1 and B2, and a subset S1 comprising the objects A1, A2, and A3. This operation is possible because the two subsets S1 and S2 are disjoint and are situated on either side of a physical separation between the objects B2 and A1, which separation delimits two distinct regions. This physical separation is shown in dot-dash lines in FIG. 15.

However, this variant does not make it possible to perform an operation on two subsets such as those mentioned above, namely two non-disjoint subsets for which the memory elements cannot be physically separated on either side of such a physical separation.

Figure 18:
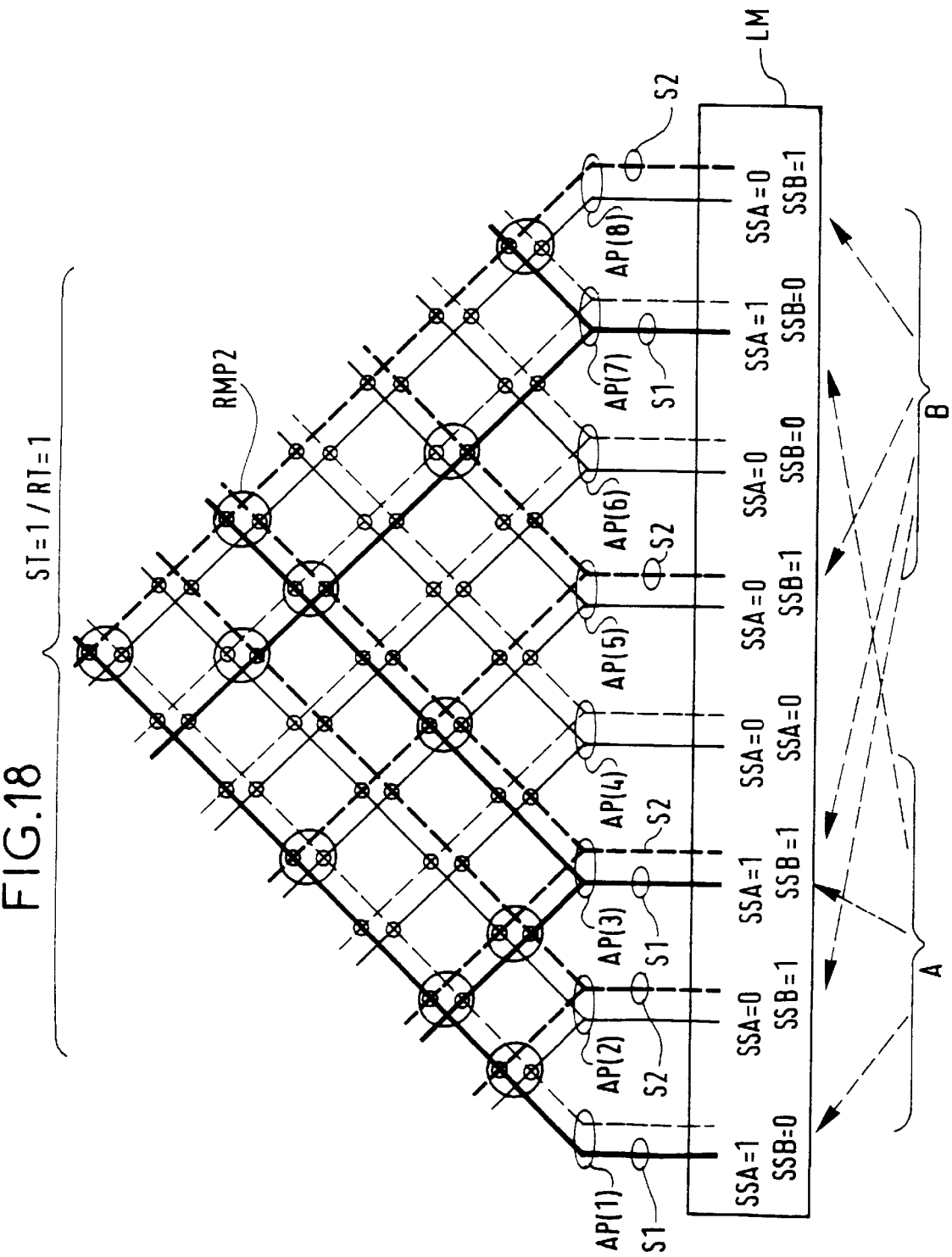
FIG. 18 shows another use of management apparatus including memory elements such as-the element shown in FIG. 11, during a write operation for writing relationships between objects of two arbitrary and non-disjoint subsets S1 and S2.

Such an example is illustrated in FIG. 18 which shows how the array based on the second embodiment RMP2(X,Y) operates for two subsets S1, comprising objects referenced 1, 3, and 7 (n1=3), and S2, comprising objects referenced 2, 3, 5, and 8 (n2=4), from the N=8 objects of the set in question. The subsets S1 and S2 are not disjoint because they have object 3 in common. For example, the subset S1 is assigned to group A and the subset S2 is assigned to group B (assigning subset S1 to group B and subset S2 to group A would give the same result).

The logic circuits LM include logic means (not shown in FIG. 17) supplying the appropriate addressing and selection signals (SSA, SSB) for each object, on the basis of the rules described above for the second embodiment RMP2(X,Y), and depending on whether each object belongs to group A, to group B, or to both groups, namely:

logic means for supplying addressing and selection signals (SSA=1 and SSB=0) for the objects which belong to group A only;

logic means for supplying addressing and selection signals (SSA=0 and SSB=1) for the objects that belong to group B only; and logic means for supplying addressing and selection signals (SSA=1 and SSB=1) for the objects that belong both to group A and to group B.

The appropriate values of the signals SSA and SSB for each object are given in FIG. 18, and the use of solid or dashed, thick or fine lines is the same as in FIGS. 14 and 15. It can be observed that the access point AP(3) corresponding to the object 3 common to both groups A and B receives signals $SSA_3$=1 and $SSB_3$=1 simultaneously; in addition, the access points AP(4) and AP(6) of the objects 4 and 6 which are not concerned by this operation receive signals SSA=0 and SSB=0.

In the array of memory elements RMP2(X,Y), the elements that perform a relationship write operation are indicated by a circle in FIG. 18, namely the relationships 1-2, 1-3, 1-5, 1-8, 2-3, 2-7, 3-5, 3-7, 3-8, 5-7, and 7-8. It can be noted that, in this example of non-disjoint subsets, the existence of an object 3 common to the two subsets S1 and S2 causes writing of relationships between objects of the same subset (which are also relationships between objects of the two subsets), namely 1-3, 2-3, 3-5, 3-7, and 3-8.

The apparatus of the invention may include a filter connected to each bus conductor $OL_K$ connecting together all of the memory element outputs relating to a given object K, for applying a filtering mask to the signals supplied in parallel via these bus conductors. The filter may then replace the logic circuits L3, LB3, described above, for the read operations.

Figure 19:
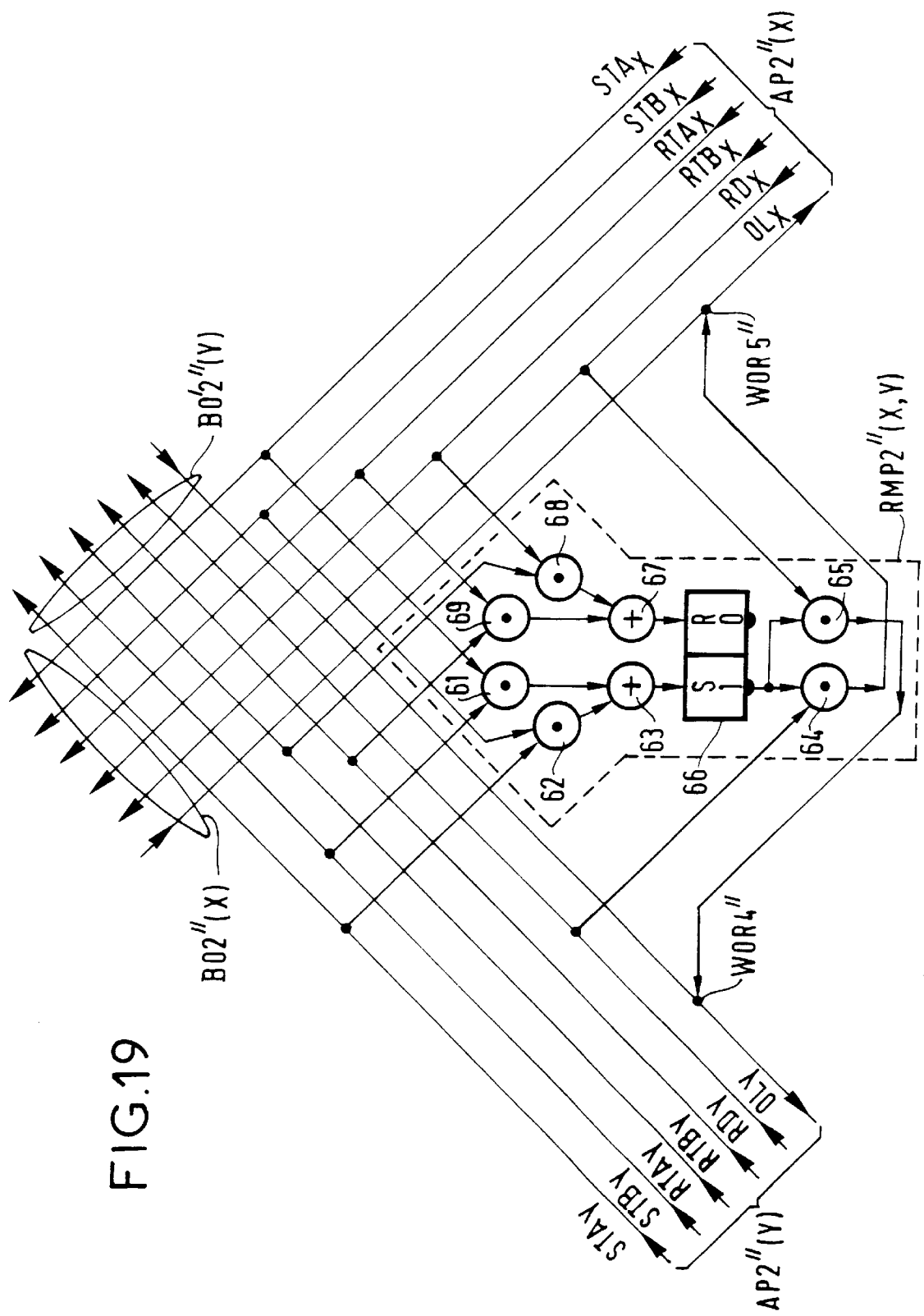
FIG. 19 is a diagram summarizing a variant of the second embodiment shown in FIG. 11.

FIG. 19 is a diagram summarizing a variant RMP2"(X,Y) of the second embodiment of the memory element used in the apparatus of the invention. This variant includes no common bus for controlling the operations. However, it makes it possible to modify the relationships between two objects belonging to respective ones of two subsets, without necessarily modifying the relationships within the subsets. Each element RMP2" is situated at the cross-point between a branch BO2"(X) of a bus corresponding to an object X and a branch BO'2"(Y) of a bus corresponding to an object Y. Each of the branches comprises six conductors in this embodiment. By way of example, the branch BO'2"(Y) conveys the following signals:

$STA_Y$ and $STB_Y$ for controlling writing of a 1 value, enabling the object Y to be assigned to a group A, to a group B, or to both groups at the same time;

$RTA_Y$ and $RTB_Y$ for controlling writing of a 0 value, enabling the object Y to be assigned to a group A, to a group B, or to both groups at the same time;

$RD_Y$ for controlling reading; and $OL_Y$, a common read output signal for all of the elements that might to store a relationship between the object Y and another object.

The element RMP2"(X,Y) comprises:

a bistable 66 that has a set input S, a reset input R, and an output 1;

a an OR gate 63 having two inputs and one output which is connected to the S input of the bistable 66;

an OR gate 67 having two inputs and one output which is connected to the R input of the bistable 66;

an AND gate 62 having two inputs and one output which is connected to a first input of the gate 63;

an AND gate 61 having two inputs and one output which is connected to the second input of the gate 63;

an AND gate 69 having two inputs and one output which is connected to a first input of the gate 67;

an AND gate 68 having two inputs and one output which is connected to the second input of the gate 67;

an AND gate 64 having an input connected to the output 1 of the bistable 66, an input connected to a conductor of the branch BO'2"(Y) conveying the signal $RD_Y$, and an output which constitutes an output of the element RMP2"(X,Y) and which is connected to a conductor of the branch BO2"(X), conveying a common output signal $OL_X$ and constituting a wired-OR WOR5"; and an AND gate 65 having an input connected to the output 1 of the bistable 66, an input connected to a conductor of the branch BO2"(X) conveying a signal $RD_X$, and an output which constitutes an output of the element RMP2"(X,Y) and which is connected to a conductor of the branch BO'2"(Y) conveying a common output signal $OL_Y$ and constituting a wired-OR WOR4".

For reading, there is no group A or B selection, a single addressing signal suffices: $RD_Y=1$ on the branch BO'2"(Y), when reading from object Y, or $RD_X=1$ on the branch BO2"(X), when reading from object X.

For writing, an object K may belong to one and/or the other of the two groups A and B, depending on the signals that are applied to the bus. For example, to write a 1 value:

if $STA_Y=1$ and $STB_Y=0$, the object Y belongs to group A only for writing;

if $STA_Y=0$ and $STB_Y=1$, the object Y belongs to group B only;

if $STA_Y=0$ and $STB_Y=0$, the object Y belongs to neither of the groups A and B, and therefore none of the memory elements that store the existence or the non-existence of relationships with the object Y are activated; and if $STA_Y=1$ and $STB_Y=1$, the object Y belongs both to group A and to group B.

Likewise, it is possible for the object to be assigned to group A or B for writing a 0 value, by means of the signals $RTA_X$ and $RTA_Y$. Naturally, the same operations are possible from the access point AP2"(X) for the object X.

A write operation in which the existence (or the non-existence) of a relationship is written in the element RMP2"(X,Y) relating to the objects X and Y is performed when the selection and operation control signals satisfy the following logic equation: $STA_X \cdot STB_Y + STB_X \cdot STA_Y = 1$ (or $RTA_X \cdot RTB_Y + RTB_X \cdot RTA_Y = 1$).

A person skilled in the art can implement other variants of the second embodiment, as intermediates between the variants RMP2 and RMP2", shown respectively in FIGS. 11 and 19.

Let us now consider the case of managing relationships in a set made up of static subsets of objects belonging to different categories. For example, let us consider managing a set of N objects comprising N1 objects which are cells and N2 objects which are time positions. In this example $N=N_1+N_2$. Such an example is not at all uniform because the relationships to be implemented are very different, namely:

managing the relationships between N1 possible cells (such as grouping them together in classes of priority, in sequence, etc.);

managing the relationships between N2 possible time positions (grouping together free time positions, sequence of busy time positions, etc.); and managing the relationships between N1 possible cells and N2 possible time positions (associating a cell with a time position).

Figure 20:
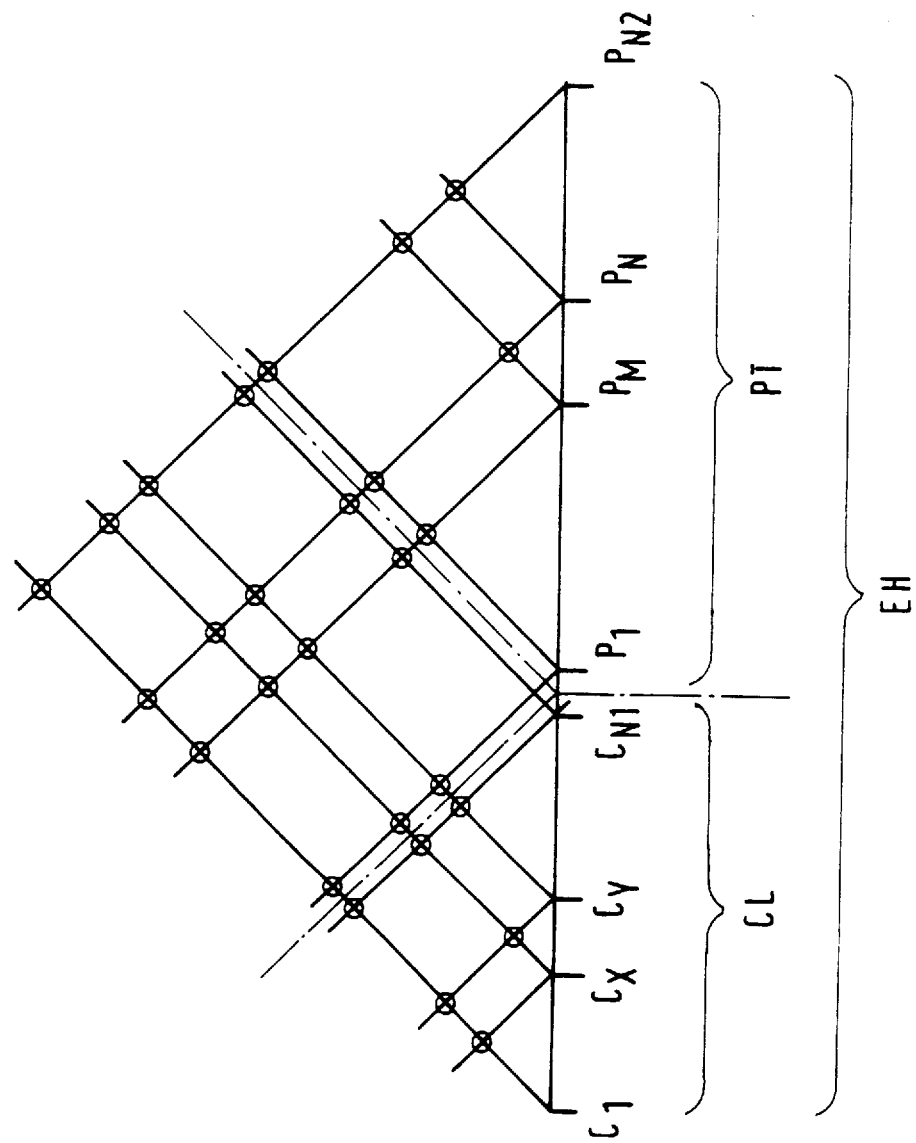
FIGS. 20 to 22 show the use of the apparatus of the invention in managing relationships between a plurality of static subsets of objects respectively grouping together objects belonging to different categories.

FIG. 20 is a diagram showing the array of apparatus of the invention, making it possible to manage such a non-uniform set EH comprising N objects. The logic circuits LM are not shown in this figure. The array is analogous to the triangular array TN shown in FIG. 3, which array managed a uniform set of N objects belonging to the same category. In the case being considered, the N access points of the array correspond respectively to the N objects of the set EH, e.g. by allocating the access points of rank 1 to N1 to the cells $C_1$, ..., $C_{N1}$ constituting the subset CL grouping together the cells, and by allocating the access points of rank N+1 to N respectively to the time positions $P_1$ to $P_{N2}$ constituting the subset PT grouping together the time positions. The make-up of the subsets CL and PT is fixed. The relationship management apparatus may be considered to be three simpler apparatuses D1, D2, D3 assembled together.

Figure 21:
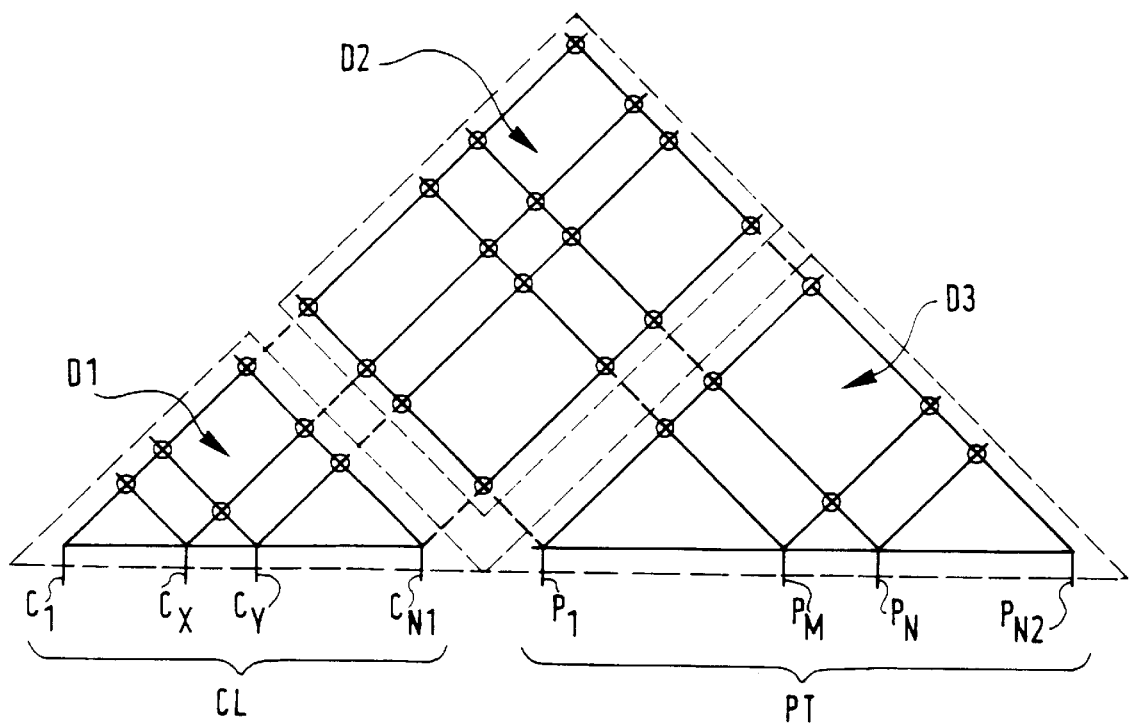

FIG. 21 shows the three simpler apparatuses:

apparatus D1 has a triangular structure and it manages the relationships between the N1 cells;

apparatus D2 has a rectangular matrix structure and it manages the relationships between the N1 cells and the N2 time positions; and apparatus D3 has a triangular structure and it manages the relationships between the N2 time positions.

In the particular case when it is not necessary to manage relationships between the time positions, the apparatus may be simplified by omitting apparatus D3.

Figure 22:
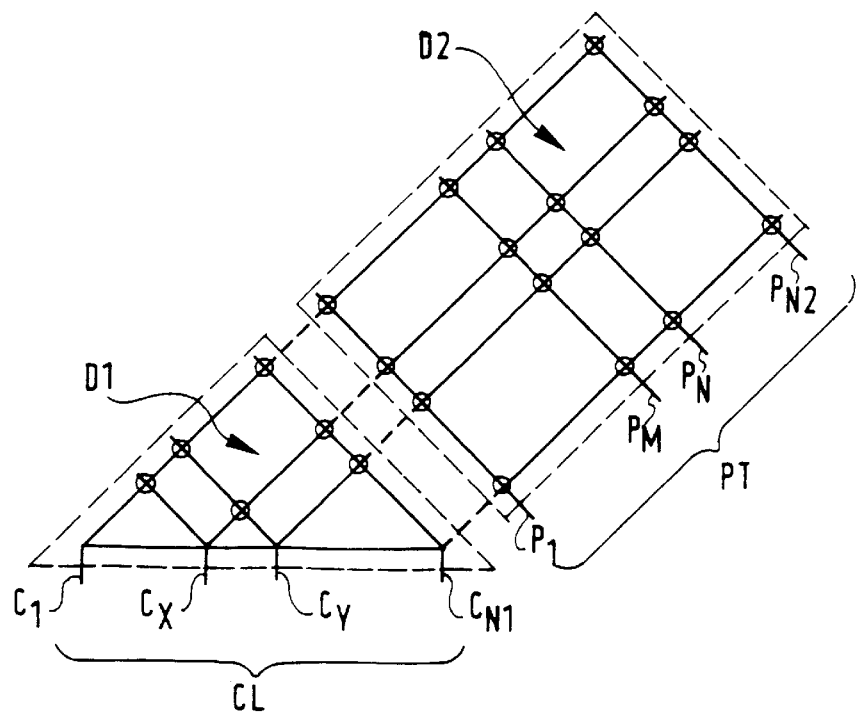

FIG. 22 is a diagram showing the array as simplified in this way. Apparatus D1 comprises a triangular array analogous to the array TN' described with reference to FIG. 3, while apparatus D2 comprises a rectangular array analogous to the square array SN described above with reference to FIG. 1.

Let us now consider managing relationships between the objects belonging to dynamic subsets. Such management consists in performing operations on certain relationships between objects that are not necessarily all known outside of the apparatus, but that belong to subsets identified indirectly. The apparatus of the invention is organized to manage N objects at the most, but in practice it manages only a number n of objects at a given instant, a number N-n of access points being "not used" or "free" at this instant.

The number of subsets to be managed depends:

either solely on the use that is made of the apparatus of the invention, in which case the number of subsets is fixed;

or else also on the states of the objects managed by the apparatus, in which case the number of subsets varies over time.

For example, the relationships between cells and time intervals referred to as time positions are managed by implementing subsets, each of which groups together cells associated to a given time position. The existence at a given instant of such a subset depends on the existence of at least one cell associated with the time position relating to the subset. Such a subset may therefore disappear at certain moments, if no cell arrives that is associated with one of the possible time positions.

FIGS. 23 to 26 show four examples of relationship elementary structures making it possible to manage the objects in a dynamic subset. In each of the structures, one of the objects F plays a special role and it is referred to as a "reference" object for accessing the subsets being considered. It is the only one of the objects in the subset that is known outside the management apparatus. The other objects are known only by the relationship management apparatus which stores the existence of relationships between all of the objects.

Figure 23:
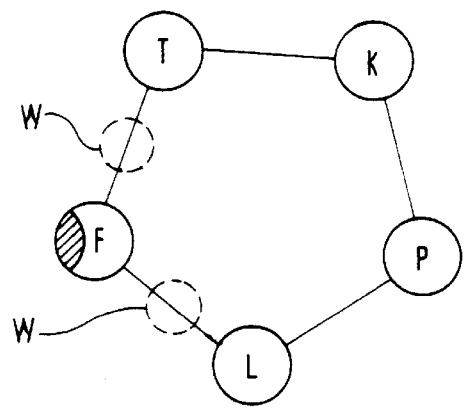
FIGS. 23 to 26 show four elementary structures of relationships making it possible to manage the objects of a dynamic subset.

FIG. 23 shows a ring structure which comprises the reference object F and objects T, K, P, and L, related by relationships F-T, T-K, K-P, P-L, and L-F, and forming a ring.

Figure 24:
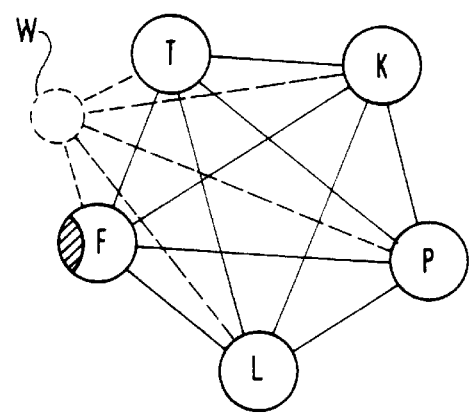

FIG. 24 shows a meshed structure in which the same objects are related by the same relationships as in the preceding structure, but with the following relationships as well: F-K, F-P, T-L, T-P, K-F, and K-L.

Figure 25:
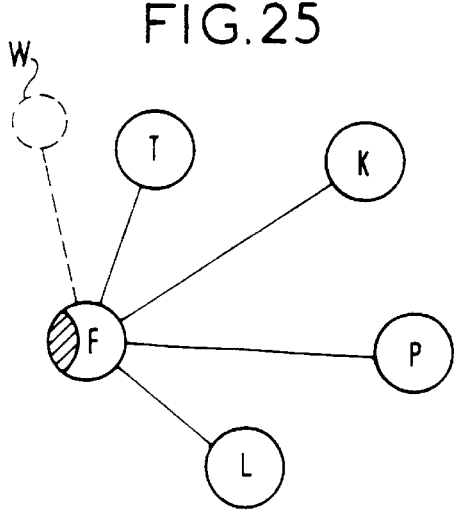

FIG. 25 shows a star structure comprising the same objects, but in which the only relationships are:

F-T, F-K, F-P, and F-L.

Figure 26:
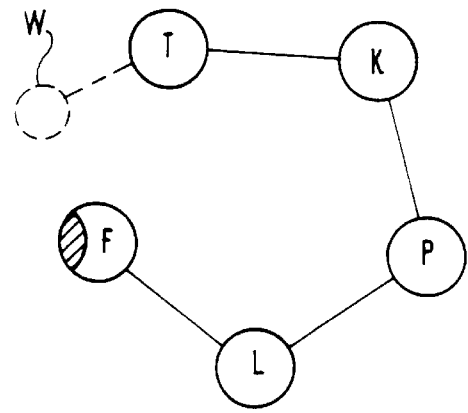

FIG. 26 shows a linear structure comprising the same objects but in which the relationships are: F-L, L-P, P-K, and K-T.

An additional object W may be added in different ways depending on the structure of the subset to which the object is to be added.

If the subset has a ring structure such as the structure shown in FIG. 23, the new object W is inserted either between objects F and T, or between objects F and L. This insertion involves releasing the relationship F-T, or F-L, and setting up two new relationships W-F and W-T, or W-F and W-L. This operation in which an object is added is therefore an operation that combines: identifying an object T or L which is related to F, releasing the relationship F-T or F-L, and setting up two new relationships F-W and W-T or F-W and W-L. It is performed by means that are described below.

If a new object W is to be inserted into the structure shown in FIG. 24, the object is to be related to all of the objects already present in the subset, which involves identifying all of the objects starting from the object F, and then setting up additional relationships W-T, W-K, W-P, W-L, W-F.

If a new object W is to be added to a subset having the structure shown in FIG. 25, it suffices to relate the object W to the reference object F (already known) via a new relationship W-F.

If a new object W is to be added to a subset that has the structure shown in FIG. 26, the new object W may be:

either related to the last object T of the structure, in which case the last object T must be identified from the object F, and a relationship W-T must be established (this alternative is shown in FIG. 26);

or else related to the first object F of the structure, in which case it suffices to set up a relationship W-F since the object F is already known as being the reference object and the first object of the structure.

Below, not only categories of object and dynamic subsets of objects are distinguished, but also groups of objects involved in an elementary operation, which objects do not necessarily coincide with a category of object or with a subset. The operations performed by the management apparatus of the invention may concern relationships between two or more objects belonging to one or more distinct subsets. The groups of objects involved in an operation are therefore generally different from the dynamic subsets. For example, such a group of objects may be:

a single object;

objects resulting from a logic operation on a plurality of subsets (union, intersection, exclusive OR);

a predetermined number of objects coming from a subset (e.g. transferred in fours from one subset to another);

etc.

In each of the structures shown in FIGS. 23 to 26, the reference object F of a subset plays a special role, in two possible ways:

either it is an object which has a special role as an access reference for the subset in question, so long as the object remains part of the subset, and if it leaves the subset the relationships must be reconfigured before another object can be designated as access reference;

or else it is an object which is chosen randomly from the set, during the processing of the objects, at a given instant, but which has no special role in the structure of the subset at the instant in question. It is then referred to as the "context reference object" for a given operation.

For the structures shown in FIGS. 23 and 24 which are symmetrical for all of the objects, any object can replace the access reference object without modifying the structure of the relationships between the objects. In the structures shown in FIGS. 25 and 26 which are not symmetrical for all of the objects, with the object F playing a special role as access reference, replacing the object F with another object involves prior reconfiguration of the relationships between the objects in the subset.

Figure 27:
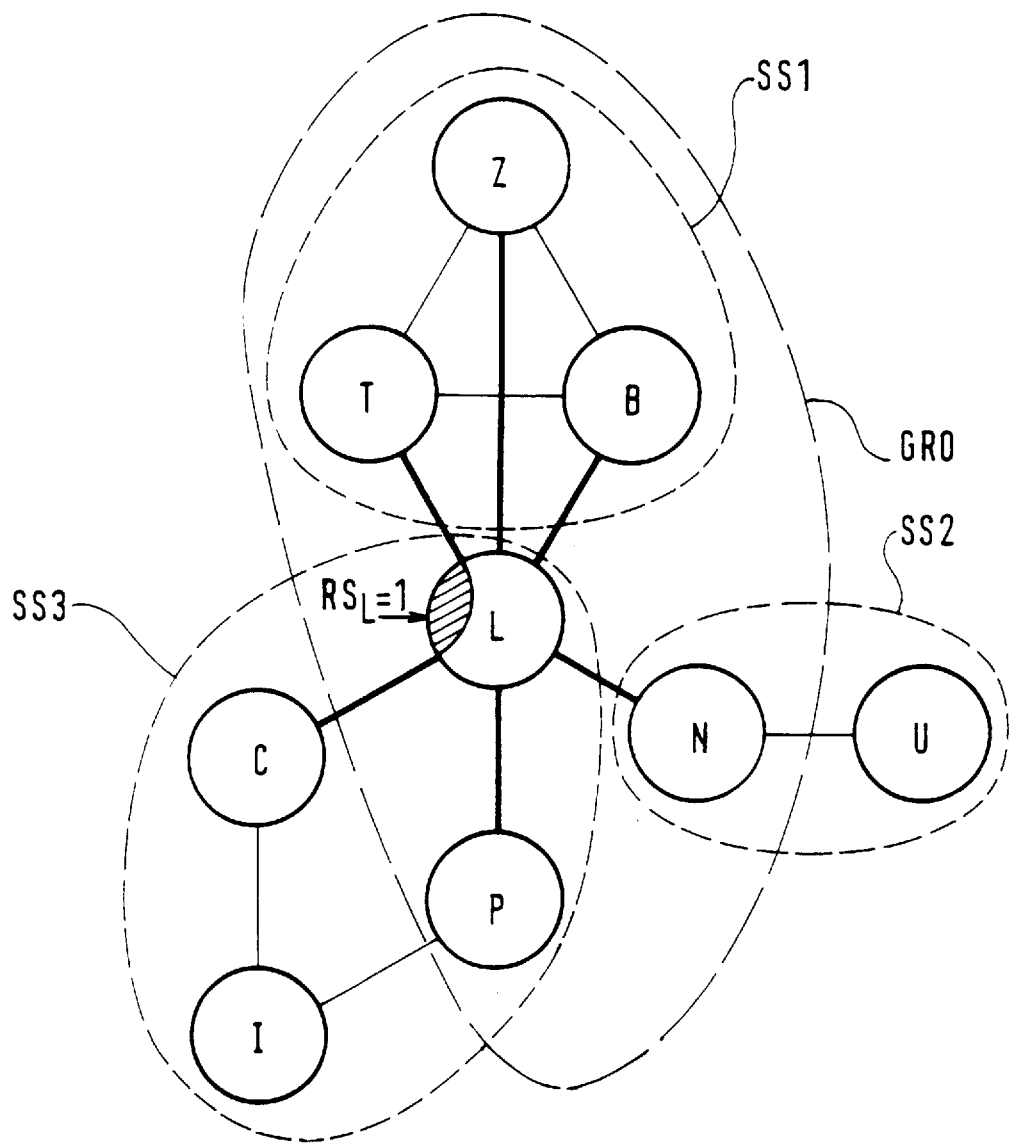
FIG. 27 shows the read operation for reading the relationships existing between a given object and the objects belonging to three distinct subsets.

FIG. 27 shows a read operation for reading relationships existing in a set of objects, from an object L, when the object L has relationships with objects belonging to three distinct subsets SS1, SS2, and SS3. In this example, the object L is a context reference object that belongs to the subset SS3. The subset SS1 has a meshed structure constituted by three objects: T, Z, B having relationships T-Z, Z-B, B-T between them and having relationships T-L, Z-L, B-L with the reference object. The subset SS2 has a linear structure constituted by two objects N and U having the relationship N-U between them, and having the relationship L-N with the reference object L. The subset SS3 has a ring structure made up of three objects C, I, and P plus L having relationships L-C, C-I, I-P, and P-L between them.

Reading is performed in apparatus such as, for example, the apparatus shown in FIG. 5, by supplying a signal $RS_L=1$ to the access point corresponding to the object L. The array supplies a response at the access points corresponding to the objects T, Z, B, N, P, C. The relationships that are read in this way are shown in bold lines in FIG. 27. This operation supplies the identities of all of the objects that have relationships established with L. By definition, these objects constitute a group of identified objects GRO which does not coincide with any of the dynamic subsets SS1, SS2, SS3, or with any particular combination of the subsets.

Figure 28:
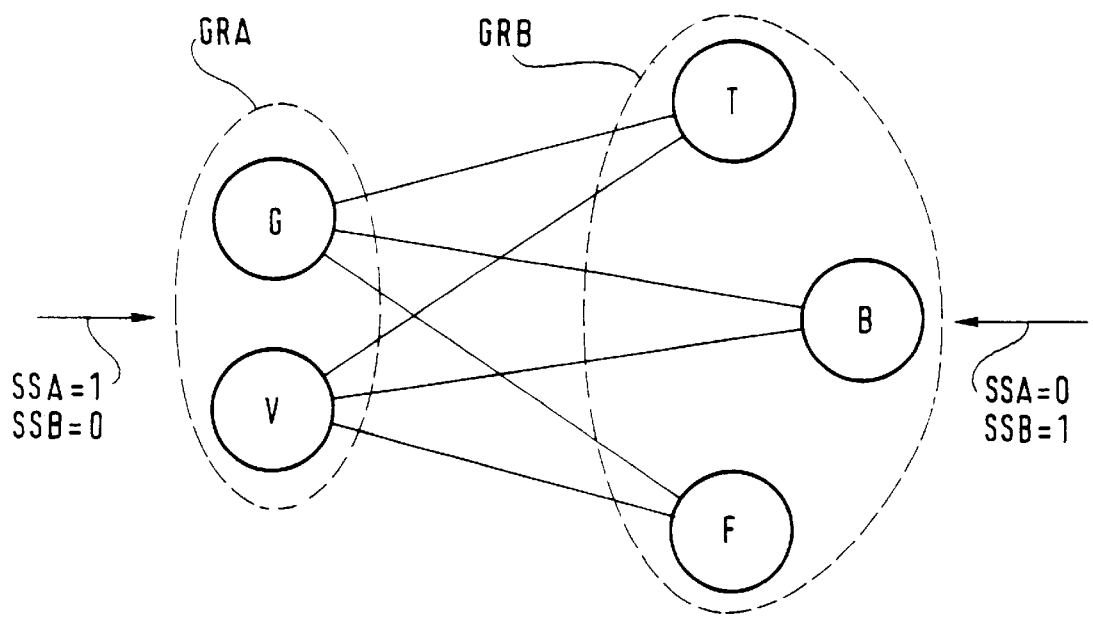
FIGS. 28 and 29 show a write operation concerning relationships between objects belonging to two groups.
Figure 29:
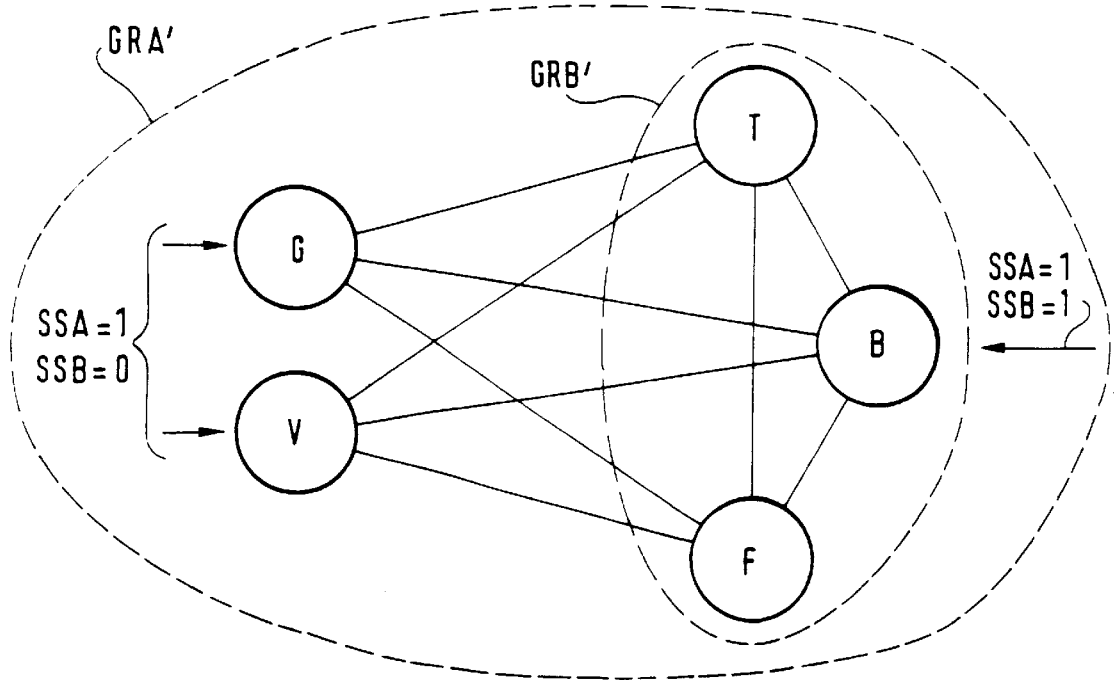

FIGS. 28 and 29 show a write operation concerning relationships between objects belonging to two groups of objects, by means of the embodiment of the apparatus of the invention shown in FIG. 11. FIG. 28 shows a relationship write operation, each relationship being established between an object of the group GRA and an object of the group GRB. FIG. 28 shows only the relationships affected by the write operation (i.e. established if ST=1 or removed if RT=1). This write operation does not modify the state of the relationships between the objects G and V constituting the group GRA, and does not modify the state of the relationships between the objects T, B, F that constitute the group GRB. The new relationships to be established are G-T, G-B, G-F, V-T, V-B, V-F. By means of the two selection signals SSB and SSA at each access point, the embodiment shown in FIG. 10 makes it possible to write on both groups of objects GRA and GRB so that the writing is effective only for relationships between an object G or V belonging to group GRA and an object T, B, or F belonging to group GRB. The control signals have the following values:

ST=1 or RT=1 on the common bus (set or reset);
SSA=1, SSB=0 for the group GRA; and
SSA=0, SSB=1 for the group GRB.

The designation A and the designation B may be permuted for the two groups: it suffices to permute the activation of the SSB and SSA lines at the access points corresponding to the respective objects in question.

It should also be noted that the same object may belong to a single group or to two groups, since each access point is provided with two selection signals SSB and SSA which can be activated simultaneously.

FIG. 29 shows such an example of a write operation for writing relationships between two non-disjoint groups: a group GRB' comprising objects T, B, and F, and a group GRA' comprising the same objects T, B, and F and additional objects G and V. The groups are defined by suitably activating the selection signals SSB and SSA at each of the access points corresponding to the respective objects:

SSA=1, SSB=0 for G and V; and
SSA=1, SSB=1 for T, B, and F.

Lines represent the relationships which are affected and whose existence or non-existence is stored by such a write operation concerning the groups GRA' and GRB'. These relationships are:

G-T, G-B, G-F, V-T, V-B, V-F, T-B, B-F, and F-T.

The relationships between T, B, and F are modified in this case since all three objects belong both to group GRA' and to group GRB'. In contrast, the relationship G-V between the objects G and V is not modified, since they belong exclusively to the group GRA'.

Let us now consider operations that are more complex than the read or write operations described above, and that a priori require a plurality of successive elementary operations to be performed, and therefore more time than an elementary operation.

Figure 30:
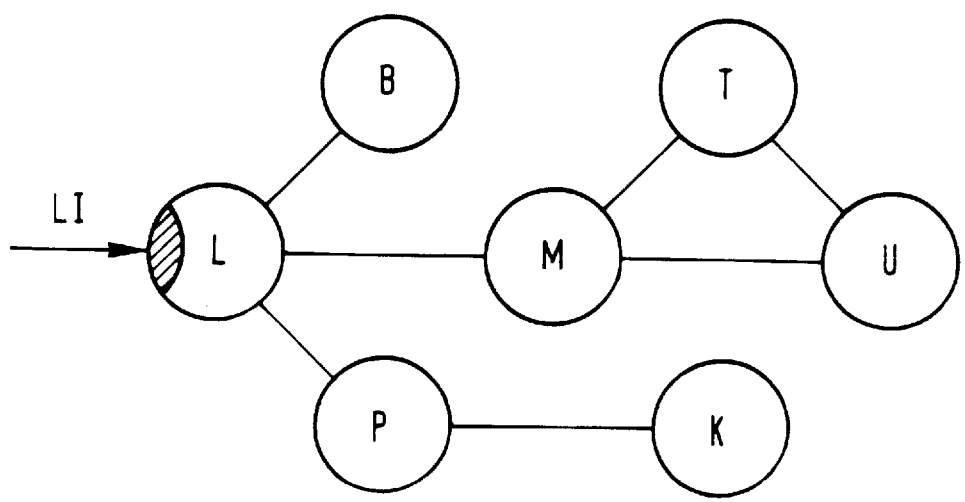
FIGS. 30 and 31 show a first complex operation consisting in releasing any relationship existing between an object and any other object.
Figure 31:
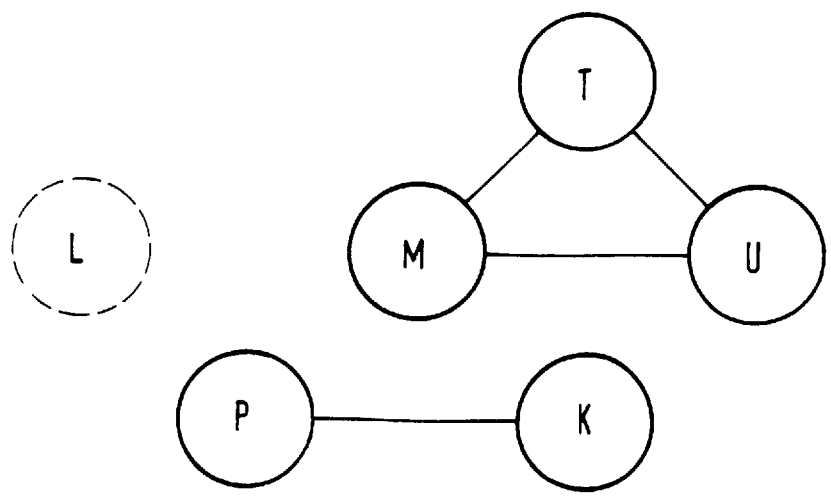

FIGS. 30 and 31 show a first complex operation which is an operation for releasing all of the relationships existing between a given object and any other object that is not known outside the relationship management apparatus. Such an operation is typically used to "remove" or "release" an object in the management apparatus.

Such an operation would be possible with a single elementary write operation only if the objects having relationships with the given object are known prior to the operation outside the apparatus, which generally involves determining the objects by a prior elementary read operation. The aim of the first complex operation is to perform the releasing in overall manner, by means of a single operation in the apparatus of the invention, and therefore much more quickly. In addition, it must be possible for this operation to be performed simultaneously on a plurality of different given objects.

FIG. 30 shows objects B, L, P, K, M, T, U that are related by the following relationships: L-B, L-M, L-P, P-K, M-T, M-U, U-T. In this example, an operation referenced LI consists in releasing all of the relationships between the object L and all of the other objects.

FIG. 31 shows the relationships remaining between the objects after the operation has been performed. The objects L and B are not shown because the apparatus stores no relationship with the objects L and B. But it continues to store the relationships:

P-K, M-T, M-U, U-T.

Releasing the relationships existing between a given object Z and any other object consists in writing a zero in the memory elements that are situated at the cross-points between the orthogonal bus corresponding to the object Z and all of the other orthogonal buses. Such a write operation is characterized by use of a single selection signal corresponding to the given object Z, all of the other objects being determined implicitly in this operation; thus, to perform such an operation it suffices for a memory element RMP(Z, X), where X is any object other than Z, to receive a single selection signal on the individual bus relating to the object Z. In this example the write operation is performed from a single object relative to any other object and it therefore implements only one object selection, like the read operation (unlike a relationship write operation between two explicitly designated objects that implements two object selections per relationship).

Functionally, this release operation therefore requires an additional operation control signal to distinguish it from the other operations. With the second embodiment RMP2(X,Z) of a relationship memory element, a release control signal is added to the common bus. With the first embodiment RMP1(X,X) for which the operation control signals are combined with the selection signals on the individual buses, a release control and selection signal can be defined as an additional signal ($RL_Z$) or else by means of an encoded combination of existing signals.

Such an encoded combination may, for example, be $RT_Z=1$ and $RS_Z=1$, which is not used for single read and write operations.

Figure 32:
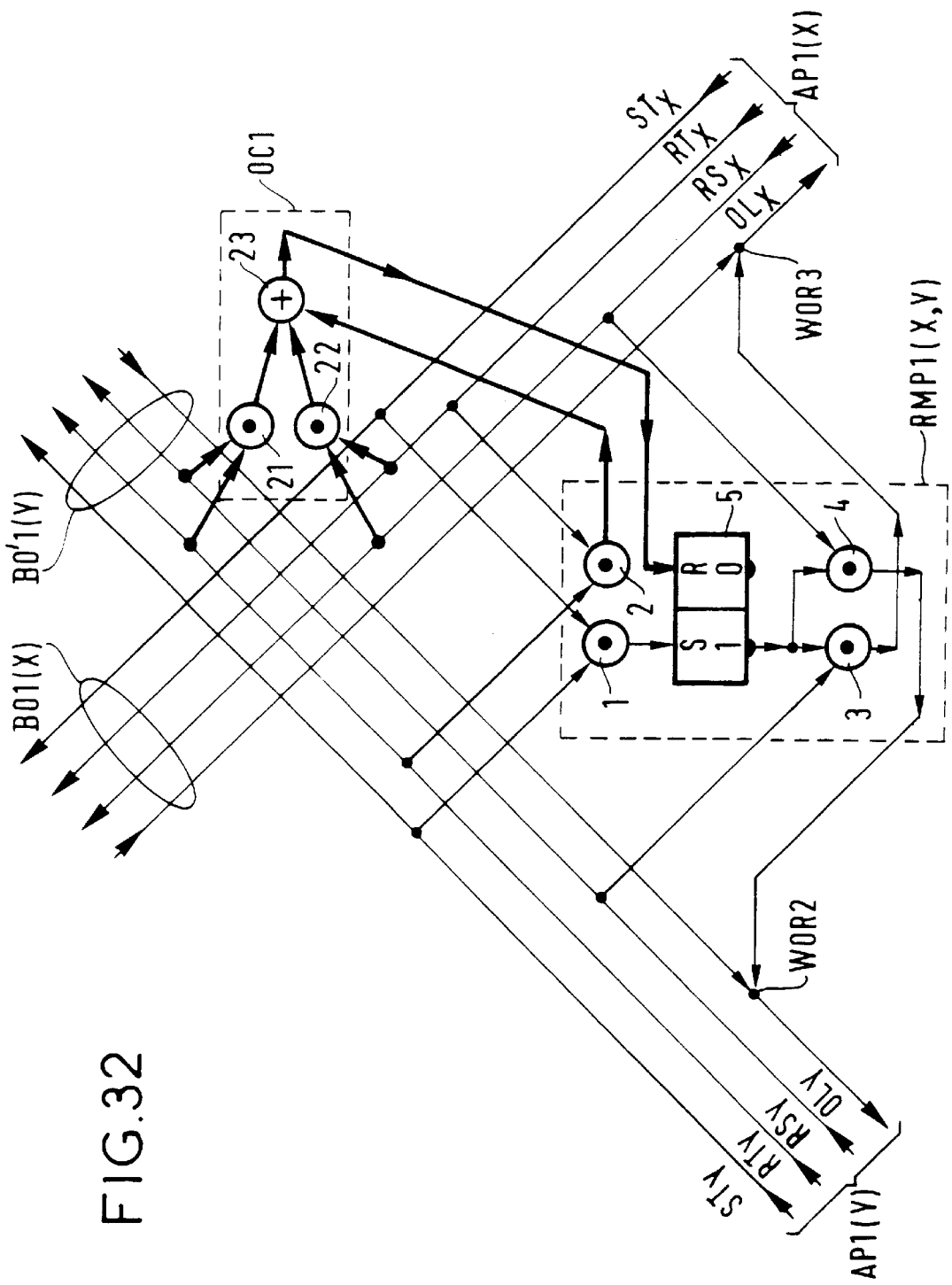
FIG. 32 is a diagram summarizing a variant of the first embodiment of a relationship memory element, which variant makes it possible to perform the first complex operation.

FIG. 32 is a diagram summarizing a variant of the first embodiment RMP1(X,Y) of a relationship memory element, which variant makes it possible to perform the first complex operation. It includes the same means as those shown in FIG. 5 plus additional means OC1 for performing the first complex operation under the command $RT_X=1$ and $RS_X=1$ if the relationships with the object X are to be removed, or $RT_Y=1$ and $RS_Y=1$ if the relationships with the object Y are to be removed. The additional means OC1 comprise:

a logic AND gate 21 having two inputs connected to respective ones of the two conductors of the branch BO'1(Y) that supply the signals $RT_Y$ and $RS_X$;

a logic AND gate 22 having two inputs connected to respective ones of the two conductors of the branch BO1(X) that respectively supply the signals $RT_X$ and $RS_X$; and a logic OR gate 23 having:
  three inputs connected respectively to an output of the gate 21, to an output of the gate 22, and to the output of the AND gate 2 of the memory element RMP1 (X,Y), which output is no longer connected directly to the R input of the bistable 5; and
  an output that is connected to the R input of the bistable 5.

The additional means PMP1(X,Y) and the memory element OC1 are shown separate in the figure, but in practice they constitute a single entity, referred to as the relationship memory element, which is placed at the cross-point of the branches BO1(X) and BO'1(Y).

By means of the additional means OC1, it suffices to apply the signals $RT_X=1$ and $RS_X=1$ to the access point AP1(X) corresponding to the object X to reset all of the memory elements liable to store the existence of a relationship between the given object X and any other object. Similarly, it suffices to apply the signals $RT_Y=1$ and $RS_Y=1$ to the access point AP1(Y) to reset all of the memory elements liable to store the existence of a relationship between a given object Y and any other object.

A person skilled in the art can transpose the means OC1 into the diagram of the variant RMP2" (FIG. 19) to perform the first complex operation.

Figure 33:
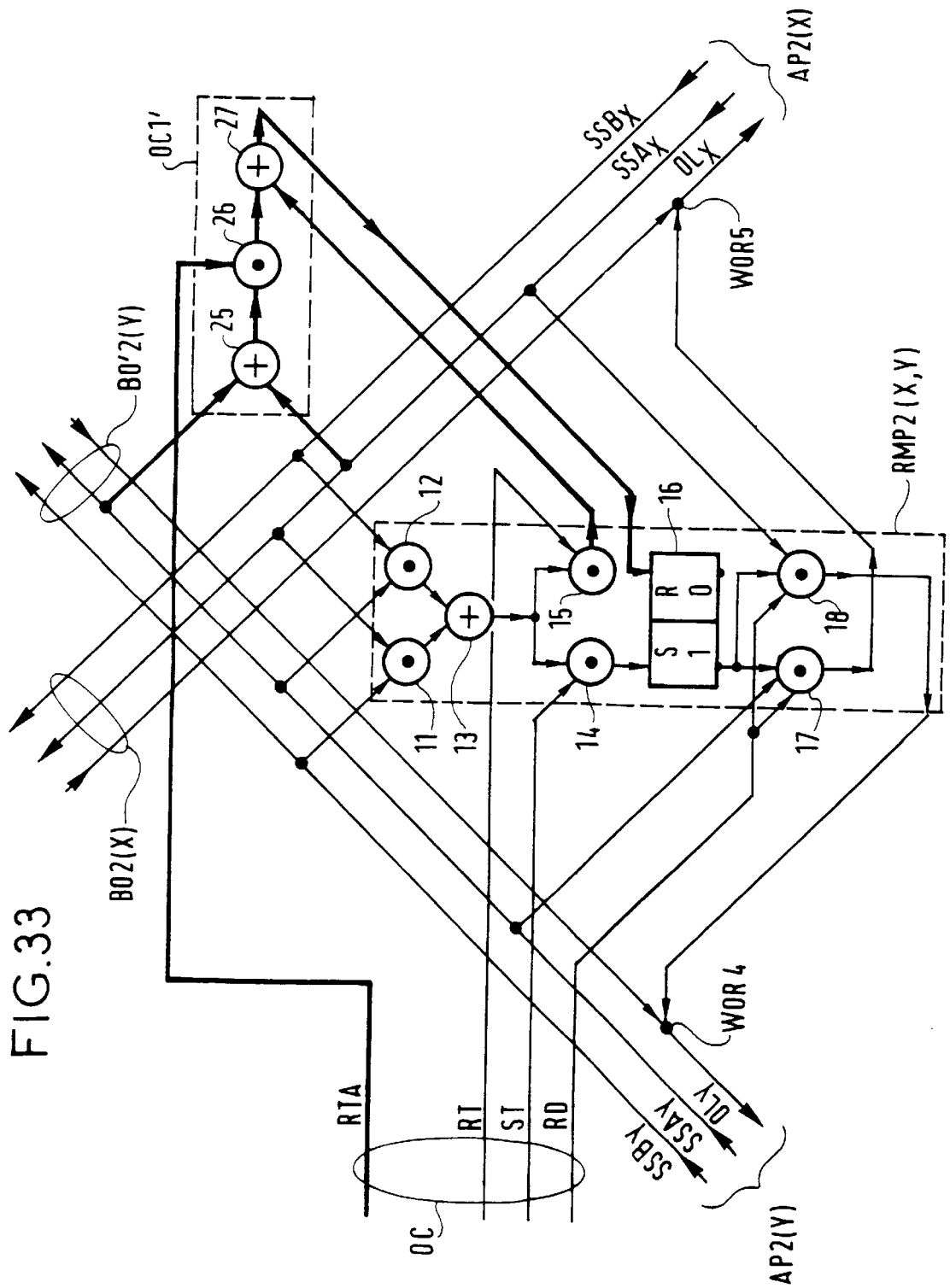
FIG. 33 is a diagram summarizing a variant of the second embodiment, which variant makes it possible to perform the first complex operation.

FIG. 33 is a diagram summarizing a variant of the second embodiment RMP2(X,Y) of a relationship memory element, which variant makes it possible to perform the first complex operation. This variant includes all of the elements shown in FIG. 11, and additional means OC1' which perform the first complex operation under a command RTA=1 and $SSA_Z=1$ for a given object Z. The selection signal $SSA_Z=1$ is applied to the orthogonal bus corresponding to the object Z, and the control signal RTA=1 is applied to a conductor which is common to all of the memory elements, and which may be an additional conductor of the bus OC.

The additional means OC1' shown in FIG. 33 performs the logic function $RTA.(SSA_X+SSA_Y)$ because the element RMP2(X,Y) must be reset when the first operation is performed on the object X, and when it is performed on the object Y. The additional means OC1' comprise:
  a logic OR gate 25 having two inputs connected respectively to the conductor of the branch BO'2(Y) that supplies the signal SSAY and to the conductor of the branch BO2(X) that supplies the signal $SSA_X$;
  a logic AND gate 26 having an input connected to the output of the gate 25 and an input receiving the common control signal RTA by means of a conductor which may optionally be integrated in the bus OC; and
  a logic OR gate 27 having: an input connected to the output of the gate 26; an input connected to the output of the logic AND gate 15, which output is no longer connected directly to the R input of the bistable 16; and an output which is connected to the R input of the bistable 16.

It can be observed that at least one other logic condition: $RTA.(SSB_X+SSB_Y)$ could be used to perform the first complex operation, by replacing the signal $SSA_Y$ with the signal $SSB_Y$, and by replacing the signal $SSA_X$ with the signal $SSB_X$.

Another variant of the second embodiment RMP2(X,Y) making it possible to perform the first complex operation, and another complex operation, is described below with reference to FIG. 51.

Figure 34:
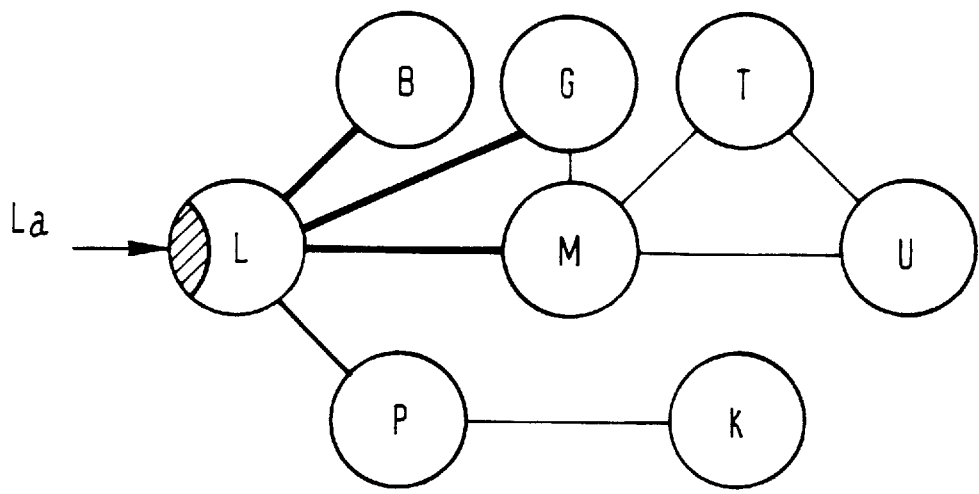
FIGS. 34 and 35 show a second complex operation consisting in two simultaneous read operations for reading all of the relationships existing between two given objects and other objects, with the output being separated into respective groups for the objects identified by the two read operations.
Figure 35:
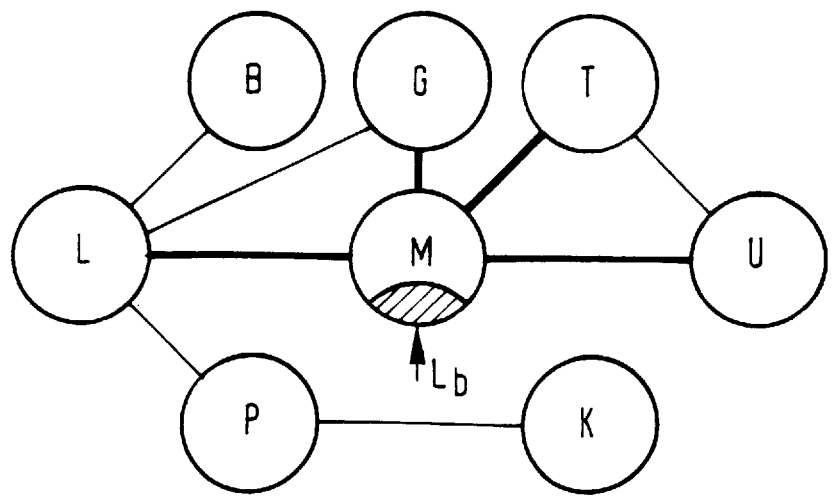

FIGS. 34 and 35 together show a second complex operation consisting in two simultaneous read operations $L_a$ and $L_b$ for reading all of the relationships established with two given objects, with separate outputs for the identified objects distributed in two distinct groups A and B. FIG. 34 shows the first read operation $L_a$ consisting in reading which objects are related to a given object L from among the objects B, G, M, T, U, P, K unknown outside the relationship management apparatus. In this example, reading from object L must identify for the group A the objects B, G, M, and P using the following relationships: L-B, L-G, L-M, L-P which are shown in bold lines in the figure.

FIG. 35 shows the second read operation $L_b$ performed simultaneously from the given object M, from among the same objects B, G, M, T, U, P, K. The second read operation must identify for the group B the objects L, G, T, U using the following relationships: M-L, M-G, M-T, M-U.

It can be observed that in this example the relationship L-M is read twice. In contrast, the relationships T-U and P-K are never read since they are not relationships established with the objects given as references: L and M.

The second complex operation offers the advantage of reading simultaneously a group A (comprising the identified objects B, G, M, and P) from L, and a group B (comprising the identified objects L, G, T, U) from M, in a single operation, but while separating the results so as to distinguish between objects belonging respectively to the two groups of identified objects A and B. This involves duplicating the read means in the relationship management apparatus, i.e.:
  at each orthogonal bus, making it possible to control a read operation $L_a$ from the first object L for a group A, and a read operation $L_b$ from the second object M for a group B; and having two distinct read output signals corresponding respectively to the read operation $L_a$ and to the read operation $L_b$; and
  at each memory element, providing a read logic condition that takes into account the two read control possibilities $L_a$ and $L_b$.

Figure 36:
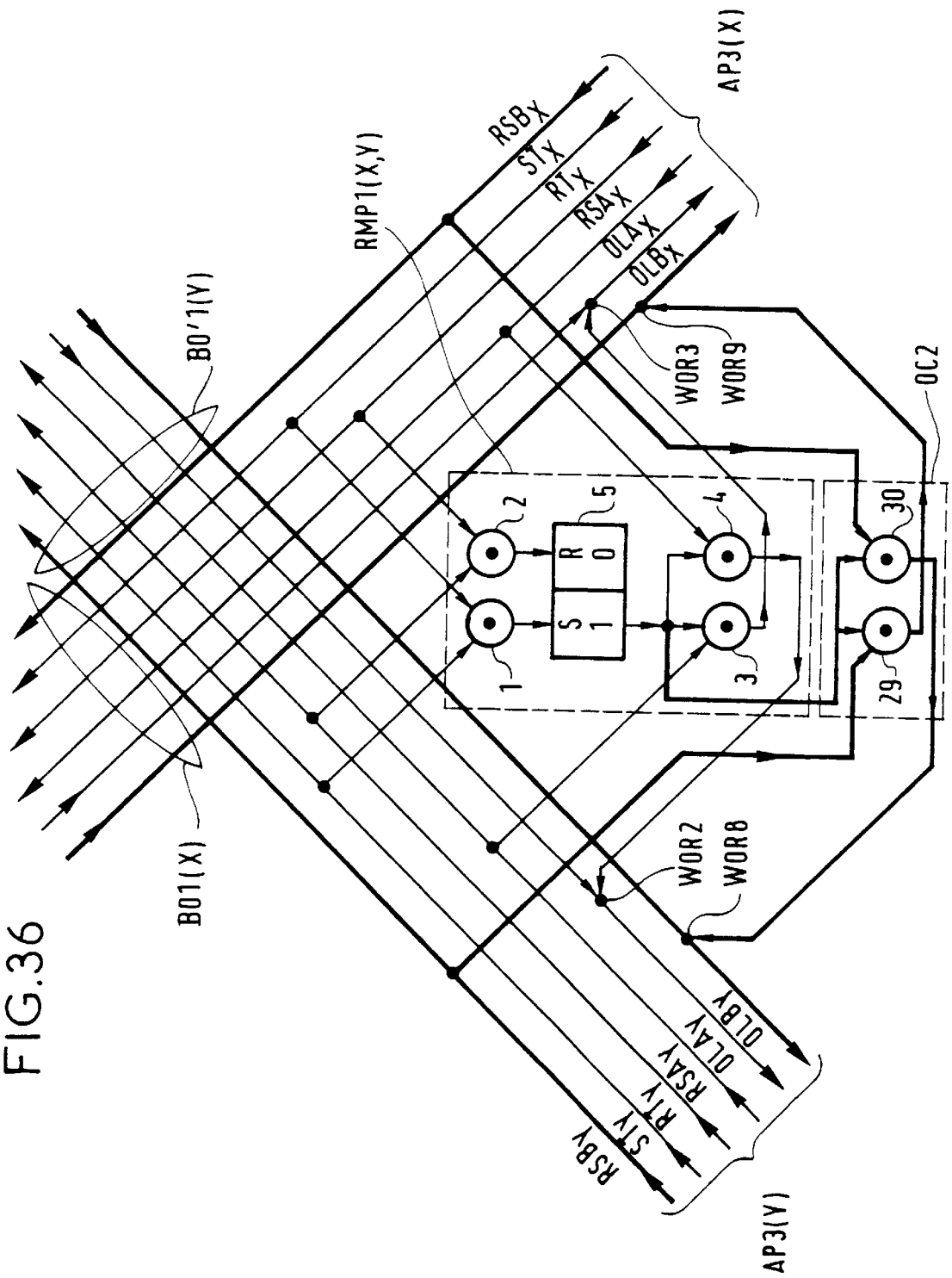
FIG. 36 is a diagram summarizing a variant of the first embodiment, which variant makes it possible to perform the second complex operation.

FIG. 36 is a diagram summarizing a variant of the first embodiment RMP1(X,Y) of a relationship memory element. This variant makes it possible to perform the second complex operation making two simultaneous read operations possible. It includes the same means as those shown in FIG. 5 and described above, plus additional means. The additional means comprise:
  two additional conductors in each branch of each orthogonal bus; a first conductor is added to the branch BO1(X) for transmitting a signal $RSB_X$ which is applied to an access point AP3(X); a second additional conductor is added to the branch BO1(X) for receiving the signals $OLB_X$ and for conveying them to the access point AP3(X), this second additional conductor constituting a wired-OR WOR9; a first additional conductor is added to the branch BO'1(Y) for conveying a signal $RSR_Y$; a second additional conductor is added to the bus BO'1(Y) for receiving signals $OLB_Y$ and conveying them to an access point AP3(Y), this second additional conductor constituting a wired-OR WOR8; and
  additional logic means OC2 which include:
    a logic AND gate 29 having an input connected to the conductor conveying the signal $RSB_Y$, an input connected to the output 1 of the bistable 5, and an output connected to the conductor conveying the signal $OLB_X$; and
    a logic AND gate 30 having an input connected to the output 1 of the bistable 5, an input connected to the conductor conveying the signal $RSB_X$, and an output connected to the conductor conveying the signal $OLB_Y$.

The AND gate 29 conveys the information supplied by the output of the bistable 5 to the conductor conveying the signals $OLB_X$ if the signal $RSB_Y=1$ is applied to the access point AP3(Y), i.e. for reading objects which have relationships with the object Y and which belong to a group B. The AND gate 30 conveys the information supplied by the output 1 of the bistable 5 to the conductor conveying the signals $OLB_Y$ if the signal $RSB_X=1$ is applied to the access point AP3(X), i.e. for reading objects having relationships with the object X and belonging to group B.

The gates 3 and 4 operate in the same way as in the variant shown in FIG. 5, but they are used to convey information supplied by the output 1 of the bistable 5 only for reading objects belonging to group A. The signal $RS_Y$ is then referred to as $RSA_Y$. The read output signal $OL_X$ is then referred to as $OLA_X$. The signal $RS_X$ is then referred to as $RSA_X$. The signal $OL_Y$ is then referred to as $OLA_Y$.

Figure 37:
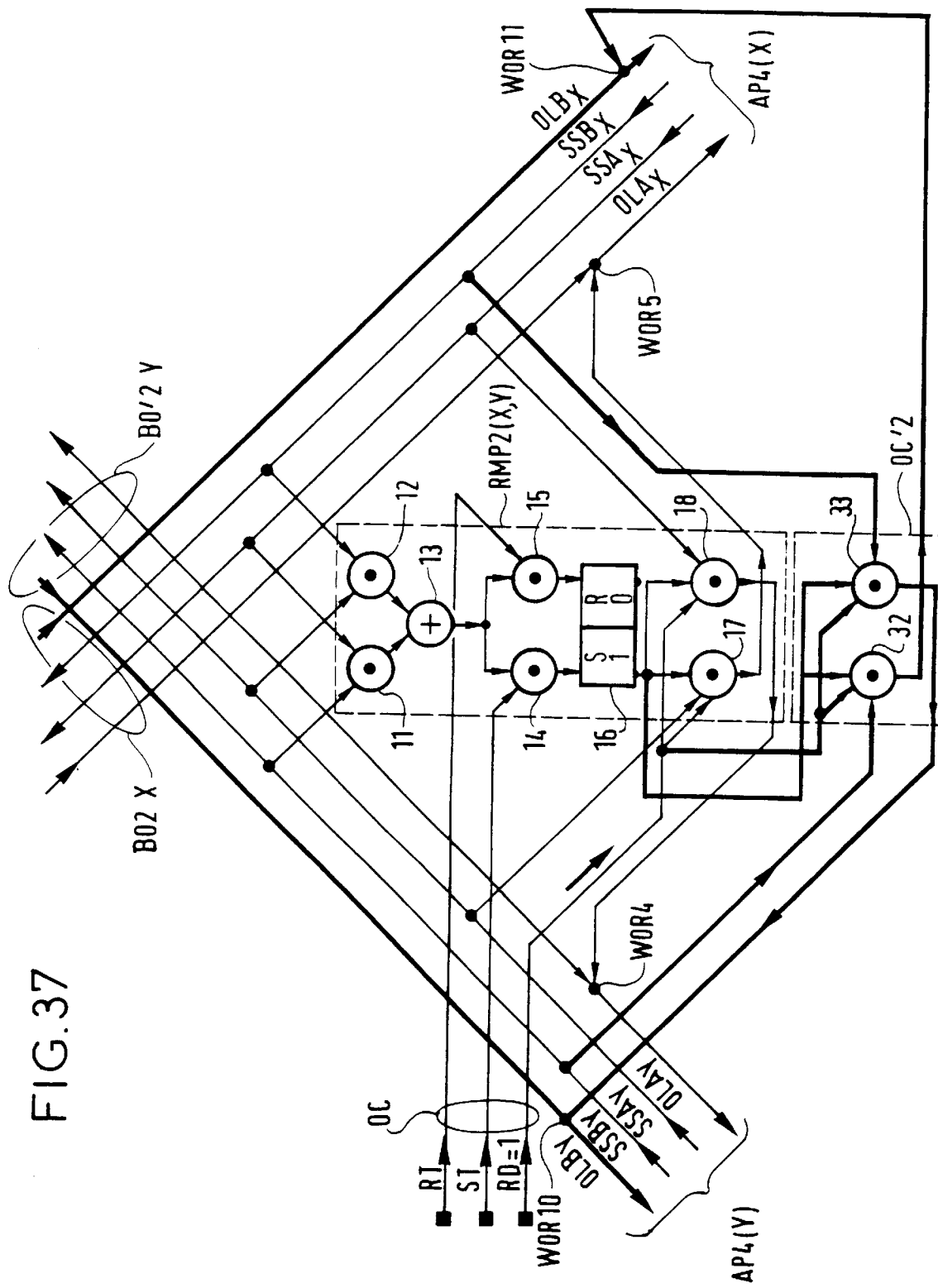
FIG. 37 is a diagram summarizing a variant of the second embodiment, which variant makes it possible to perform the second complex operation.

FIG. 37 is a diagram summarizing a variant of the second embodiment RMP2(X,Y) of a relationship memory element, which variant makes it possible to perform the second complex operation. This variant includes the same means as the second embodiment shown in FIG. 11, and additional means which comprise:

an additional conductor added to the branch BO'2(Y) for receiving read output signals $OLB_Y$, which conductor forms a wired-OR WOR10 and conveys the signals to an access point AP4(Y);

an additional conductor added to the branch BO2(X) for receiving read output signals $OLB_X$, which conductor forms a wired-OR WOR11 and conveys the signals to an access point AP4(X); and logic means OC'2 which comprise:

a logic AND gate 32 having: an input connected to the output 1 of the bistable 16, an input connected to the conductor of the branch BO'2(Y) that conveys the signal $SSB_Y$, an input connected to the conductor of the bus OC that conveys the common read control signal RD, and an output connected to the additional conductor that conveys the signals $OLB_X$; and a logic AND gate 33 having : an input connected to the output 1 of the bistable 16, an input connected to the conductor of the bus OC that conveys the common read control signal RD, an input connected to the conductor of the branch BO2(X) that conveys the signal $SSB_X$, and an output connected to the additional conductor $OLB_Y$.

When the common read control signal RD=1 is applied simultaneously with the signal $SSB_Y=1$, the gate 32 conveys the information supplied by the output 1 of the bistable 16 to the access point AP4(X), so as to indicate that an object X belonging to group B is related to the given object Y, when the bistable 16 supplies 1 information. When the signal RD=1 is applied simultaneously with a signal $SSB_X=1$, the gate 33 conveys the information supplied by the 1 output of the bistable 16 to the access point AP4(Y), so as to indicate that an object Y belonging to group B is related to the given object X, when the 1 output of the bistable 16 supplies 1 information.

The gates 17 and 18 operate in the same way as in the variant shown in FIG. 11, but they act for reading objects belonging to group A, which is why the signal $OL_Y$ is then referred to as $OLA_Y$, and the signal $OL_X$ is then referred to as $OLA_X$.

Naturally, if a read operation does not need to distinguish between two groups A and B, it suffices to perform a single one of the two reads, by applying either the signals corresponding to group A or the signals corresponding to group B.

Furthermore, if logic operations are to be performed between the objects of the identified groups A and B, after reading the objects constituting the groups, it suffices to connect a suitable logic circuit to the outputs supplying the signals $OLA_X$ and $OLB_X$ at each access point to perform the desired logic functions.

Figure 38:
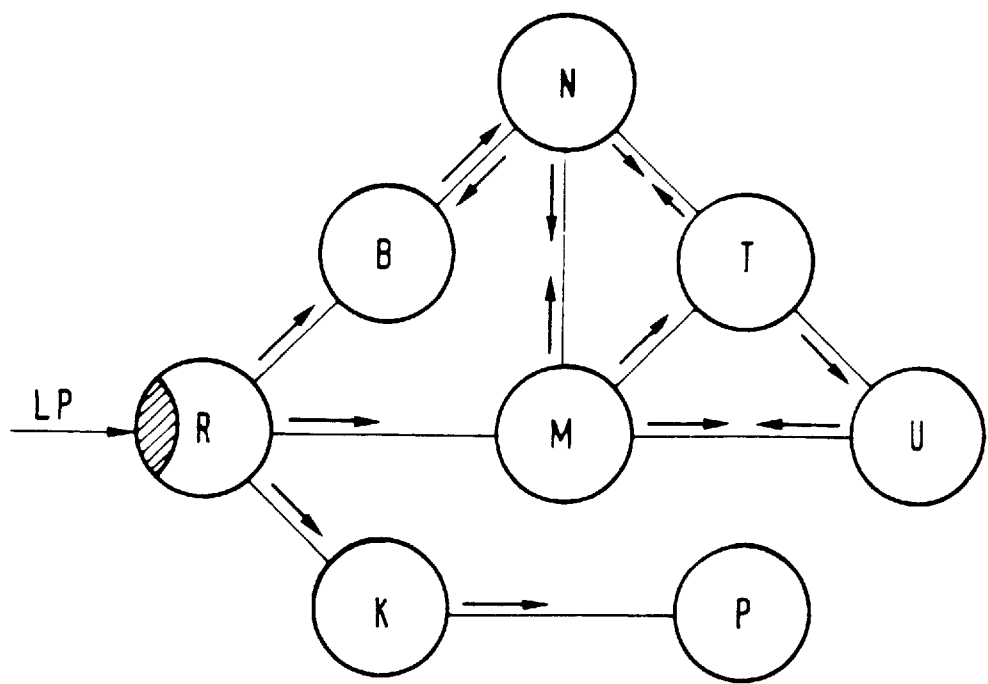
FIG. 38 shows a third complex operation consisting in reading by propagation.

FIG. 38 shows a third complex operation consisting in reading by propagation. Reading starts from a reference object R and propagates successively over all of the relationships established, firstly to objects B, M, K that are unknown a priori, but that are related directly to R. Then the reading propagates from objects B, M, K to objects N, T, U that are related indirectly to the object R; and from object P to object K.

Finally, the reading propagates from object N to objects B, M, T; from object T to objects N and U; and from object K to object P. This method of reading by propagation could be implemented by additional logic means at each memory element so that the reading propagates successively from one element to the next in the array itself, but a preferred embodiment consists in placing additional logic means at each access point.

Figure 39:
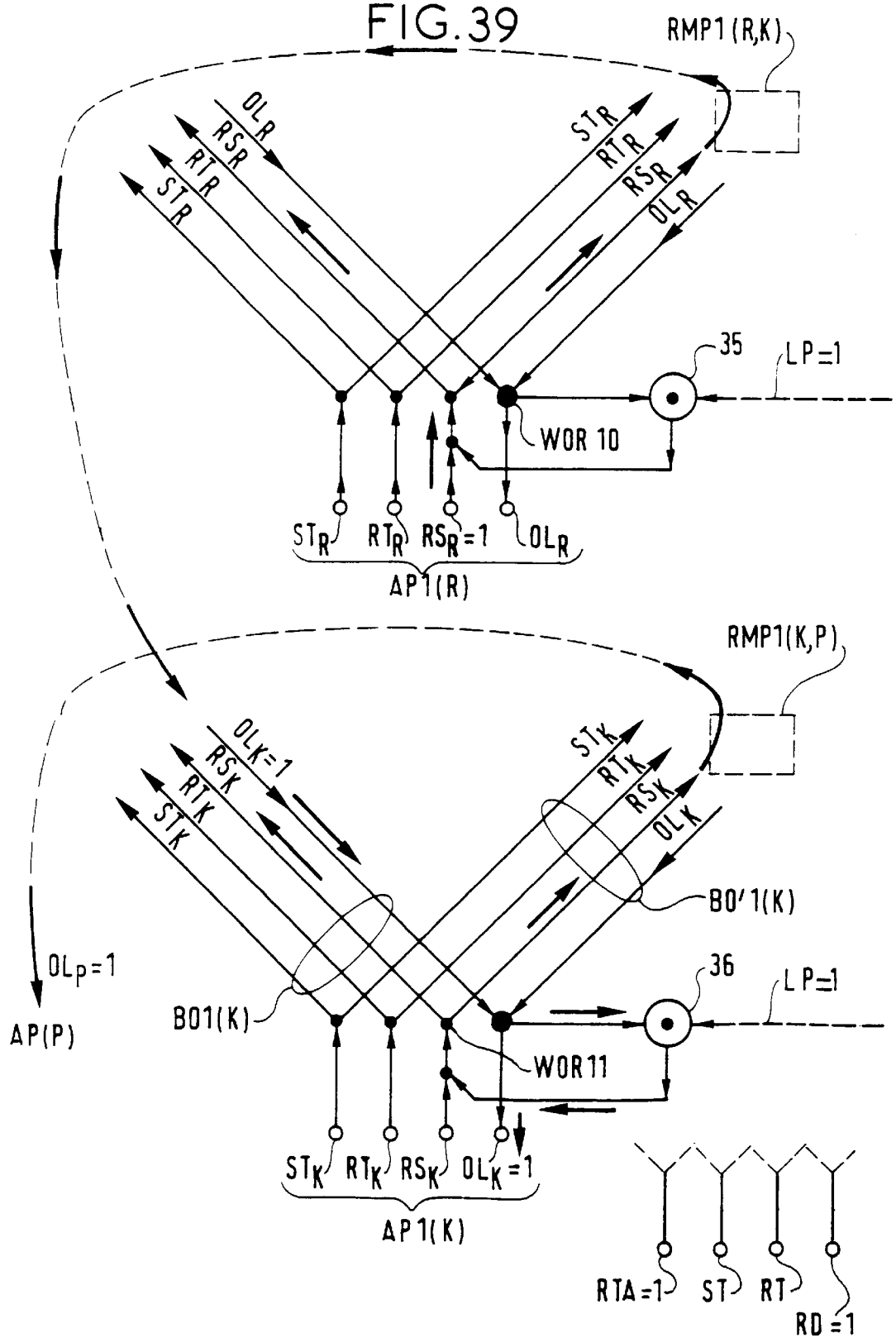
FIG. 39 is a diagram summarizing a variant embodiment of the access point shown in FIG. 6, which variant includes additional logic means for performing the third complex operation.

FIG. 39 is a diagram summarizing a variant embodiment of the access point AP1(K) shown in FIG. 6, which variant includes additional logic means for performing reading by propagation, which means are associated with each access point and with the corresponding control buses. FIG. 39 shows two examples of access points, AP1(K) and AP1(R) respectively corresponding to the objects R and K, for describing propagation of the reading from the reference object R to object K, then to object P, as shown in FIG. 38. The access point AP1(R) is provided with a logic AND gate 35 and the access point AP1(K) is provided with a logic AND gate 36. The gate 35 is provided with an input connected to a bus line LP that is common to all of the access points for controlling reading by propagation. Another input of the gate 35 is connected to the conductor of the access point AP1(R) receiving the read output signals $OL_R$; and an output is connected to the conductor of the access point AP1(R) that conveys the signal $RS_R$, which conductor constitutes a wired-OR WOR10.

Similarly, the access point AP1(K) is provided with a logic AND gate 36 having: an input connected to the control bus LP for controlling reading by propagation; an input connected to the conductor of the access point AP1(K) that conveys the signals $OL_K$; and an output connected to the conductor of the access point AP1(K) that conveys the signal $RS_K$, which conductor constitutes a wired-OR WOR11. The gates 35 and 36 may be situated among the logic means LM which supply the control signals to the access points of the array of relationship memory elements.

In FIG. 39, thick arrows show the propagation of the major signals in the example of reading by propagation consisting in particular in identifying objects K and P from the reference object R. Firstly, the signal $RS_R=1$ is applied to the access point AP(R) corresponding to the reference object R.

This signal triggers reading in a memory element RMP (R,K), whereupon a signal $OL_K=1$ appears on the orthogonal bus corresponding to object K. This signal enables in particular the AND gate 36 associated with the access point AP1(K). The gate 36 receives from elsewhere the signal LP=1 for triggering reading by propagation. The gate 36 therefore supplies a signal of value 1, which signal constitutes a read signal $RS_K$ which triggers reading in all of the memory elements liable to store the existence or the nonexistence of a relationship between object K and other objects that are unknown a priori. In this example, the memory element RMP1(K,P) supplies a read output signal $OL_P=1$ which indicates that object K is related to object P. This read output signal in turn activates a logic AND gate (not shown) which is associated with an access point corresponding to object P. This logic gate in turn transmits a read control signal $RS_P$, but, in this example, this reading detects no other object related to object P, other than object K which has already been found. The objects determined by this reading by propagation are known by means of the signals $OL_K=1$ and $OL_P=1$ which are supplied respectively by the access points AP1(K) and AP1(P).

Figure 40:
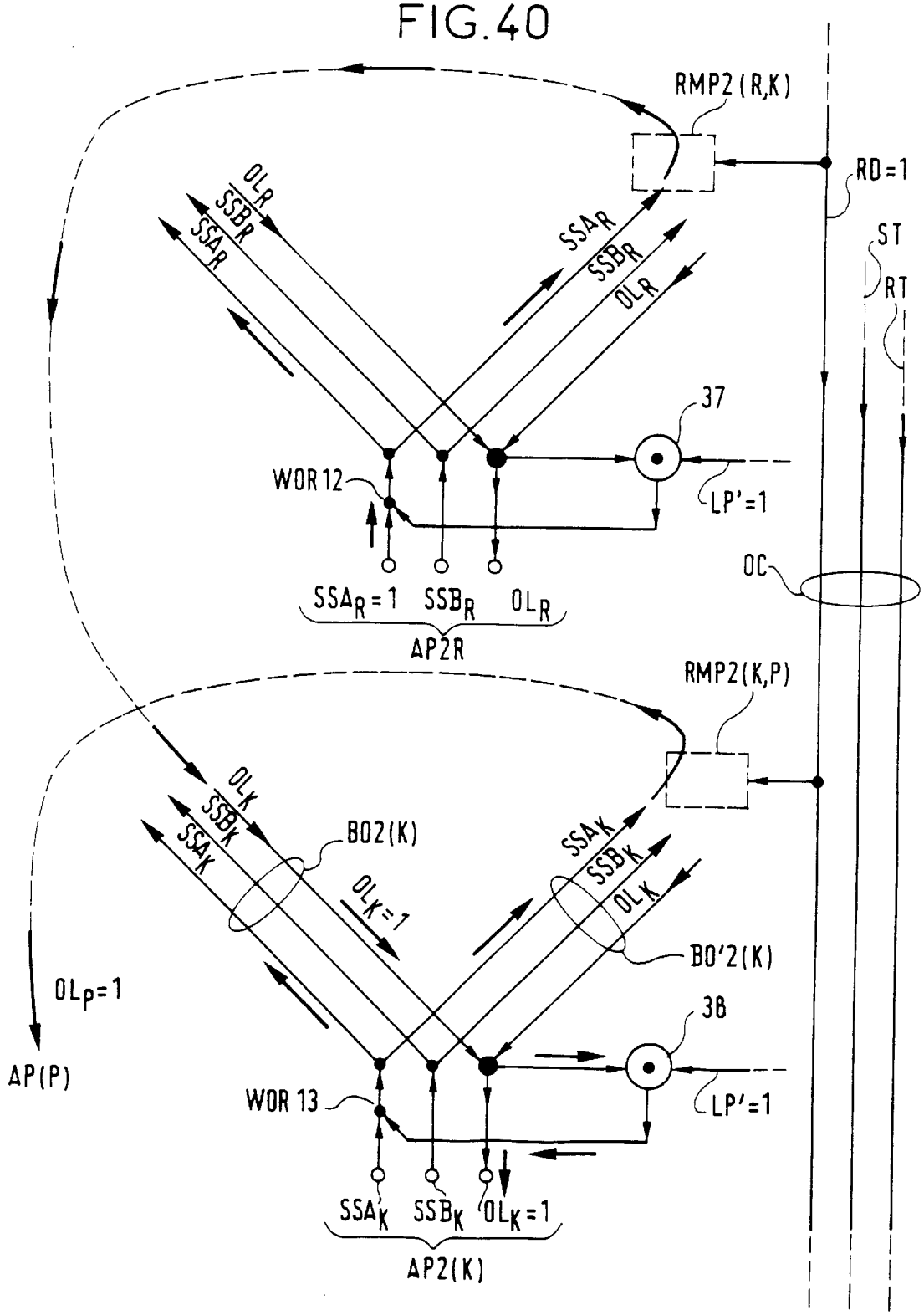
FIG. 40 is a diagram summarizing a variant embodiment of the access point shown in FIG. 12, which variant includes additional logic means for performing the third complex operation.

FIG. 40 is a diagram summarizing a variant embodiment of the access point AP2(K) shown in FIG. 11, which variant includes additional logic means for performing the third complex operation, reading by propagation. FIG. 40 also shows the access point AP2(R) corresponding to the object R. Each of the access points is provided with logic means constituted by a logic AND gate. The point AP2(2) includes a logic AND gate 37 having: an input connected to the conductor conveying the signals $OL_R$; another input connected to a bus which is a bus line common to all of the access points and conveying a signal LP'=1 for controlling reading by propagation; and an output connected to the conductor of the access point AP2(R) that conveys the read control signal $SSA_R$, which conductor constitutes a wired-OR WOR12. Similarly, the access point AP2(K) includes a logic AND gate 38 having: an input connected to the conductor of the access point AP2(K) that conveys the signals $OL_K$; another input connected to the bus line LP; and an output connected to the conductor of the access point AP2(K) that conveys the signals $OL_K$, which conductor constitutes a wired-OR WOR13.

In FIG. 40, the thick arrows show the essential signals in an operating example corresponding to the example of reading objects K and P by propagation from the reference object R. Reading by propagation from the object R is triggered by simultaneously applying a signal LP'=1 and a signal RD=1 over the bus that is common to all of the memory elements, and by applying a signal $SSA_R=1$, or $SSB_R=1$, to the access point AP2(R) corresponding to the reference object R. These signals cause reading from all of the memory elements that are connected to the orthogonal bus corresponding to the object R. In particular, the memory element RMP2(R,K) supplies a signal $OL_K=1$ to the orthogonal bus corresponding to the object K. This signal propagates to the access point AP2(K) where it enables the gate 38 which receives the signal LP'=1 from elsewhere. The output of the gate 38 supplies a 1 value signal which constitutes a read control signal $SSA_K=1$ on the orthogonal bus corresponding to the object K. This signal causes reading to be performed in all of the memory elements that are connected to the bus. In particular, a memory element RMP2(K,P) then supplies a signal $OL_P=1$ indicating the existence of a relationship between the object K and the object P. This signal propagates to the access point AP(P) where it enables another logic AND gate (not shown) which makes it possible to propagate the reading from the object P.

Figure 41:
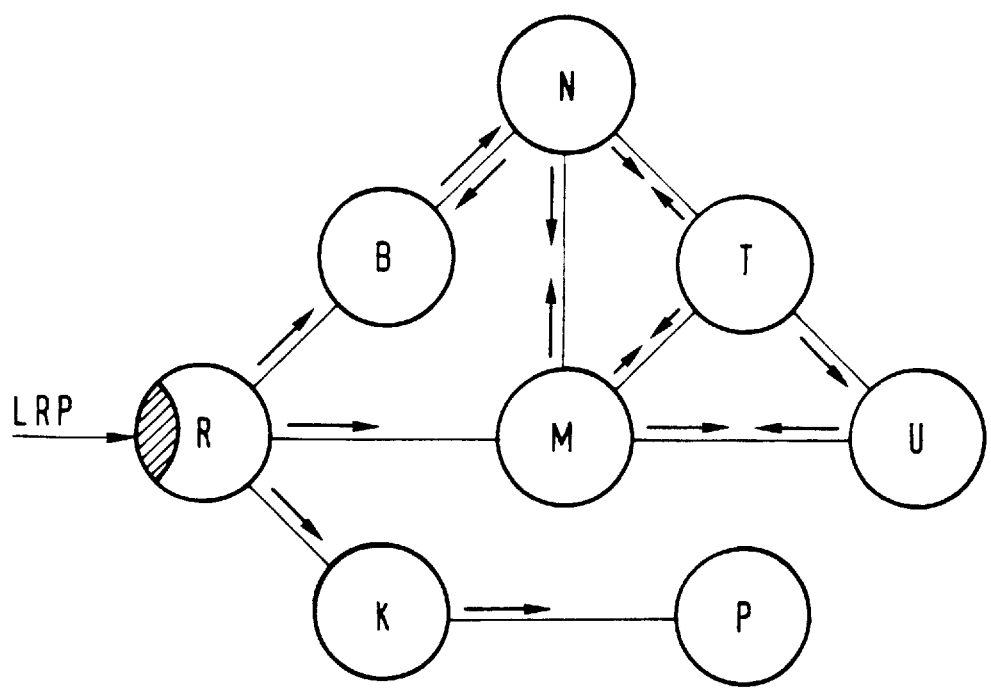
FIG. 41 shows a fourth complex operation consisting in releasing the relationships by propagation.

FIG. 41 shows an example of a fourth complex operation LRP consisting in releasing relationships successively by propagation. The objects and the relationships are the same as in the example shown in FIG. 38. This releasing consists in causing a release control signal to propagate from one object to another object that is related to it, which release control signal is the signal used in the first complex operation, making it possible to release all of the direct or indirect relationships between a given object and other objects that are unknown a priori. The above-described third complex operation (reading by propagation) is used prior to this to identify the object to which the first complex operation (releasing all relationships) is to be applied. The fourth complex operation is thus a combination of the first complex operation and of the third complex operation. It is preferably implemented by additional logic means which are placed at access points rather than being distributed at memory elements.

FIG. 42 is a diagram summarizing a variant embodiment of the access point shown in FIG. 6. By way of example, it shows access points AP1(R) and AP1(K) corresponding to the objects R and K shown in FIG. 39. This variant makes it possible to perform the fourth complex operation, by means of elements RMP1-OC1 such as the element shown in FIG. 32 and described above.

In addition to the logic AND gates 35 and 36 described above for implementing the third complex operation, two additional logic AND gates 39 and 40 are provided. Gate 39 has: an input connected to the output of gate 35, an input connected to a bus common to all of the access points and conveying a signal LRP for releasing the relationships by propagation, and an output connected to a conductor belonging to the access point AP1(R), and conveying the signal $RT_R$ controlling resetting. Similarly, the logic gate 40 includes: an input connected to the output of the gate 36, an input connected to the common bus conveying the signal LRP, and an output connected to a conductor belonging to the access point AP1(K) and conveying the signal $RT_K$, which conductor constitutes a wired-OR WOR15.

The fourth complex operation is performed in two steps as shown in the timing diagram in FIG. 43. During a first time interval TO, a signal LP=1 is applied to the common bus for authorizing reading by propagation. Simultaneously a signal $RS_R=1$ is applied to the access point AP(R) for triggering a first read operation in the memory elements connected to the orthogonal bus corresponding to the object R. The signals essential for propagating the reading are represented by solid thick arrows. In this example, a memory element RMP1(R, K) contains 1 information which indicates the existence of a relationship between the object R and the object K. Reading by means of the signal $RS_R=1$ causes a signal $OL_K=1$ to be transmitted over the orthogonal bus corresponding to the object K. This signal is conveyed to the access point AP1(K) and it enables the gate 36. The gate 36 then supplies a signal $RS_K=1$ which triggers reading in all of the memory elements that are connected to the orthogonal bus corresponding to the object K. In particular, reading is performed in the memory element RMP1(K,P) which contains 1 information indicating the existence of a relationship between the object K and the object P. This memory element then transmits a signal $OL_P=1$ over an orthogonal bus (not shown) corresponding to the object P. This signal is conveyed by the bus to the access point corresponding to the object P, whereupon it triggers transmission of another read signal over the orthogonal bus corresponding to the object P. In this example, the reading triggered in this way does not detect the existence of any relationship beyond the relationship P-K which has already been found.

In contrast, reading by propagation further supplies positive responses on the access points respectively corresponding to the objects B, M, N, T, U.

Then during a time interval T1, the signals LP=1 and $RS_R=1$ are maintained, and a signal LRP=1 is applied over the common bus. The signals essential for propagating releasing of relationships are represented by dashed thick arrows. The signal LRP=1 enables the gate 39. This gate supplies a signal which constitutes a signal $RT_R=1$. The signals $RT_R=1$ and $RS_R=1$ are applied simultaneously to the logic means OC1 which are associated with each of the memory elements that are connected to the orthogonal bus corresponding to the object R, and in particular the element RMP1(R,K). These two signals cause resetting to be performed in all of the memory elements that are connected to the orthogonal bus corresponding to the object R, in particular the element RMP1(R,K). Similarly, the gate 40 is enabled by the signal LRP=1 and it supplies a signal constituting a signal $RT_K=1$ over the orthogonal bus corresponding to the object K. All of the memory elements connected to this orthogonal bus are reset, in particular the element RMP1(K,B). The same method of resetting is performed simultaneously on all of the orthogonal buses corresponding to the objects R, K, P, M, N, T, U that have already been identified.

To ensure that the fourth complex operation is performed properly, the signals LP=1 and LRP=1 must be applied with a time offset T0 that is long enough to ensure that all of the direct or indirect relationships with the reference object are identified prior to commencing release of the relationships; otherwise a premature release command might stop propagation of the identification of the objects before it is complete. In addition, the read output signals OL resulting from identification of the objects must be maintained throughout the entire release process in order to maintain enabling of the gates such as the gates 35 and 36 shown in FIG. 39. This condition may or may not require a signal-maintaining bistable to be provided controlled by each of the signals OL, at each access point, depending on the structure and technology used to implement the relationship management apparatus. The reset control signal RS=1 is then produced from the signal supplied by the output of the bistable and not directly from the read output signal OL.

Figure 44:
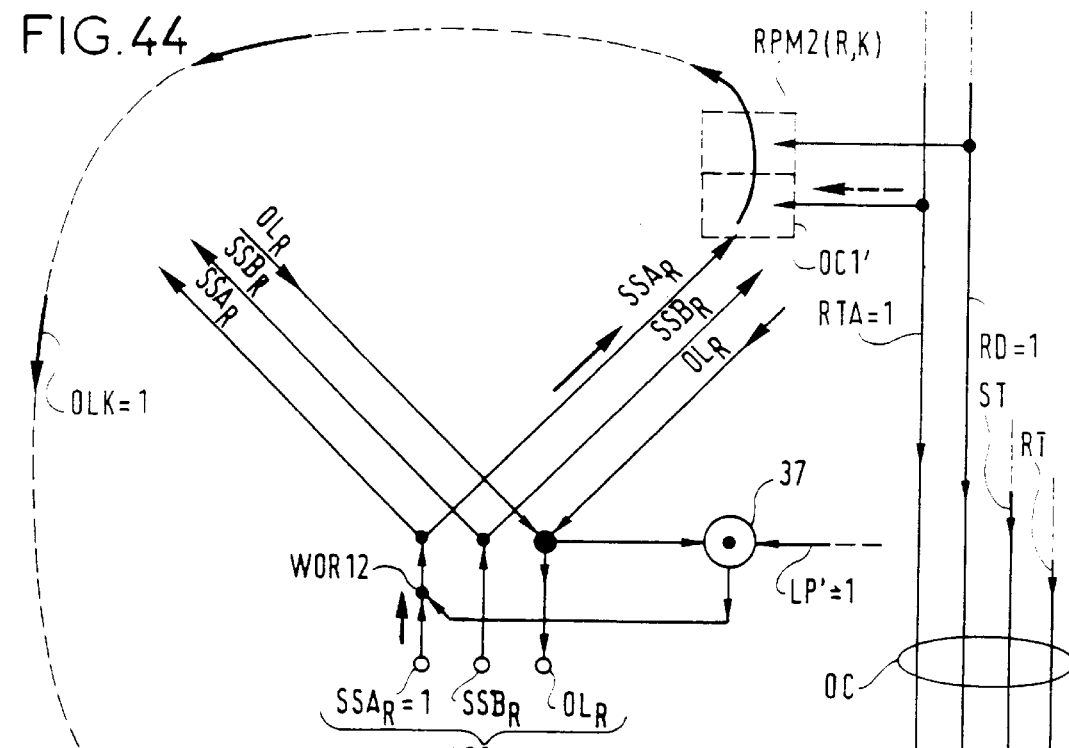
FIG. 44 is a diagram summarizing a variant embodiment of the access point shown in FIG. 12, which variant includes additional means making it possible to perform the fourth complex operation.

FIG. 44 is a diagram summarizing a variant embodiment of the access point shown in FIG. 12. By way of example, it shows access points corresponding to the objects R and K, this variant including additional logic means making it possible to perform the fourth complex operation. The fourth complex operation is performed by means of elements RMP2(X,Y)-OC'1such as those shown in FIG. 33. It does not require additional means compared with the first and third complex operations. FIG. 42 shows the paths followed by the signals.

Figure 45:
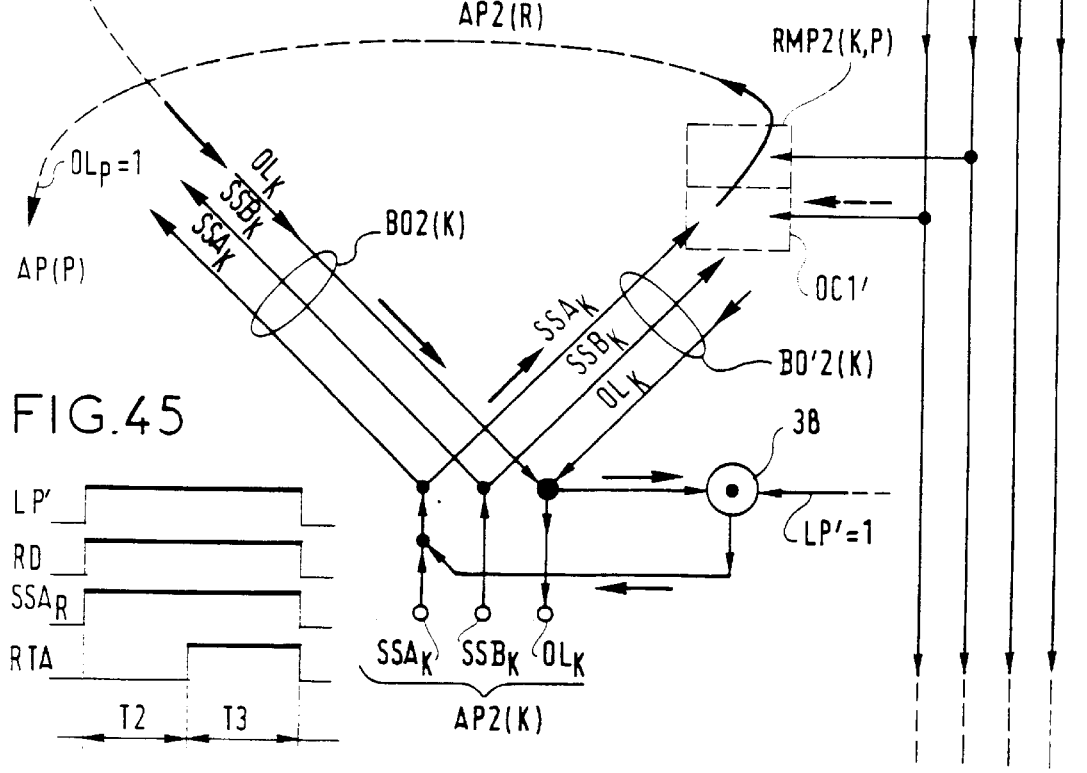
FIG. 45 is a timing diagram showing how the fourth complex operation is performed.

FIG. 45 is a timing diagram showing how the fourth complex operation is implemented. To perform the fourth complex operation from the reference object R, a signal LP'=1 is applied over the bus that is common to all of the access points, a signal RD=1 is applied to the control bus that is common to all of the memory elements, and a signal $SSA_R=1$ is applied simultaneously to the access point AP2 (R). The signal $SSA_R=1$ triggers reading in all of the memory elements that are connected to the orthogonal bus corresponding to the object R, in particular in the element RMP2(R,K). This reading supplies a signal $OL_K=1$ over the orthogonal bus corresponding to the object K. This signal is conveyed to the access point AP2(K) where it enables the gate 38. This gate receives the common read control signal LP'=1 from elsewhere. It therefore supplies a 1 value signal which constitutes a read control signal $SSA_K=1$ over the orthogonal bus corresponding to the object K. This signal triggers reading in all of the memory elements that are connected to the orthogonal bus corresponding to the object K, in particular in the element RMP2(K,P). This reading supplies a signal $OL_P=1$ over the orthogonal bus corresponding to the object P. This signal is conveyed to the access point AP(P) (not shown in FIG. 43) where it enables a gate analogous to the gate 38. Reading is thus propagated to all of the memory elements that are liable to store a relationship with one of the objects R, K, P, M, N, T, U.

After a predetermined lapse of time T2, a signal RTA=1 is applied for a duration T3 to the common control bus so as to enable a relationship release operation in the additional logic means OC1' that are associated with each of the memory elements, and that receive a signal SSA=1 from elsewhere, i.e. in the logic means OC1' associated with memory elements in which 1 information is actually being read. The dashed arrows show the paths followed by the signal RTA=1 for controlling release of the relationships. In this example, the logic means OC1' that are associated with the memory element RPM2(R,K) control resetting of the bistable of the memory element because they simultaneously receive the signal RTA=1 and the signal $SSA_R=1$ which is supplied by the gate 37. Similarly, the logic means OC1' associated with the memory element RMP2(K,P) simultaneously receive the signals RTA=1 and $SSA_K=1$ supplied by the gate 38, and they therefore trigger resetting of the element RMP2(K,P). The same process takes place in all of the memory elements containing 1 information and connected to the orthogonal buses corresponding to the objects R, K, P, M, N, T, U.

Figure 46:
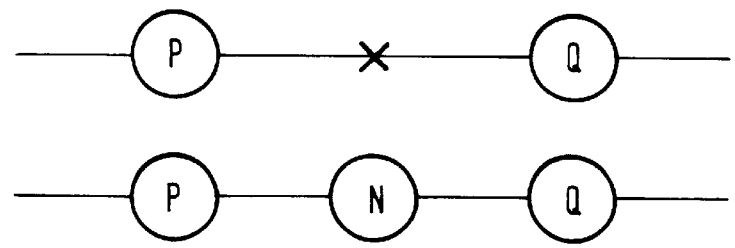
FIG. 46 shows a fifth complex operation consisting in releasing a relationship between two objects and in inserting a new object between the two objects by establishing two new relationships.

FIG. 46 shows an example illustrating a fifth complex operation consisting in releasing a possible relationship between two objects P and Q, but without knowing whether such a relationship exists, then in establishing two new relationships between a given third object (N) and respective ones of the two objects. The fifth complex operation is performed using a method which is independent of whether or not a relationship between P and Q exists prior to it.

Figure 47:
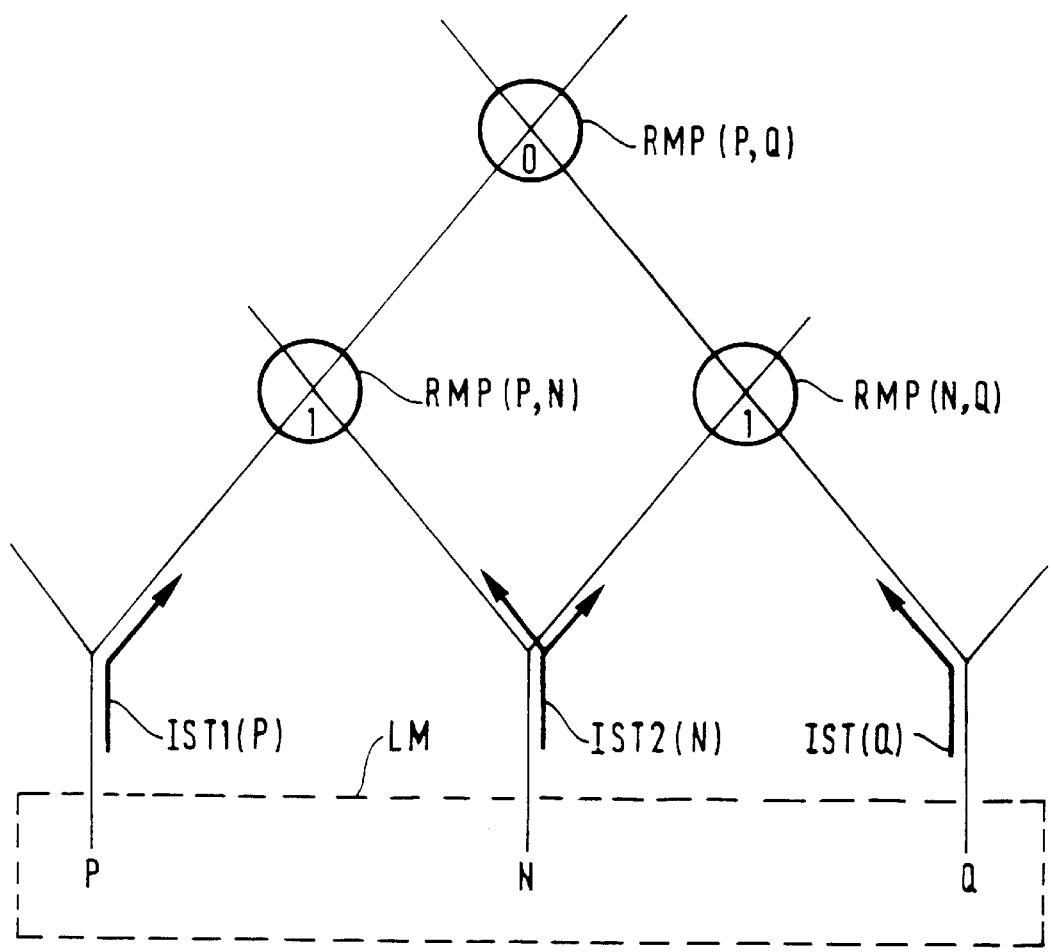
FIG. 47 shows how the fifth complex operation is implemented.

FIG. 47 illustrates how the fifth complex operation is implemented by showing the method of performing simultaneous selections that is used to perform: writing a 0 value in the element RMP(P,Q), a 1 value in the element RMP(P, N), and a 1 value in the element RMP(N,Q). This method offers the advantage of being performed simultaneously, without it being necessary for signals to propagate between the memory elements, or for the operation to be broken down into two consecutive steps. For this purpose, the three memory elements in question are selected by means of two different combinations of two types of selection information: IST1 referred to as selection information of type 1 and IST2 referred to as selection information of type 2. These two combinations of selection information are implicitly linked to two distinct write operations that can be performed simultaneously:

a write operation for writing a 0 value indicating the non-existence of a relationship between the objects P and Q in the element RMP(P,Q) under the control of the combination IST1(P).IST1(Q); and a write operation for writing a 1 value indicating the existence of a relationship between the objects N and P in the element RMP(P,N) under the control of the combination IST1(P).IST2(N), and of a relationship between the objects N and Q in the element RMP(N,Q) under the control of the combination IST2(N).IST1(Q).

In the example being considered, for performing the fifth complex operation for releasing a (possible) relationship between two objects and simultaneously establishing new relationships between a third object and said two objects, a memory element performs the 0 value write operation if it simultaneously receives two pieces of information of the same type IST1 over respective ones of the two buses at the cross-point of which the element is situated (first combination IST1/IST1). It performs the 1 value write operation if it simultaneously receives two pieces of selection information of different types IST1 and IST2 over respective ones of the two buses at the cross-point of which the element is situated (second combination IST1/IST2).

More generally, the method makes it possible to cause a plurality of different operations to be performed simultaneously on various relationship memory elements RMP whose respective objects may be arbitrary, i.e. not necessarily mutually exclusive, the various simultaneously performable operations belonging to disjoint subsets of operations. For this purpose:

- each individual bus is liable to convey a plurality of distinct types of selection signal, supplied by logic means LM coupled to the bus access points; and
- each memory element RMP is provided with logic means for selectively associating the various received types of selection signal with the various subsets of possible operations; this association being obtained for each subset of operations:
  - either directly by implicitly assigning a specific selection signal, in particular for an operation based on selecting a single one of the two objects corresponding to the element (such as reading from an object, or else writing the existence or the non-existence of relationships between an object and any other object);
  - or else by implicitly assigning a specific combination of selection signals received over the two individual buses connected to the element, for an operation based on simultaneously selecting the two objects corresponding to the element (such as writing the existence or the non-existence of relationships between the two objects).

Beyond the example of use constituted by the fifth complex operation, this generalized method enabling a plurality of different operations to be performed simultaneously offers the advantage of increasing tenfold the processing power of the relationship management apparatus.

In the example in question, to perform the fifth complex operation, the selection information and the operation control information may be structured differently depending on the embodiment of the memory element. FIG. 48 to 51 are diagrams summarizing three variant embodiments of four memory elements described above: RMP1(X,Y), RMP1"(X, Y), RMP2(X,Y), and RMP2"(X,Y).

Figure 48:
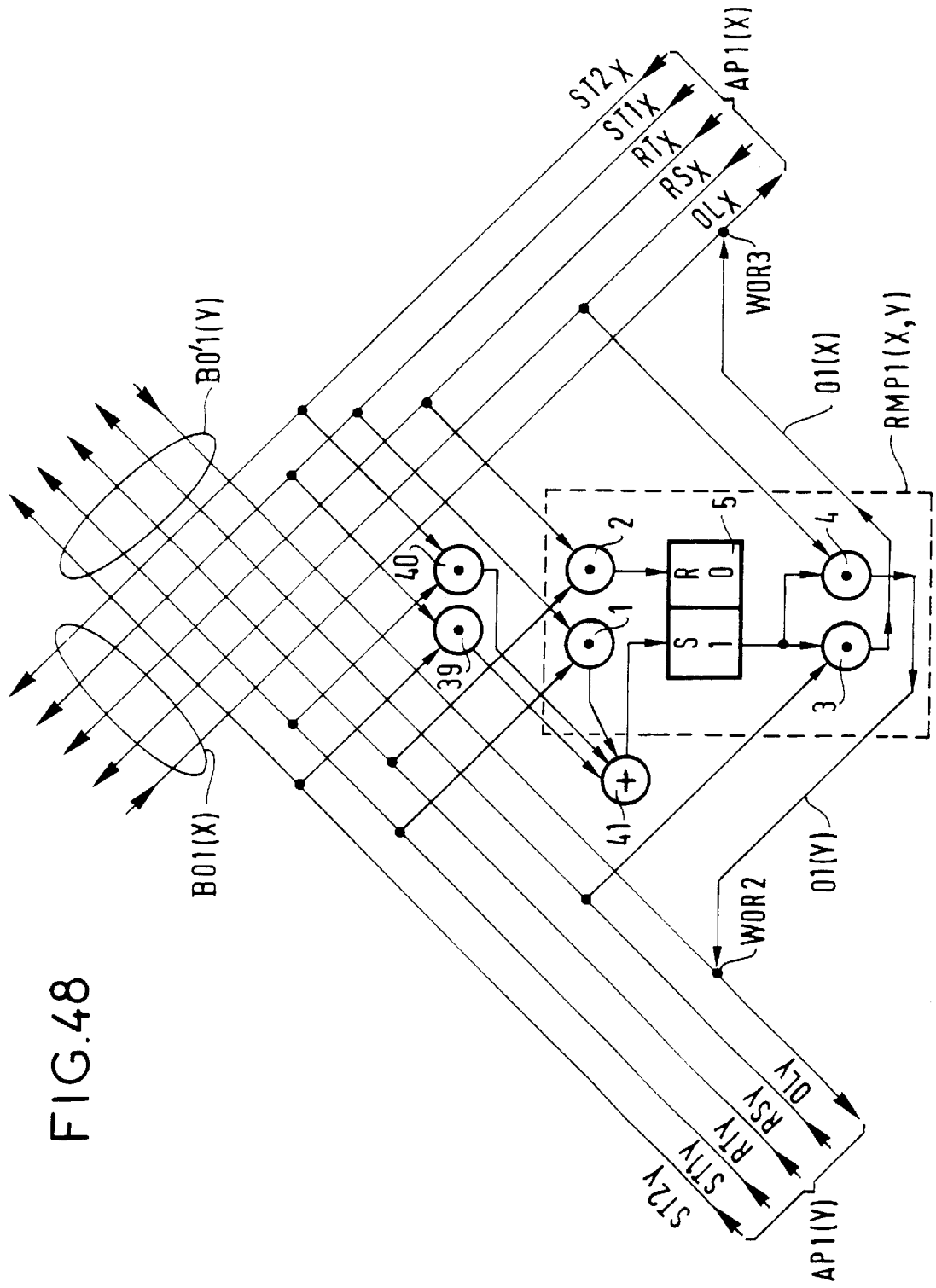
FIGS. 48 and 49 are diagrams summarizing two variants of the first embodiment, which variants include additional logic means for making it possible to perform the fifth complex operation.

FIG. 48 is a diagram summarizing the embodiment RMP1 (X,Y) as provided with additional means for performing the fifth complex operation. These additional means comprise:

- an additional conductor in each individual bus, the branch BO1(X) of the bus corresponding to the object X including by way of example an additional conductor for conveying a signal $ST2_X$, the signal $ST_X$ then being referenced $ST1_X$;
- an AND gate 39 having two inputs and one output, a first input being connected to the conductor of the branch BO'1(Y) that conveys a signal $ST2_Y$, and the second input being connected to the conductor of the branch BO1(X) that conveys the signal $ST1_X$;
- an AND gate 40 having two inputs and one output, a first input being connected to the conductor of the branch BO'1(Y) that conveys the signal $ST1_Y$ and the second input being connected to the conductor of the branch BO1(X) that conveys the signal $ST2_X$; and
- an OR gate 41 having three inputs and one output, a first input being connected to the output of the gate 39, a second input being connected to the output of the gate 40, and a third output being connected to the output of the AND gate 1, this output no longer being connected directly to the S input of the bistable 5, and the output of the gate 41 being connected directly to the S input.

Normal writing of a 1 value is unchanged, i.e. it remains as described above. It is performed if and only if:

$$ST1_X \cdot ST1_Y = 1$$

Normal writing of a 0 value is performed as described above, i.e. if and only if:

$$RT1_X \cdot RT1_Y = 1$$

In particular, for writing a 0 value in the element RMP (P,Q), the logic condition to be satisfied is:

$$RT1_P \cdot RT1_Q = 1$$

The signals $RT1_P = 1$ and $RT1_Q = 1$ constitute two selection signals that are identical, and they further constitute control signals for controlling a 0 value write operation.

In contrast, "special" writing of a 1 value in the element RMP(N,Q) is performed if and only if:

$$ST1_N \cdot ST2_P + ST2_N \cdot ST1_P = 1$$

In other words, if the inputs of the gate 39, or the inputs of the gate 40, receive two different types of selection signal, one signal being of the ST1 type and the other being of the ST2 type.

Likewise, "special" writing of a 1 value in the element RMP(N,Q) is performed if and only if:

$$ST1_N \cdot ST2_Q + ST2_N \cdot ST1_Q = 1$$

Figure 49:
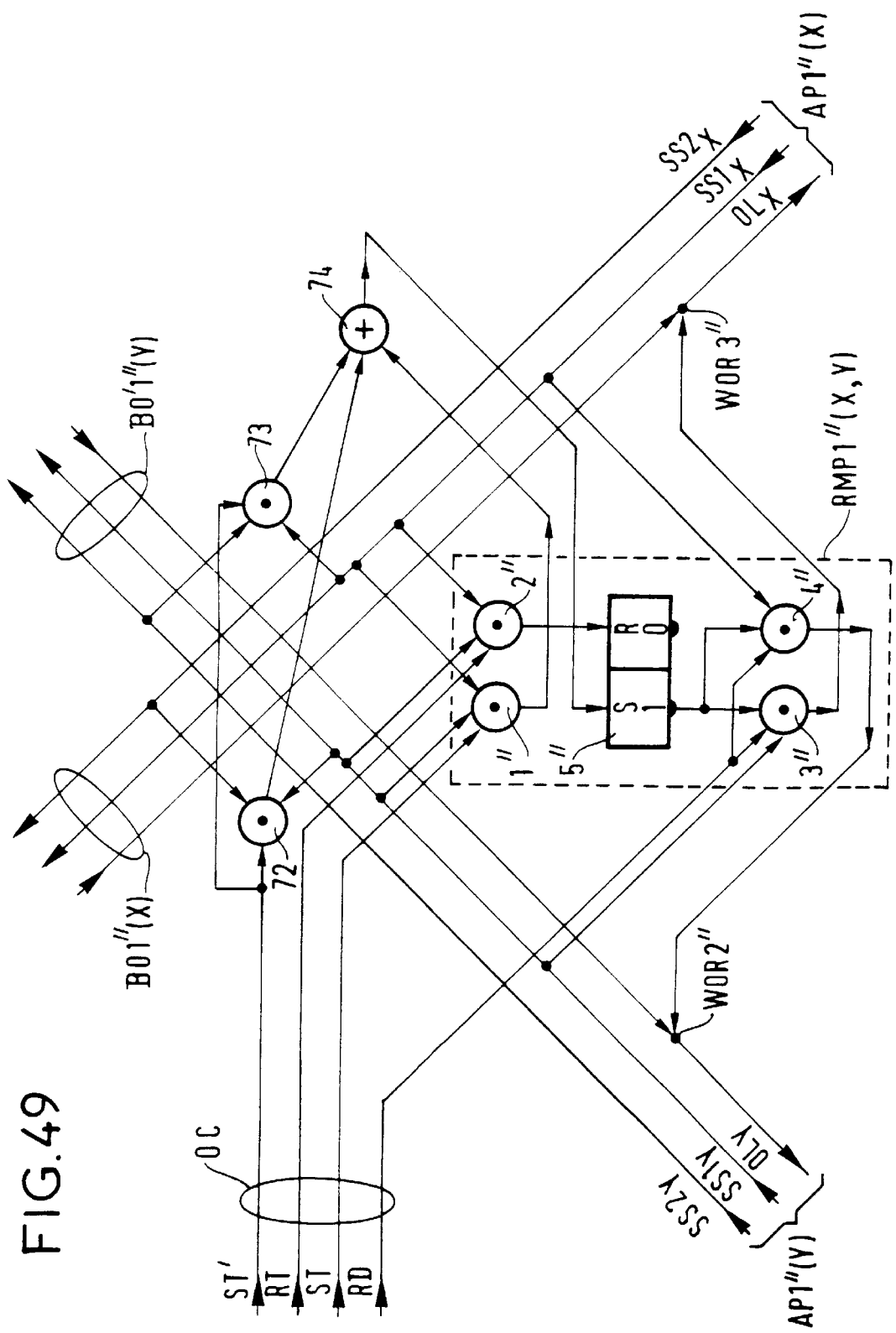

FIG. 49 is a diagram summarizing the embodiment RMP1"(X,Y) and the additional means that are added to it to make it possible to perform the fifth complex operation. The additional means comprise:

- an additional conductor in each individual bus; by way of example the branch BO1"(X) of the bus corresponding to the object X includes an additional conductor conveying a signal $SS2_X$, the signal $SS_X$ then being referenced $SS1_X$;
- an additional conductor in the common bus OC for conveying a signal ST' for controlling special writing of a 1 value;
- an AND gate 72 having three inputs and one output, a first input being connected to the conductor of the common bus OC that conveys the signal ST', a second input being connected to the conductor of the branch BO1" (X) that conveys the signal $SS2_X$, and a third input being connected to the conductor of the branch BO'1" (Y) that conveys a signal $SS1_Y$;
- an AND gate 73 having three inputs and one output, a first input being connected to a conductor of the branch BO'1"(Y) that conveys the signal $SS2_Y$, a second input being connected to a conductor of the branch BO1"(X) that conveys the signal $SS1_X$, and a third input being connected to the conductor of the common bus OC that conveys the signal ST'; and
- an OR gate 74 having three inputs and one output, a first input being connected to the output of the gate 72, a second input being connected to the output of the gate 73, and the third input being connected to the AND gate 1", which is no longer connected directly to the S input of the bistable 5", the output of the gate 74 being connected to said S input.

Normal writing of a 1 value is performed as described above, i.e. if and only if:

$$SS1_X.SS1_Y=1 \text{ and } ST=1$$

Normal writing of a 0 value is performed as described above, i.e. if and only if:

$$SS1_X.SS1_Y=1 \text{ and } RT=1$$

For these normal operations, the pieces of selection information are of the same type SS1 on both buses that intersect each other at the cross-point at which the memory element is situated.

To perform special writing of a 1 value, the pieces of selection information must be of two different types SS1 and SS2. Special writing of a 1 value is performed if and only if:

$$SS1_N.SS2_P+SS2_N.SS1_P=1 \text{ and } ST'=1 \text{ for } RMP1''(P,N)$$

$$SS1_N.SS2_Q+SS2_N.SS1_Q=1 \text{ and } ST'=1 \text{ for } RMP1''(N,Q)$$

Figure 50:
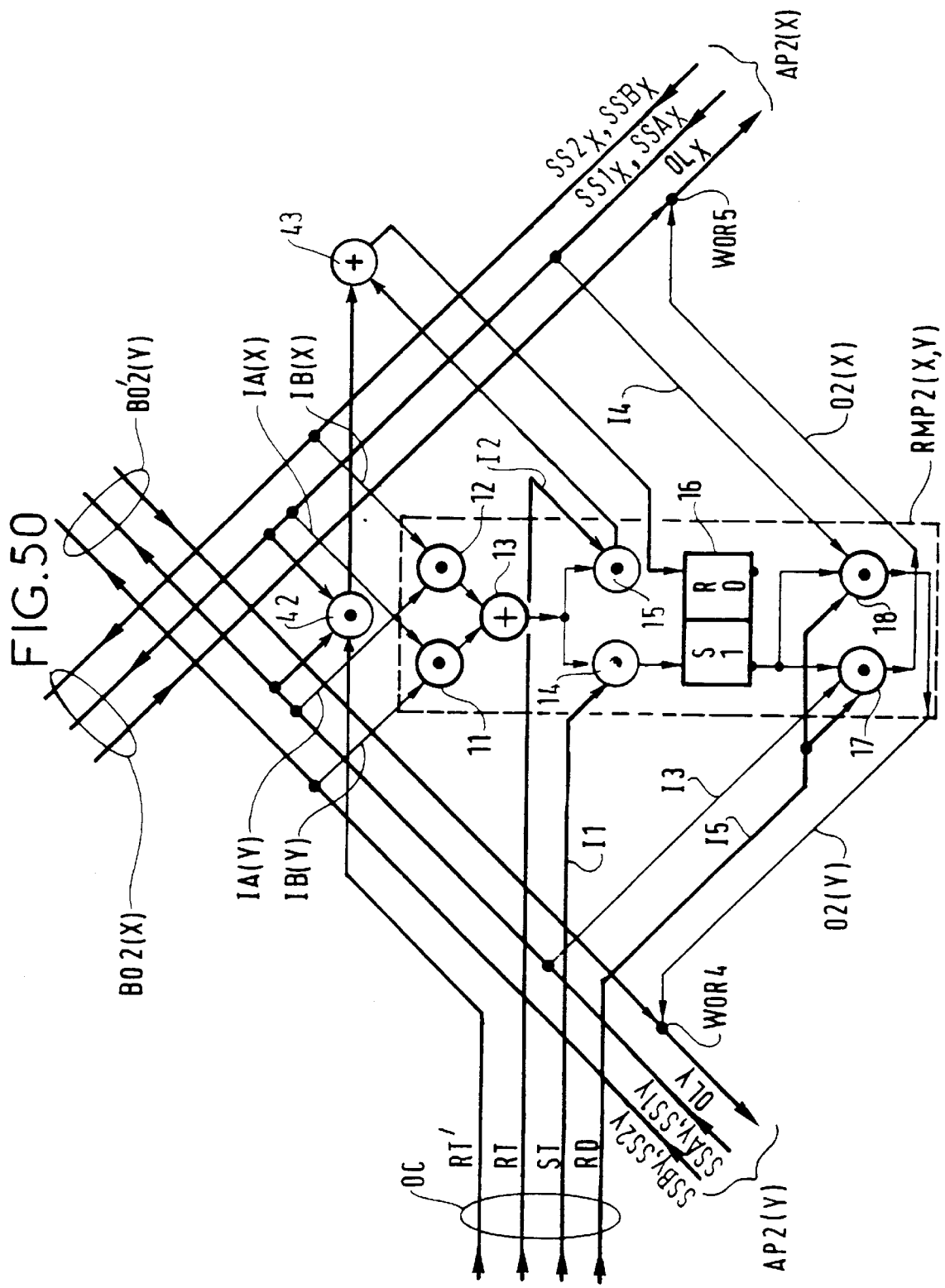
FIGS. 50 and 51 are diagrams summarizing two variants of the second embodiment, which variants include additional logic means for making it possible to perform the fifth complex operation.

FIG. 50 is a diagram summarizing the embodiment RMP2 (X,Y) as provided with additional means for making it possible to perform the fifth complex operation. These additional means include:

an additional conductor in the common bus OC for conveying a signal RT' for controlling special writing of a 0 value;

two additional conductors in each bus corresponding to an object; by way of example, in the branch BO2(X) of the bus corresponding to the object X, the two additional conductors convey signals $SS1_X$ and $SS2_X$, but a preferred implementation consists in re-using the same conductors as those used for conveying respective ones of the selection signals $SSA_X$ and $SSB_X$ making it possible to assign each object to one of the subsets A or B, or to both subsets A and B;

an AND gate 42 having three inputs and one output, a first input being connected to the conductor of the common bus OC that conveys the signal RT', a second input being connected to a conductor of the branch BO'2(Y) that conveys a signal $SS1_Y$ and the signal $SSA_Y$, and a third input being connected to a conductor of the branch BO2(X) conveying the signal $SS1_X$ and the signal $SSA_X$; and an OR gate 43 having two inputs and one output, a first input being connected to the output of the gate 42, and the second input being connected to the output of the AND gate 15, this output no longer being connected directly to the R input of the bistable 16, the output of the gate 43 being connected to the input R.

Normal writing is performed in the element RMP2(X,Y) as described above, with only the references of the signals having changed: the element must receive two different types of selection information: SS1 and SS2. Normal writing of a 1 value is performed if and only if:

$$SS1_X.SS2_Y+SS2_X.SS1_Y=1 \text{ and } ST=1$$

Normal writing of a 0 value is performed if and only if:

$$SS1_X.SS2_Y+SS2_X.SS1_Y=1 \text{ and } RT=1$$

Normal writing of a 1 value in an element RMP2(N,P) is thus performed if and only if:

$$SS1_N.SS2_P+SS2_N.SS1_P=1 \text{ and } ST=1$$

Normal writing of a 1 value in an element RMP(N,Q) is performed if and only if:

$$SS1_N.SS2_Q+SS2_N.SS1_Q=1 \text{ and } ST=1$$

Special writing of a 0 value is performed if and only if:

$$SS1_P.SS1_Q=1 \text{ and } RT'=1$$

i.e. if the element receives two pieces of selection information of the same type SS1.

Figure 51:
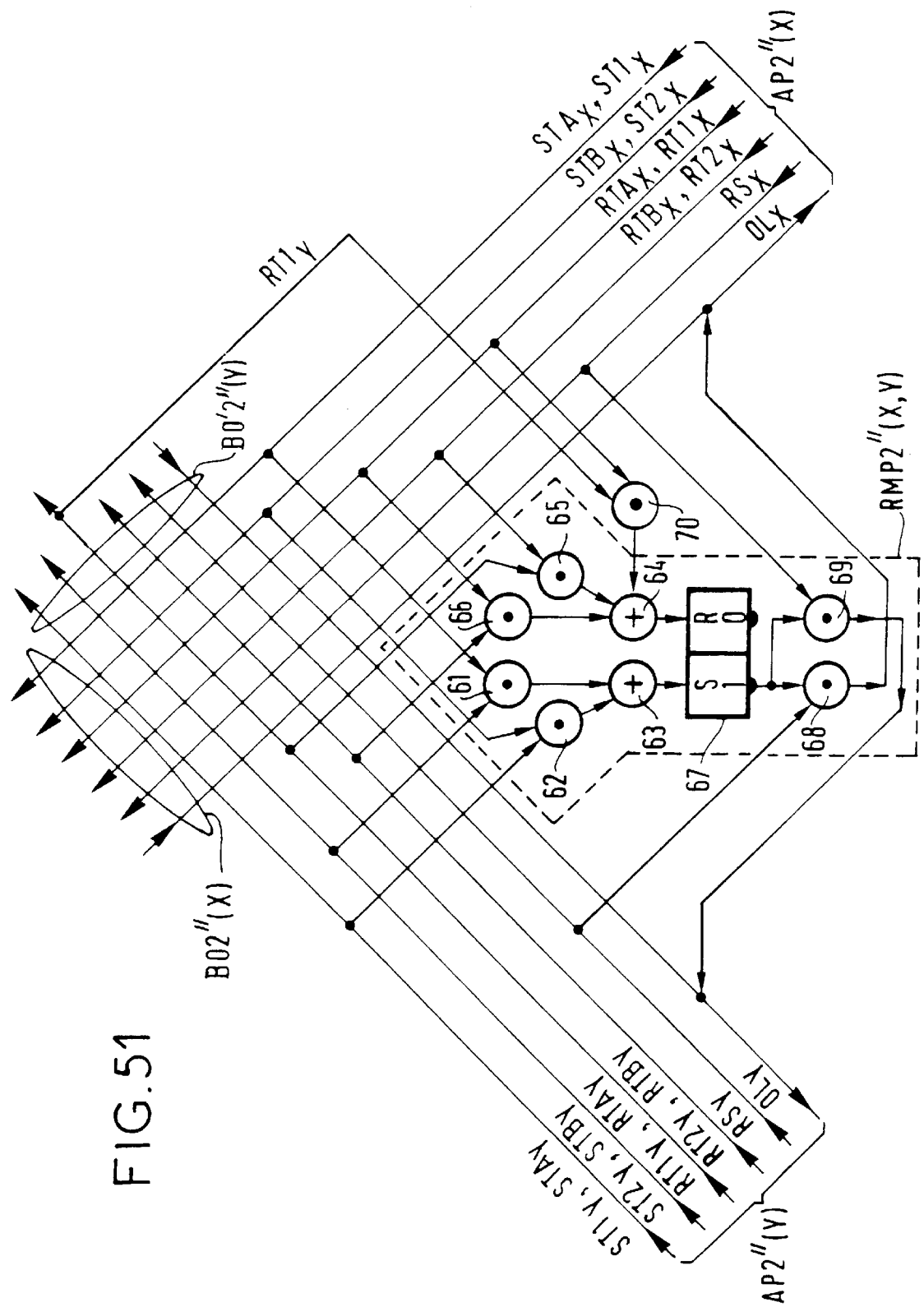

FIG. 51 is a diagram summarizing the embodiment RMP2"(X,Y) as provided with additional means making it possible to perform the fifth operation. These additional means comprise:

four additional conductors in each bus corresponding to an object, for conveying respective ones of four signals $ST1_X$, $ST2_X$, $RT1_X$, $RT2_X$; for example, for the object X, the four additional conductors may advantageously be the same as the four conductors conveying respective ones of the signals $STA_X$, $STB_X$, $RTA_X$, $RTB_X$ making it possible to assign the object to a group A or B, or to both groups A and B;

an AND gate 70 having two inputs and one output, a first input being connected to a conductor of the branch BO'2"(Y) that conveys the signal $RT1_Y$, and the second input being connected to a conductor of the branch B02"(X) that conveys the signal $RT1_X$, and an output being connected to an additional input of the OR gate 64.

A normal write operation is performed as described above, with only the references of the signals having been changed. Normal writing is performed if and only if two pieces of selection information of the same type SS1 are applied simultaneously to the two buses that intersect each other at the cross-point at which the memory element is situated. Normal writing of a 1 value is performed if and only if:

$$ST1_X.ST2_Y+ST2_X.ST1_X=1$$

Normal writing of a 0 value is performed if and only if:

$$RT1_X.RT2_X+RT2_X.RT1_X=1$$

Special writing of a 0 value is performed if and only if the memory element receives simultaneously two pieces of selection information of the same type RT1 applied to respective ones of the two buses that intersect each other at the cross-point at which the memory element is situated. Special writing of a 0 value is performed if and only if:

$$RT1_X.RT1_Y=1$$

FIG. 52 shows a sixth complex operation consisting in releasing relationships existing between a given object and not more than two other objects referred to as "adjacent objects" in a linear chain of relationships between objects, then in establishing a direct relationship between the two adjacent objects. This involves removing a known object E referred to as an "object to be removed" from a linear chain of objects P-E-Q, the objects P and Q being unknown a priori, and automatically establishing a direct relationship between the adjacent objects P and Q. Furthermore, it must be possible to perform the same operation in the event that the object E to be removed is associated with a single adjacent object instead of two adjacent objects, without this being known outside the apparatus (an object E to be removed is assumed to have at least one adjacent object).

FIG. 53 is a diagram summarizing a variant of the first embodiment RMP1 of a relationship memory element, which variant makes it possible to perform the sixth complex operation.

In addition to a memory element RMP1 and the logic means OC1 making it possible to perform the first complex operation, this variant includes two logic AND gates 44 and 45. The structure and operation of this variant are described below for the memory element RMP1(E,P) storing the existence of a relationship between the object E and an object P. Naturally, operation is identical for the memory element storing the relationship between the object E and the object Q, and in any other memory element that stores the existence of a relationship between the object E and any other object. The sixth complex operation is performed identically and in parallel in each of the memory elements.

In this example, the AND gate 44 includes: an input connected to a bus that is common to all of the memory elements and that conveys a signal EC =1 which controls the sixth complex operation; an input connected to the output of the AND gate 44 of the memory element RMP1(E,P); and an output connected to a conductor of the branch BO'1(E) of the orthogonal bus corresponding to the object E that conveys the signal $ST_E$ for controlling writing of a 1 value, which conductor constitutes a wired-OR WOR18. Likewise, the gate 45 includes: an input connected to the common bus conveying the signal EC=1; an input connected to the output of the gate 3; and an output connected to the conductor of the orthogonal bus corresponding to the object P that conveys the signal ST, for controlling writing of a 1 value, which conductor constitutes a wired-OR WOR19.

FIG. 54 is a timing diagram showing operation of the embodiment shown in FIG. 53. During a first time interval T5, the relationship management apparatus reads information indicating the existence of relationships, E-P and E-Q, starting from the object E, and it stores the establishment of a relationship P-Q. Then, during a time interval T6, it stores the release of the relationships E-P and E-Q.

During the interval T5, the signal $RS_E$=1 is applied to all of the memory elements that are connected to the orthogonal bus corresponding to the object E. Simultaneously, the signal EC=1 is applied to the bus that is common to all of the memory elements. The essential signals for reading relationships starting from E are indicated by solid arrows. The essential signals for establishing relationships such as P-Q are indicated by solid arrows.

As shown in FIG. 53, the signal $RS_E$ enables gate 3 so as to convey a read output signal $OL_P$ over the orthogonal bus corresponding to the object P. This signal has a 1 value since the objects P and E are related by a relationship. The signal EC=1 enables gate 45 for supplying a signal $ST_P$=1 to the orthogonal bus corresponding to the object P, for controlling writing in all of the memory elements that are connected to the orthogonal bus and that simultaneously receive another write control signal RS via another orthogonal bus. In this example, operation of the memory element RMP1(E,Q) (not shown) is analogous. A signal $ST_Q$=1 is therefore transmitted over the orthogonal bus corresponding to the object Q. Therefore, a memory element RMP1(P,Q) simultaneously receives the signals $ST_P$=1 and $ST_Q$=1. It thus stores the establishment of a relationship between the objects P and Q. The establishment of a relationship is stored in the same way in any other memory element corresponding to a pair of objects, each of which has a relationship with the object E.

Then, during the interval T6, the signal EC takes the value 0 again, the signal $RS_E$=1 is maintained, and the control signal $RT_E$=1 is applied to the access point AP1(E) corresponding to the object E. Since the two signals $RS_E$=1 and $RT_E$=1 are simultaneous, they constitute a command for performing the first complex operation, i.e. releasing all of the relationships established between the object E and other objects. These two signals control the logic means OC1 as described above, by resetting the bistable 5 of the memory element RMP1(E,P).

Figure 55:
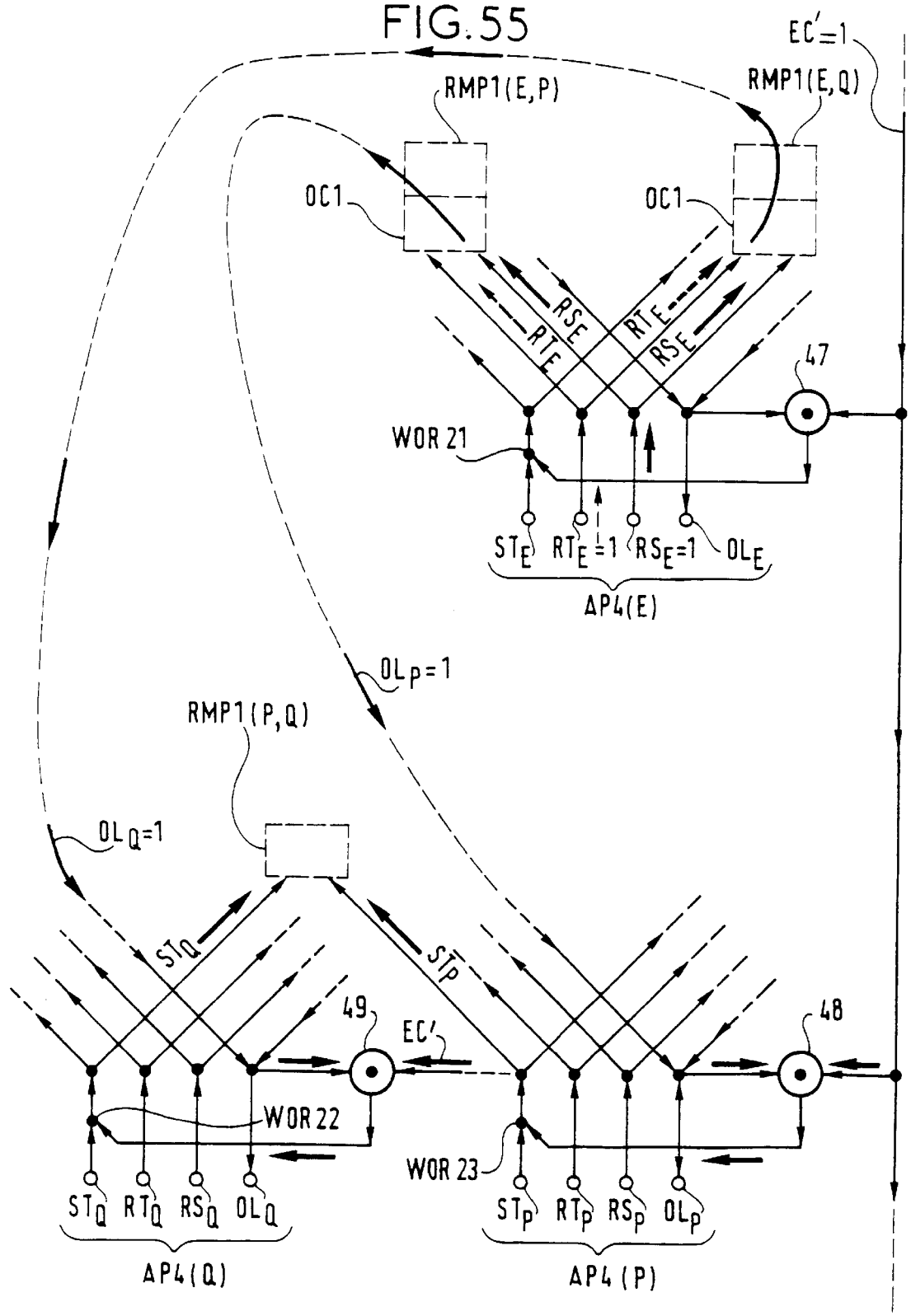
FIG. 55 is a diagram summarizing a variant embodiment of the access point shown in FIG. 12, which variant includes additional logic means making it possible to perform the sixth complex operation.

FIG. 55 is a diagram summarizing a variant embodiment of the access point shown in FIG. 12. By way of example, it represents three access points AP4(E), AP4(P), AP4(Q) corresponding to the objects E, P, and Q.

In this variant, the sixth complex operation is performed by additional logic means which are not analogous to the gates 44 and 45 placed at each memory element, but by means of a gate placed at each access point. In this example, three logic AND gates 47, 48, 49 are placed respectively close to the access points corresponding to the objects E, P, and Q. Each gate 47, 48, 49 has a first input connected to a bus-common to all of the access points, that conveys a signal EC'=1 for causing the sixth complex operation to be performed.

Gate 47 has a second input which is connected to a conductor belonging to the orthogonal bus corresponding to the object E, and conveying the read output signal $OL_E$. An output of the gate 47 is connected to the conductor of this bus that conveys the signal $ST_E$, which conductor constitutes a wired-OR WOR21. Likewise, the gate 48 has a second input connected to a conductor belonging to the orthogonal bus corresponding to the object P and conveying the signal $OL_P$. An output of gate 48 is connected to the conductor of the bus that conveys the signal $ST_P$, which conductor constitutes a wired-OR WOR23. Likewise, the gate 49 has a second input connected to a conductor belonging to the orthogonal bus corresponding to the object Q, and conveying the signal $OL_Q$. An output of the gate 49 is connected to the conductor of the bus conveying the signal $ST_Q$, which conductor constitutes a wired-OR WOR22.

The timing diagrams shown in FIG. 54 are still valid for illustrating operation of the variant shown in FIG. 55, provided that EC is replaced with EC'. During interval T5, the signals $RS_E$=1 and EC'=1 are applied simultaneously respectively to the access point AP4(E) corresponding to the given object E, and to the bus that is common to all of the memory elements.

The signal $RS_E$=1 controls reading from all of the memory elements connected to the orthogonal bus corresponding to the object E, in particular the elements RMP1 (E,P) and RMP1(E,Q). In this example, this reading thus supplies a signal $OL_P$=1 over the orthogonal bus corresponding to the object P and a signal $OL_Q$=1 over the orthogonal bus corresponding to the object Q. These two signals respectively enable the gates 48 and 49 which receive from elsewhere the control signal EC'=1 causing the sixth complex operation to be performed. The gate 48 then supplies 1 information which constitutes a signal $ST_P$=1 over the orthogonal bus corresponding to the object P. The gate 49 supplies 1 information which constitutes a signal $ST_Q$=1 over the orthogonal bus corresponding to the object Q. The memory element RMP1(P,Q) which is situated at the cross-point between the orthogonal buses corresponding to the objects P and Q thus simultaneously receives two write control signals which thus cause the establishment of the relationship P-Q to be stored.

During the time interval T6, the signal EC' returns to the value 0, while the signal $RT_E$=1 is applied to the access point corresponding to the object E. The signal $RS_E$=1 is maintained, and therefore all of the memory elements connected to the orthogonal bus corresponding to the object E simultaneously receive the signals $RS_E=1$ and $RT_E=1$. These signals cause a reset signal to be generated in the logic means OC1 respectively associated with each of the memory elements. This resetting is performed in particular in the memory element RMP1(E,Q), thereby storing the release of the relationship E-Q, and in the memory element RMP1(E, P), thereby storing the release of the relationship E-P.

In a variant embodiment that can be implemented by a person skilled in the art, the release operation could be controlled, in the apparatuses shown in FIGS. 53 and 55, by a specific signal conveyed by an additional conductor in each individual bus.

FIG. 56 is a diagram summarizing a third embodiment RMP3 of a relationship memory element for the apparatus of the invention. This third embodiment differs from the second embodiment RMP2 shown in FIG. 11 in that:

The bus common to all of the memory elements has no conductor supplying a signal RD for triggering any reading in all of the memory elements; but it includes in addition a conductor conveying a read and propagate control signal EC".

Each orthogonal bus corresponding to an object P, for example, includes an additional conductor $RD_P$ for controlling reading starting from object P, in addition to the conductors conveying the signals $SS_P$, $SS_P$ and $OL_P$ which retain the same functions, except that the signal $SSA_P$ is not used for reading.

The element RMP3 is associated with additional logic means OC1" making it possible to perform the first complex operation for releasing all of the relationships existing between a given object and any object (in particular when there are two objects adjacent to the given object); and two logic AND gates 51 and 52 specific to the sixth complex operation and making it possible to establish relationships automatically between the adjacent objects that were related to the given object.

Each memory element RMP3 includes the same gates 11, 12, 13, 14 and the same bistable 16 as in the second embodiment RMP2, and these components have the same functions. It also includes AND gates 15', 17', and 18' which have functions that are slightly different from those of the gates 15, 17, and 18. Each of gates 17' and 18' has a first input connected to the output 1 of the bistable 16, but its second input is no longer connected to the common bus for receiving a non-specific read control signal RD, since this signal no longer exists. The second input is connected to a conductor belonging to an orthogonal bus and supplying a read control signal: $RD_E$ and $RD_P$ respectively for the objects E and P.

FIG. 56 shows an element RMP3(E,P) serving to store information indicating the existence or the non-existence of a relationship between the object E and an object P. The second input of the gate 17' is connected to a conductor belonging to the orthogonal bus BO3(E) corresponding to the object E, and supplying the signal $RD_E$. The second input of the gate 18' is connected to a conductor belonging to the orthogonal bus BO'3(P) corresponding to the object P, and supplying a signal $RD_P$. Like the output of gate 17, the output of gate 17' is connected to a conductor belonging to the orthogonal bus BO'3(P) corresponding to the object P. This conductor constitutes a wired-OR WOR5, for conveying the read output signal $OL_P$. Like the output of gate 18, the output of gate 18' is connected to a conductor belonging to the orthogonal bus BO3(E) which corresponds to the object E, and constituting a wired-OR WOR4, for conveying a read output signal $OL_E$.

Let us consider the additional logic means OC1" making it possible to perform the first complex operation. They comprise:

a logic AND gate 53 having an input connected to the output of the AND gate 18', and an input connected to the conductor belonging to the common bus and supplying a signal RTA' controlling release of a plurality of relationships;

a logic AND gate 54 having an input connected to the output of the AND gate 17', and an input connected to the conductor belonging to the common bus and supplying the signal RTA'; and a logic OR gate 55 having an input connected to the output of gate 53; an input connected to the output of gate 54; an input connected to the output of gate 15', which output is no longer connected directly to the R input of the bistable 16; and an output connected to the R input of the bistable 16.

Let us firstly consider how the additional means OC1" operate to make it possible to perform the first complex operation consisting in releasing all of the relationships existing between the object E and any other object. A signal $RD_E=1$ is applied to the access point AP5(E) corresponding to the object E, and a signal RTA'=1 is applied simultaneously over the common bus to all of the memory elements. In all of the memory elements that store the existence or the non-existence of a relationship between the object E and another object, in particular in the element RMP3(E,P), the gate 17' is enabled simultaneously by the signal $RD_E=1$ and by the 1 information supplied by the output of the bistable 16. The output of the gate 17' therefore supplies 1 information which enables the gate. 54. On receiving the signal RTA'=1, this gate supplies 1 information to the OR gate 55. The output of gate 55 controls resetting of the bistable 16. The bistable then stores the non-existence of the relationship E-P.

Let us now consider the additional means used in addition to the means OC1" for performing the sixth complex operation. These means comprise two logic AND gates 51 and 52.

The logic AND gate 52 includes:

an input connected to a conductor belonging to the bus that is common to all of the memory elements and supplying a signal EC"=1 for controlling establishment of a relationship between two adjacent objects having a relationship with a given object to be removed;

an input connected to the output of the gate 17'; and an output which is connected to two conductors belonging to the orthogonal bus BO'3(P) corresponding to the object P, and respectively conveying the signals $SSA_P$ and $SSB_P$, the two conductors constituting respective wired-ORs WOR27 and WOR26.

To avoid short-circuiting the two conductors, the connection is made via buffer stages that are not shown.

Similarly, the gate 51 includes:

and input connected to a conductor belonging to the common bus conveying the signal EC';

an input connected to the output of the gate 18'; and an output connected to two conductors belonging to the orthogonal bus BO3(E) corresponding to the object E, and respectively conveying the signals $SSA_E$ and $SSB_E$, the two conductors constituting respective wired-ORs WOR25 and WOR24.

To avoid short-circuiting the two conductors the connection is made via buffer stages which are not shown.

FIG. 57 is a timing diagram illustrating how this variant operates to perform the sixth complex operation on the object E. During a first time interval T7, reading with propagation by means of the signals SSA and SSB is performed in all of the memory elements connected to the orthogonal bus corresponding to the object E, and writing is performed so as to establish the relationship P-Q between the objects P and Q in the example shown in FIG. 52. Then, during an interval T8, the first complex operation is used to release the relationships E-P and E-Q established with the object E. The essential signals corresponding to these two steps are shown respectively by solid arrows, and by dashed arrows.

During the interval T7, the read control signal $RD_E=1$ is applied to the access point AP5(E), and simultaneously the signals EC"=1 and ST=1 are applied over the common bus, while the signal RTA' is maintained at zero. The signal $RD_E=1$ causes reading to be performed in all of the memory elements connected to the orthogonal bus BO3(E) corresponding to the object E, in particular in the element RMP3(EP) in which the existence of the relationship E-P is stored. The signal $OL_P=1$ resulting from this reading enables the gate 52. Its output therefore produces signals $SSB_P=1$ and $SSA_P=1$ over the orthogonal bus BO'3(A) corresponding to the adjacent object A.

Therefore, given the active presence of the signal ST, any memory element which is connected to the orthogonal bus BO'3(P) and which receives over another orthogonal bus a signal SSB=1 or SSA=1 then stores the existence of a relationship between the object P and the object corresponding to the other orthogonal bus, namely the other adjacent object Q. In this example, the same process may take place in another memory element RMP3(E,Q) not shown in the figures, if a second adjacent object Q is related to E. This process leads to analogous signals $SSB_Q=1$ and $SSA_Q=1$ being transmitted over an orthogonal bus BO3(B) corresponding to the other adjacent object Q. The memory element RMB3(A,Q) is thus controlled so as to store the existence of a new relationship between P and Q.

During a second time interval T8, the signal $RD_E=1$ is maintained, the signal EC" is reset, the signal ST has an arbitrary state, and the signal RTA'=1 is then applied. The signal RTA'=1 then causes a first complex operation (described above) to be performed, thereby releasing the relationships between the object E and the other adjacent objects, since the signal $RD_E=1$ is applied. In this example, the memory element RMP3(E,P) is thus reset, as is the memory element RMP3(E,Q) (not shown).

In the special case of a single adjacent object P (for example) related to the object to be removed E, the identified single object P generates signals $SSA_P$ and $SSB_P$ but no new relationship is established with P (which is normal since no other object Q is related to E). Then the relationship E-P is normally released, thereby removing the object E in all cases.

The invention is not limited to the embodiments described above. In particular, it is possible to perform reading using a method that is different from the method described above, and that consists in transmitting a read output signal over a single bus which is the bus corresponding to the object which is determined by the reading. A different method consists in transmitting simultaneously two read output signals, over respective ones of the two buses corresponding to the two objects which are related by the relationship in question.

FIG. 58 is a diagram summarizing a variant RMP1' of the first embodiment RMP1, for transmitting two read output signals simultaneously; This variant includes the same elements 1, 2, and 5. But it differs in that:

the AND gates 3 and 4 are omitted;

it includes an AND gate 3' having two inputs, a first input being connected to the output 1 of the bistable 5, and an output being connected simultaneously to the two outputs O1(Y) and O1(X) of the element RMP1'(X,Y); and it includes an OR gate 4' having two inputs, one input being connected to the conductor of the branch BO'1 (Y) that supplies the signal $RS_Y$, the other input being connected to the conductor of the bus BO1(X) that supplies the signal $RS_X$, and its output being connected to the second input of the AND gate 3'.

The gate 3' thus conveys the information contained in the bistable 5 to the two buses BO1(X) and BO1'(Y) simultaneously, when a read signal $RS_X$ or $RS_X$ is applied over one of the buses.

FIG. 59 is a diagram summarizing a variant RMP2' of the second embodiment RMP2 for transmitting two read output signals simultaneously. It includes the same elements 11 to 16. But it differs in that:

the AND gates 17 and 18 are omitted;

it includes an AND gate 17' having two inputs, and an output being connected simultaneously to the outputs O2'(X) and O2'(Y) of the element RMP2'(X,Y); and it includes an OR gate 18' having two inputs, one input being connected to the conductor of the bus BO2(X) that supplies the signal $SSA_X$, an input being connected to the conductor of the bus BO'2(Y) that supplies the signal $SSA_Y$, and an output which is connected to the second input of the AND gate 17'.

The gate 17' thus conveys the information contained in the bistable 16 to the two buses BO2(X), BO'2(Y) simultaneously, when a read signal $SSA_X$ or $SSA_Y$ is applied to one of the buses.

The variants of the first embodiment and of the second embodiment for performing complex operations (described above) can be modified in analogous manner to implement this reading method.

What is claimed is:

1. An apparatus for managing relationships between individually identifiable objects in a finite address field, wherein for each pair of two distinct objects including a first object X and a respective second object Y, a particular relationship may operably exist to associate said first object X and said second object Y, the apparatus comprising:

an array of relationship memory elements for storing relationship information indicating the existence or the non-existence of said relationship between respective pairs of first objects X and second objects Y, said array having at least two dimensions and formed by a plurality of buses capable of conveying object selection signals and operation control signals, and wherein a relationship memory element is situated at a crosspoint between two individual buses, that are orthogonal to each other among said plurality of buses making up said array, each individual bus corresponding to a respective object and operable to convey at least one selection signal for selecting said respective object;

each said relationship memory element includes a logic circuit operable to receive at least one selection signal and operable to receive at least one operation control signal to write or read relationship information in said relationship memory element; and a logic means coupled to bus access points to supply the buses with said object selection signals, and to receive from the buses relationship information read from the relationship memory elements.

2. The apparatus according to claim 1 for managing relationships that are not necessarily symmetrical between two distinct objects in a set of objects comprising N objects, wherein the plurality of buses comprise:

N column control buses, corresponding respectively to the N objects, and respectively controlling N columns of relationship memory elements;

N row control buses, corresponding to the N rows of relationship memory elements; each row control bus forming a cross-point with each column control bus; and wherein the array of relationship memory elements comprises N(N−1) relationship memory elements to operably store each relationship relating a respective first object and a respective second object out of N distinct objects; said relationship memory elements located at cross-points between the column control buses and the row control buses, with the exception of cross-points situated on a diagonal of the array.

3. The apparatus according to claim 1 for managing symmetrical relationships in a set of objects comprising N objects, wherein the plurality of buses comprise:

N individual buses corresponding respectively to the N objects, each individual bus having a first branch and a second branch sharing a common end; each individual bus forming a cross-point with each of the other buses of said N individual buses;

wherein the array of relationship memory elements includes $$\frac{1}{2} N(N-1)$$

relationship memory elements (RMP(I,K)), to operably store each symmetrical relationship that may associate a respective first object and a respective second object in said set of N objects;

wherein the relationship memory elements storing the relationship information between the objects of rank i=1 to K−1 and the object of rank K, for K lying in the range 1 to N, are situated at cross-points between the first branch of the individual bus corresponding to said object of rank K, and the second branches of respective individual buses corresponding to the objects of ranks i=1 to K−1; and wherein the relationship memory elements storing relationship information between the object of rank K and the objects of ranks j=K+1 to N are situated at cross-points between the second branch of the individual bus corresponding to said object of rank K, and the first branches of respective individual buses corresponding to the objects of ranks j=K+1 to N.

4. The apparatus according to claim 1, wherein the logic circuit of a relationship memory element situated at the cross-point of an individual bus corresponding to a first object X and an individual bus corresponding to a second object Y comprises read authorizing means for authorizing the reading of relationship information stored at said relationship memory element, if said read authorizing means receives at least one selection signal conveyed by the individual bus corresponding to the first object, and for authorizing the reading of said information if it receives at least one selection signal conveyed by the individual bus corresponding to the second object; the information read being restored at least on the individual bus corresponding to the second object Y when the selection signal is received on the individual bus corresponding to the first object, and the information read is restored at least on the individual bus corresponding to the first object X when the selection signal is received on the individual bus corresponding to the second object.

5. The apparatus according to claim 1, wherein said apparatus is operable to enable an operation of writing relationship information in the relationship memory element to store information indicating the existence or the non-existence of a relationship between a first object and a second object, by explicitly selecting said first and second objects, the logic circuit of said relationship memory element further includes write authorizing means for authorizing the writing of relationship information concerning a relationship between said first object X and said second object Y if said write authorizing means simultaneously receives at least one selection signal conveyed by the individual bus corresponding to the first object X, and at least one selection signal conveyed by the individual bus corresponding to the second object Y.

6. The apparatus according to claim 1, wherein each individual bus, corresponding to a respective object is operable to convey at least first and second selection signals to select the object by assigning the object to at least one group of first and second groups of objects concerned by a writing operation;

wherein the logic circuit of each relationship memory element includes write authorizing means for authorizing a writing operation in the relationship memory element if, simultaneously:

at least the first selection signal relating to the first group is present on the individual bus corresponding to the first object X; and at least the second selection signal relating to the second group is present on the individual bus corresponding to the second object Y.

7. The apparatus according to claim 6, wherein the logic means coupled to the bus access points includes:

supplying means for supplying a first combination of values of the selection signals to each individual bus corresponding to an object which is to be assigned exclusively to the first group (A) for a given writing operation;

second supplying means for supplying a second combination of values of the selection signals to each individual bus corresponding to an object which is to be assigned exclusively to the second group (B) for said given writing operation; and third supplying means for supplying a third combination of values of the selection signals to each individual bus corresponding to an object which is to be assigned both to the first group and to the second group for said given writing operation;

wherein to write information indicating the existence or the non-existence of a relationship associating each first object in a first subset of predetermined objects with each second object in a second subset of predetermined objects, without performing the same writing operation for relationships between the objects belonging exclusively to the first subset, or performing the same writing operation for relationships between the objects belonging exclusively to the second subset, the logic means supplies:

the first combination of values to the individual buses corresponding to the objects belonging exclusively to the first subset or to the second subset, one of the two subsets being chosen arbitrarily so as to assign these objects exclusively to the first group (A);

the second combination of values to the individual buses corresponding to the objects belonging exclusively to the second subset so as to assign these objects exclusively to the second group (B); and the third combination of values to the individual buses corresponding to any objects belonging simultaneously to both the first and second subsets so as to assign these objects exclusively to the second group (B).

8. The apparatus according to claim 1, wherein the logic circuit of each relationship memory element includes operation authorization means for authorizing an operation if the logic circuit receives at least one of:

object selection signal and operation control signal supplied by one of the two individual buses at a cross-point where the relationship memory element is situated, for an operation based on selecting a single object, the other object being arbitrary and two object selection signals and operation control signals simultaneously supplied respectively by the two individual buses at the cross-point where said relationship memory element is situated for an operation based on selecting two objects.

9. The apparatus according to claim 8, wherein each individual bus corresponding to an object is operable to convey:

at least one signal for selecting an object and controlling writing of information indicating the existence of a relationship between said object and another object;

at least one signal for selecting an object and for controlling writing of information indicating the non-existence of a relationship between said object and another object;

at least one signal for selecting an object and controlling reading of information indicating the existence or the non-existence of a relationship between said object and another object; and at least one read output signal conveyed an access point of the bus.

10. The apparatus according to claim 1, further comprising an operation control bus (OC) common to all of the relationship memory elements and operable to convey at least one non-specific operation control signal wherein the logic control circuit of each relationship memory element further includes means for authorizing an operation if the logic control circuit receives simultaneously at least one operation control signal operation control bus, and at least one selection signal conveyed by at least one individual bus.

11. The apparatus according to claim 8, wherein each individual bus corresponding to an object is operable to convey:

at least one read output signal for conveying read information to an access point of said bus; and said apparatus further comprises an operation control bus common to all of the relationship memory elements is operable to convey at least:

a common signal for controlling an operation of writing information indicating the existence of a relationship between said object and another object;

a common signal for controlling an operation of writing information indicating the non-existence of a relationship between said object and another object; and a common signal for controlling an operation of reading information indicating the existence or the non-existence of a relationship between said object and another object.

12. The apparatus according to claim 1, wherein said apparatus is operable to perform a first complex operation said first complex operation comprising writing common information indicating the existence or the non-existence of relationships between a given object and all of the other objects simultaneously wherein said buses are capable of conveying a combination of signals to all of the relationship memory elements that are capable of storing relationship information concerning relationships between the given object and all of the other objects, said combination of signals being specific to the given object and specific to the first complex operation, so as to select the given object and so as to cause the first complex operation to be performed;

wherein the logic means coupled to the access points of the buses include means for transmitting the combination of signals over the buses;

and wherein the logic circuit of each relationship memory element (RMP1 (X, Y); RMP2 (X, Y)) includes a first authorizing means (OC1; OC'1) for authorizing writing of relationship information in the relationship memory element, if the logic circuit receives said combination of signals.

13. The apparatus according to claim 1, wherein said apparatus is operable to perform a plurality of different operations simultaneously, the operations respectively belonging to subsets of disjoint possible operations, wherein each individual bus is operable to convey a plurality of distinct selection signals supplied by the logic means coupled to the access points of the buses; and the logic circuit of each relationship memory element includes means for authorizing performance of all of the operations belonging to a subset when the circuit receives at least one of:

a selection signal conveyed by one of the two individual buses that form a crosspoint where a respective relationship memory element is situated, said selection signal being allocated specifically to the subset of operations, in the case of a subset of operations based on selecting a single object; and a combination of two different selection signals respectively conveyed by the two individual buses that form across point where a respective relationship element is situated, the combination of two selection signals being allocated specifically to the subset of operations, in the case of a subset of operations based on simultaneously selecting two objects.

14. The apparatus according to claim 13, wherein said apparatus is operable to perform a first write operation and a different second write operation simultaneously, for relationships between two selected objects, each of the write operations belonging to a distinct subset of possible operations, wherein each individual bus (B0(P), B0(P); B0(N), B0 (N); B0 (Q), B0 is operable to convey at least two distinct types of selection signals; and the logic circuit of each relationship memory element includes means for authorizing:

the first write operation when the logic circuit receives a first combination (IST1 (P).IST1 (Q)=1) made up of two selection signals respectively supplied by the two individual buses that form a crosspoint where a respective relationship memory element is situated; and the second write operation when the logic circuit receives a second combination made up of two selection signals respectively supplied by the two individual buses that form a crosspoints where a respective relationship memory element is situated.

15. The apparatus according to claim 12, wherein for said first complex operation, each individual bus corresponding to a given object is operable to convey said combination of signals specific to the given object and specific to the first complex operation; and wherein the logic means coupled to the access points of the individual buses include means for supplying said combination of signals to the individual bus corresponding to each given object;

wherein the logic circuit of each relationship memory element further includes means authorizing writing of information indicating the non-existence of a relationship in the relationship memory element if said combination of signals is conveyed by one of the two individual buses that form a crosspoint where the respective relationship memory element is situated.

16. The apparatus according to claim 12, wherein said combination of signals specific to a given object and specific to the fist complex operation is made up firstly of a selection signal corresponding to the given object and secondly of a releasing control signal conveyed by an operation control bus that is common to all of the relationship memory elements;

wherein the logic means coupled to the access points of the buses include means for simultaneously applying the releasing control signal to the operation control bus, and the selection signal ($SSA_X=1$; $RD_P=1$) to the individual bus corresponding to each given object;

wherein the logic circuit of each relationship memory element further includes a second authorizing means for authorizing writing of information, indicating the non-existence of a relationship in the relationship memory element if the releasing control signal is applied to the operation control bus, and if, simultaneously, the selection signal is applied to one of the two individual buses (B02 (X), B02 (Y); B03 (X), B0'3 (Y)) that form a crosspoint where the respective relationship memory element is situated.

17. The apparatus according to claim 13, wherein said apparatus is operable to perform a second complex operation said second complex operation comprising two simultaneous read operations for reading all of the relationship information indicating the existence or the non-existence of relationships established between at least one object and any other object for a first read operation (La), and between at least one other object and any other object for a second read operation, the identified objects being split up into two distinct groups referred to as output groups relating respectively to the first and second read operations;

wherein the individual bus corresponding to each object is operable to transmit a first read selection signal a second read selection signal, the first and second read selection signals being distinct and specific to the second complex operation; and wherein the individual bus is operable to transmit a first read output signal, and for transmitting a second read output signal, the first and second read output signals being specific to the second complex operation;

logic means including means for supplying the first read selection signal, and means for supplying the second read selection signal to the individual buses; the first read selection signal and the second read selection signal being supplied respectively to the individual buses corresponding respectively to each object from which a first read operation is to be performed, and to each object from which a second read operation is to be performed; and the logic means include means for receiving the first and second read output signals that may be conveyed by each individual bus; and wherein the logic circuit of each relationship memory element relating to the first object and to the second object further includes means for authorizing four read operations, that may or may not be simultaneous, for reading the relationship memory element such that:

a first read operation from the first object is performed if the first read selection signal is conveyed by the individual bus corresponding to the first object;

a second read operation from the first object is performed if the second read selection signal is conveyed by the individual bus corresponding to the first object;

a first read operation from the second object is performed if the first read selection signal ($RSA_Y$; $SSA_Y$) is conveyed by the individual bus corresponding to the second object; and a second read operation from the second object is performed if the second read selection signal ($RSB_Y$; $SSB_Y$) is conveyed by the individual bus corresponding to the second object.

18. The apparatus according to claim 17, wherein each of the first and second read selection signals also constitutes a read operation control signal;

and wherein the means for performing the four possible read operations depends on the first and second read selection signals and read operation control signals that are received by the logic circuit.

19. The apparatus according to claim 17, further comprising an operation control bus that is common to all of the elements and is operable to convey a non-specific read control signal {(RD) that is common to the first and second read operations (La, Lb);

wherein the logic means include means for further supplying the non-specific read control signal to the operation control bus; and wherein the means for performing the four read operations operates only if the logic circuit further receives the non-specific read control signal.

20. The apparatus according to claim 4 wherein said apparatus is operable to perform a third complex operation, said third complex operation comprising reading by propagation from a reference object so as to identify all of the objects having direct or indirect relationships with the reference object, said apparatus further comprising:

a bus that is common to all access points of the selection buses, and that is operable to convey an operation control signal specific to the third complex operation; and wherein the logic means coupled to the access points of the individual buses includes, for each individual bus (B01 (K), B)'1 (K); B02 (K), B0 corresponding to an object logic means supplying at least one selection signal to the bus if a read output signal is present on the bus, and if the operation control signal specific to the third complex operation is present on the bus that is common to all of the access points.

21. The apparatus according to claim 20, wherein a selection signal supplied by the logic means coupled to the access points of the selection buses also constitutes a read operation control signal for the relationship memory elements.

22. The apparatus according to claim 20 further comprising an operation control bus that is common to all of the relationship memory elements (RMP1"(X,Y); RMP2 (X,Y))" and that is operable to convey at least one non-specific operation control signal;
   wherein the read authorizing means authorizes a reading operation only if the logic circuit receives the non-specific read control signal; and
   wherein the logic means coupled to the access points of the individual buses further supply the non-specific read control signal to the operation control bus that is common to all of the elements, simultaneously with selection signal.

23. The apparatus according to claim 20 wherein said apparatus is operable to perform a fourth complex operation, said fourth complex operation comprising: identifying and releasing, by propagation, direct or indirect relationships between a given object and any other object, wherein the logic means supplies:
   a selection signal to the bus corresponding to the given object; and
   an operation control signal specific to the third complex operation, to the bus that is common to all of the access points of the buses to identify all of the objects that have direct or indirect relationships with the given object;
   wherein the logic means further receives read output signals identifying by propagation each object that has a relationship with the given object;
   supplies a selection signal to the individual bus of each object identified by propagation; and
   supplies at least to the elements storing information indicating the existence of relationships between the given object and the objects identified by propagation, a combination of selection and releasing control signals so as to write in each of the relationship memory elements information indicating the non-existence of a relationship.

24. The apparatus according to claim 23, wherein the logic means includes:
   means for supplying a selection signal to the individual bus of each object identified by propagation during both a first time interval and a second interval; the selection signal also constituting a read control signal; and
   means for supplying a selection signal to the individual bus of each object identified by propagation during the second time interval only; the combination of the selection signal and the control signal during the second time interval causing information to be written indicating the non-existence of a relationship.

25. The apparatus according to claim 23, further comprising an operation control bus that is common to all of the elements and is operable to convey a non-specific control signal that is specific to the first complex operation; and
   wherein the logic means further includes:
      means for supplying a selection signal to the individual bus of each object identifying by propagation during both a first time interval and a second time interval;
      means for supplying a read control signal to the operation control bus during both the first time interval and the second time interval; and
      means for supplying a non-specific signal to the operation control bus (OC) during the second time interval only, so as to write information indicating the non-existence of a relationship.

26. The apparatus according to claim 14, wherein said apparatus is operable to perform a fifth complex operation said fifth complex relationship comprising releasing a relationship between a first object and any second object and setting up a new first relationship (P-N) between the first object and a third object and a new second relationship between the third object and the second object,
   wherein the logic means coupled to the access points of the buses include means for simultaneously supplying:
      a selection signal of a first type to the individual buses of the first object and of the second object; and
      a selection signal of a second type (RT2, ST2, SS2) to the individual bus of the third object;
   and wherein the logic circuit of each relationship memory element includes means for performing the following:
      a first write operation comprising writing information indicating the non-existence of a relationship, when the logic circuit receives a first combination of two signals ($RT1_P.RT1_Q=1$; $SS1_P.SS1_Q=1$) made up of two signals of the first type over the two individual buses that form a cross-point where a respective relationship memory element is situated; and
      a second write operation comprising writing information indicating the existence of a relationship, when the logic circuit receives a second combination of selection signals made up of a signal of the first type and of a signal of the second type over respective ones of the two selection buses that form a crosspoint where the relationship memory element is situated.

27. The apparatus according to claim 12, wherein said apparatus is operable to perform a sixth complex operation said sixth complex operation comprising releasing relationships existing between a given object, referred to as an "object to be removed" and at the most two other objects referred to as "adjacent objects" in a linear chain of relationships between objects, and setting up a relationship directly between the two adjacent objects
   wherein said sixth complex comprises a first operation for reading the relationship memory elements storing information indicating the existence of any relationships between the object to be removed and any other object; and a second operation for writing information, indicating the existence of a relationship, in a relationship memory element, relating to two adjacent objects identified by the first operation wherein said first and second operations are performed consecutively during a first time interval and
   wherein the logic means coupled to the access points of the buses includes a first operation means for supplying, during the first operation, a first selection and operation control signal ($RS_E=1$; $RD_E=1$), applied to the individual bus of the object to e removed to cause reading to be performed in the elements storing the relationships between the object to be removed and all of the other objects; and
   said management apparatus further includes a second operation logic means for propagating a second selection and operation control signal relating to the second operation, said second operation logic means being coupled to the individual buses to supply said second selection and operation control signal to the individual bus of an object if the bus is conveying a read output signal so as to write information indicating the existence of a relationship between two adjacent objects identified by the first operation;

and wherein said means to perform the first complex operation is used in a second time interval to release the relationships existing between the object to be removed and the adjacent objects.

28. The apparatus according to claim 27, further comprising a propagation control bus that is common to all of the relationship memory elements, and that transmits a "propagation control" signal (EC=1) specific to the sixth complex during the first time interval ;

logic means for writing information indicating the existence of a relationship between the adjacent objects, produces a write control signal over each individual bus corresponding to an adjacent object to which the relationship memory element is connected, if:

the common propagation control signal specific to the sixth operation is present on the propagation control bus;

and, simultaneously, a read control signal ($RS_E=1$) is present on the individual bus corresponding to the object to be removed (E); and and the relationship information read in the relationship memory element indicates the existence of a relationship;

said apparatus further includes means for writing information indicating the existence of a relationship when the logic circuit simultaneously receives two write control signals for causing information to be written indicating the existence of a relationship, the signals being received over respective ones of the two individual buses to which the respective relationship memory element is connected; and.

29. The apparatus according to claim 27, further comprising a propagation control bus that is common to all of the access points and that is capable of transmitting a common propagation control signal specific to the sixth complex operation;

wherein the logic means coupled to the access points of the control buses includes:

means for transmitting during the first time interval the common propagation control signal specific to the sixth complex operation;

wherein for each individual bus corresponding to an object, means for supplying a selection and write control signal for causing information to be written indicating the existence of a relationship, if the propagation control signal specific to the sixth complex operation is active, and if, simultaneously, a read output signal indicating the existence of a relationship between the object to be removed and at least one adjacent object is active on the individual bus; and means for ceasing transmission during the second time interval, the propagation control signal specific to the sixth complex operation and for transmitting the releasing signal specific to the first complex operation and causing information to be written indicating the non-existence of a relationship, the releasing signal being transmitted over the bus corresponding to the object to be removed, so as to release all of the relationships between the object to be removed and any other objects;

and wherein the logic circuit of each relationship memory element further includes:

means for writing information indicating the existence of a relationship when the logic circuit simultaneously receives two individual selection and write control signals for causing information to be written indicating the existence of a relationship, the signals being received over respective ones of the two individual buses that form a cross-point to which the respective relationship memory element is connected; and means for writing information indicating the non-existence of a relationship when the logic circuit receives the releasing control signal specific to the first complex operation, for releasing a relationship with the object to be removed.

30. the apparatus according to claim 27, further comprising an identification and propagation bus that is common to all of the relationship memory elements, and that is operable to transmit an identification and propagation control signal specific to the sixth complex operation, and a releasing control signal;

wherein the logic circuit of each relationship memory element includes:

logic means for supplying a "write control propagation" signal for writing information indicating the existence of a relationship, over one of the two individual buses that form a crosspoint where the respective relationship memory element is situated, if a read output signal indicating the existence of a relationship is supplied to the bus by the relationship memory element, and if, simultaneously, the identification and propagation control signal specific to the sixth complex operation is applied; and means for writing information indicating the non-existence of a relationship, in the relationship memory element, if the releasing control signal is applied to the identification and propagation bus, and if, simultaneously, a selection and read control signal ($RD_E=1$) is applied to one of the individual buses that intersect each other at the relationship memory element;

and wherein the logic means coupled to access points of the control buses include means for:

activating the following simultaneously during the first time interval:

the identification and propagation control signal specific to the sixth complex operation, over the identification and propagation bus;

the selection and read control signal over the individual bus corresponding to an object to be removed; and the write control signal over the identification and propagation bus, so as to write information indicating the existence of a relationship between two objects adjacent to the object to be removed; and said logic means coupled to the access points further comprises:

means for activating the following simultaneously during the second time interval:

the selection and read control signal over the individual bus corresponding to the object to be removed; and the releasing control signal over the identification and propagation bus, so as to write information indicating the non-existence of any relationship between the object to be removed and all of the other objects.

31. The apparatus according to claim 4, wherein when the logic circuit of the relationship memory element performs a read operation, said logic circuit restores relationship information simultaneously over the individual bus corresponding to the first object, and over the individual bus corresponding to the second object, if said logic circuit receives a selection signal via at least one of the two individual buses, as well as a read control signal.

32. The apparatus according to claim 1, wherein said apparatus is operable to restore at least one read output signal at an access point corresponding to an object, said read output signal indicating the existence or the non-existence of at least one relationship with the object X, wherein each memory element includes:

an output relating to the first object X and that is connected to as least one conductor of the bus corresponding to the first object; X all the outputs relating to the first object X being connected together and constituting a wired-OR transmitting at least one read output signal to the access point relating to the first object; and an output (01(Y); 02(Y)) relating to the second object Y and that is connected to at least one conductor of the bus (B0'1(Y); B0'2(Y)) corresponding to the second object; all of the outputs relating to the second object being connected together and constituting a wired-OR transmitting at least one read output signal to the access point relating to the second object.

33. The apparatus according to claim 1, wherein to limit a reading operation to relationships concerning the objects belonging to a known subset, the logic means further include filter logic means that are coupled to the relationship memory element outputs relating to the objects, and that do not take account of the signals supplied by said outputs, during a read operation.

34. The apparatus according to claim 1, wherein each relationship memory element stores a single bit indicating the existence or non-existence of relationship between said first object X and said second object Y.

35. The apparatus according to claim 34, wherein the relationship information stored in each relationship memory element corresponds to a temporal relationship between said first object X and said second object Y.

36. The apparatus according to claim 34, wherein the relationship information stored in each relationship memory element corresponds to a priority relationship between said first object X and said second object Y.

* * * * *